(12) United States Patent
Cho et al.

(10) Patent No.: US 12,105,915 B2
(45) Date of Patent: Oct. 1, 2024

(54) INPUT SENSING DEVICE AND DISPLAY DEVICE INCLUDING THE SAME

(71) Applicant: Samsung Display Co., LTD., Yongin-si (KR)

(72) Inventors: Hyun Wook Cho, Yongin-si (KR); Min Hong Kim, Yongin-si (KR); Tae Joon Kim, Yongin-si (KR); Hyung Bae Kim, Yongin-si (KR); Jung Mok Park, Yongin-si (KR); Il Ho Lee, Yongin-si (KR); Jae Woo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/875,335

(22) Filed: Jul. 27, 2022

(65) Prior Publication Data

US 2023/0112523 A1 Apr. 13, 2023

(30) Foreign Application Priority Data

Oct. 12, 2021 (KR) .......................... 10-2021-0135286

(51) Int. Cl.
*G06F 3/041* (2006.01)
*G06F 3/044* (2006.01)

(52) U.S. Cl.
CPC ........ *G06F 3/04186* (2019.05); *G06F 3/0412* (2013.01); *G06F 3/041662* (2019.05); *G06F 3/0446* (2019.05); *G06F 2203/04111* (2013.01)

(58) Field of Classification Search
CPC .. G06F 3/0446; G06F 3/04186; G06F 3/0412; G06F 3/041662; G06F 2203/04111
See application file for complete search history.

(56) References Cited

U.S. PATENT DOCUMENTS

| | | |
|---|---|---|
| 10,949,022 B2 | 3/2021 | Lee |
| 2022/0164060 A1* | 5/2022 | Yamamoto ............ G06F 3/0418 |
| 2023/0004274 A1* | 1/2023 | Shin ...................... G06F 3/0418 |
| 2023/0168771 A1* | 6/2023 | Kim ...................... G06F 3/0418 345/174 |

FOREIGN PATENT DOCUMENTS

| | | |
|---|---|---|
| JP | 2019-193133 | 10/2019 |
| KR | 10-2019-0104101 | 9/2019 |

* cited by examiner

*Primary Examiner* — Deeprose Subedi
(74) *Attorney, Agent, or Firm* — Lewis Roca Rothgerber Christie LLP

(57) ABSTRACT

A display device includes a display unit including pixels. A sensor unit overlaps with the display unit and includes sensors. A sensor driver transmits a driving signal to the sensors, and receives sensing signals corresponding to the driving signal from the sensors. One sensing period includes a first sensing period and a second sensing period. The sensor driver transmits a first driving signal having a first frequency to the sensors in the first sensing period, and transmits a second driving signal having a second frequency different from the first frequency to the sensors in the second sensing period.

18 Claims, 39 Drawing Sheets

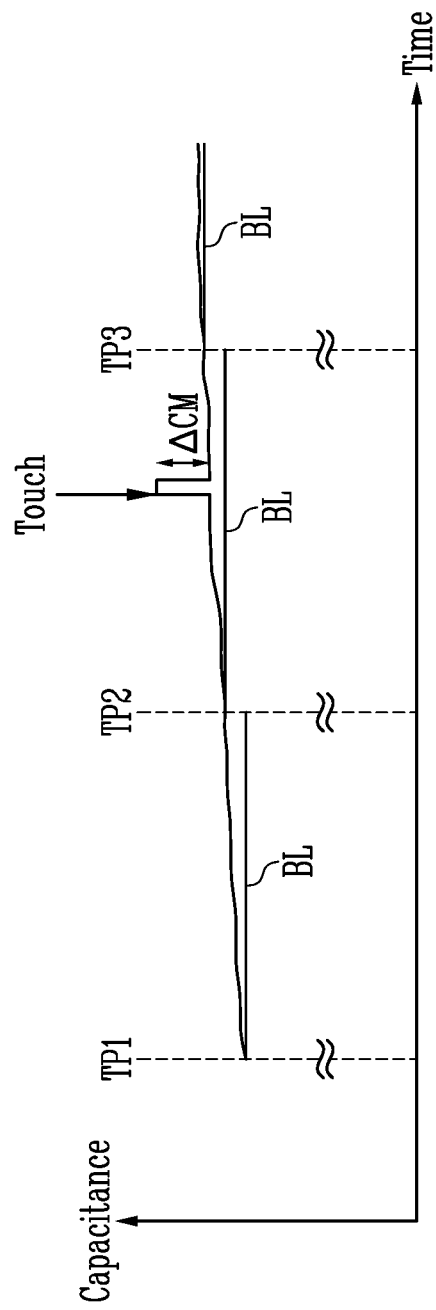

INPUT SENSING DEVICE AND DISPLAY DEVICE INCLUDING THE SAME

CROSS REFERENCE TO RELATED APPLICATION

The present application claims priority from and the benefit of Korean Patent Application 10-2021-0135286, filed on Oct. 12, 2021, which is hereby incorporated by reference for all purposes as if fully set forth herein.

BACKGROUND

Field

Embodiments of the present invention relate generally to an input sensing device and a display device including the same.

Discussion of the Background

With the development of information technologies, the importance of a display device which is a connection medium between a user and information increases. Accordingly, the use of display devices, such as a liquid crystal display device and an organic light emitting display device, is increasing.

A display device may include a display unit for displaying an image and a sensor unit for sensing a touch position. The sensor unit may be used for coordinate measurement of a touch position of an object or be used to check whether the object has approached.

The above information disclosed in this Background section is only for understanding of the background of the inventive concepts, and, therefore, it may contain information that does not constitute prior art.

SUMMARY

Embodiments provide an input sensing device and a display device which can accurately detect an input (e.g., a touch input) caused by an object.

Additional features of the inventive concepts will be set forth in the description which follows, and in part will be apparent from the description, or may be learned by practice of the inventive concepts.

An embodiment of the present invention provides a display device including: a display unit including pixels; a sensor unit overlapping with the display unit, the sensor unit including sensors; and a sensor driver configured to transmit a driving signal to the sensors and configured to receive sensing signals corresponding to the driving signal from the sensors. One sensing period includes a first sensing period and a second sensing period, and wherein the sensor driver transmits a first driving signal having a first frequency to the sensors in the first sensing period, and transmits a second driving signal having a second frequency different from the first frequency to the sensors in the second sensing period.

The sensor driver may sense a touch input, based on first sensing signals provided from the sensors, corresponding to the first driving signal, and determine whether the touch input is actually input, based on second sensing signals provided from the sensors, corresponding to the second driving signal.

The first sensing signals may represent capacitances of the sensors. The sensor driver may sense the touch input by comparing the capacitances with reference capacitances of the sensors, and periodically update the reference capacitances.

The reference capacitances may be changed according to a peripheral environment factor, and the peripheral environment factor may include a temperature.

The second frequency may be greater than the first frequency.

The first sensing signals provided from the sensors, corresponding to the first driving signal, may be sensitive to a touch input and a change in peripheral temperature, and the second sensing signals provided from the sensors, corresponding to the second driving signal, may be insensitive to the change in peripheral temperature.

When a change in the second sensing signals corresponding to the second driving signal is within a reference range, the sensor driver may determine that the touch input has not actually occurred.

The sensor driver may operate in a first mode when a peripheral temperature is higher than or equal to a reference temperature, and operate in a second mode when the peripheral temperature is lower than the reference temperature. The sensor driver may transmit only the first driving signal among the first and second driving signals to the sensors in the first mode, and sequentially transmit the first driving signal and the second driving signal to the sensors in the second mode.

The sensor driver may operate in the second mode, when an average of the reference capacitances of the sensors is smaller than a reference value.

The display device may further include a temperature sensor configured to measure the peripheral temperature.

The pixels may include light emitting elements. The display unit may further include an insulating layer covering the light emitting elements. The sensor unit may be directly formed on the insulating layer.

The display device may further include a display driver configured to drive the display unit in response to a horizontal synchronization signal. The first driving signal and the second driving signal may be synchronized with the horizontal synchronization signal.

The display device may further include a display driver configured to drive the display unit in response to a horizontal synchronization signal. The first driving signal and the second driving signal may be asynchronous with the horizontal synchronization signal.

Another embodiment of the present invention provides an input sensing device including: a sensor unit including sensors; and a sensor driver configured to transmit a driving signal to the sensors and configured to receive sensing signals corresponding to the driving signal from the sensors. One sensing period includes a first sensing period and a second sensing period, and wherein the sensor driver transmits a first driving signal having a first frequency to the sensors in the first sensing period, and transmits a second driving signal having a second frequency different from the first frequency to the sensors in the second sensing period.

The sensor driver may sense a touch input, based on first sensing signals provided from the sensors, corresponding to the first driving signal, and determine whether the touch input is actually input, based on second sensing signals provided from the sensors, corresponding to the second driving signal.

The second frequency may be greater than the first frequency.

The first sensing signals provided from the sensors, corresponding to the first driving signal, may be sensitive to a touch input and a change in peripheral temperature, and the second sensing signals provided from the sensors, corresponding to the second driving signal, may be insensitive to the change in peripheral temperature.

When a change in the second sensing signals corresponding to the second driving signal is within a reference range, the sensor driver may determine that the touch input has not actually occurred.

The sensor driver may operate in a first mode when a peripheral temperature is higher than or equal to a reference temperature, and operate in a second mode when the peripheral temperature is lower than the reference temperature. The sensor driver may transmit only the first driving signal among the first and second driving signals to the sensors in the first mode, and sequentially transmit the first driving signal and the second driving signal to the sensors in the second mode.

The sensor driver may operate in the second mode when an average of the reference capacitances of the sensors is less than a reference value.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 11 is a diagram illustrating a baseline setting block included in the sensor driver shown in FIGS. 10A and 10B.

DETAILED DESCRIPTION

Figure 1A:
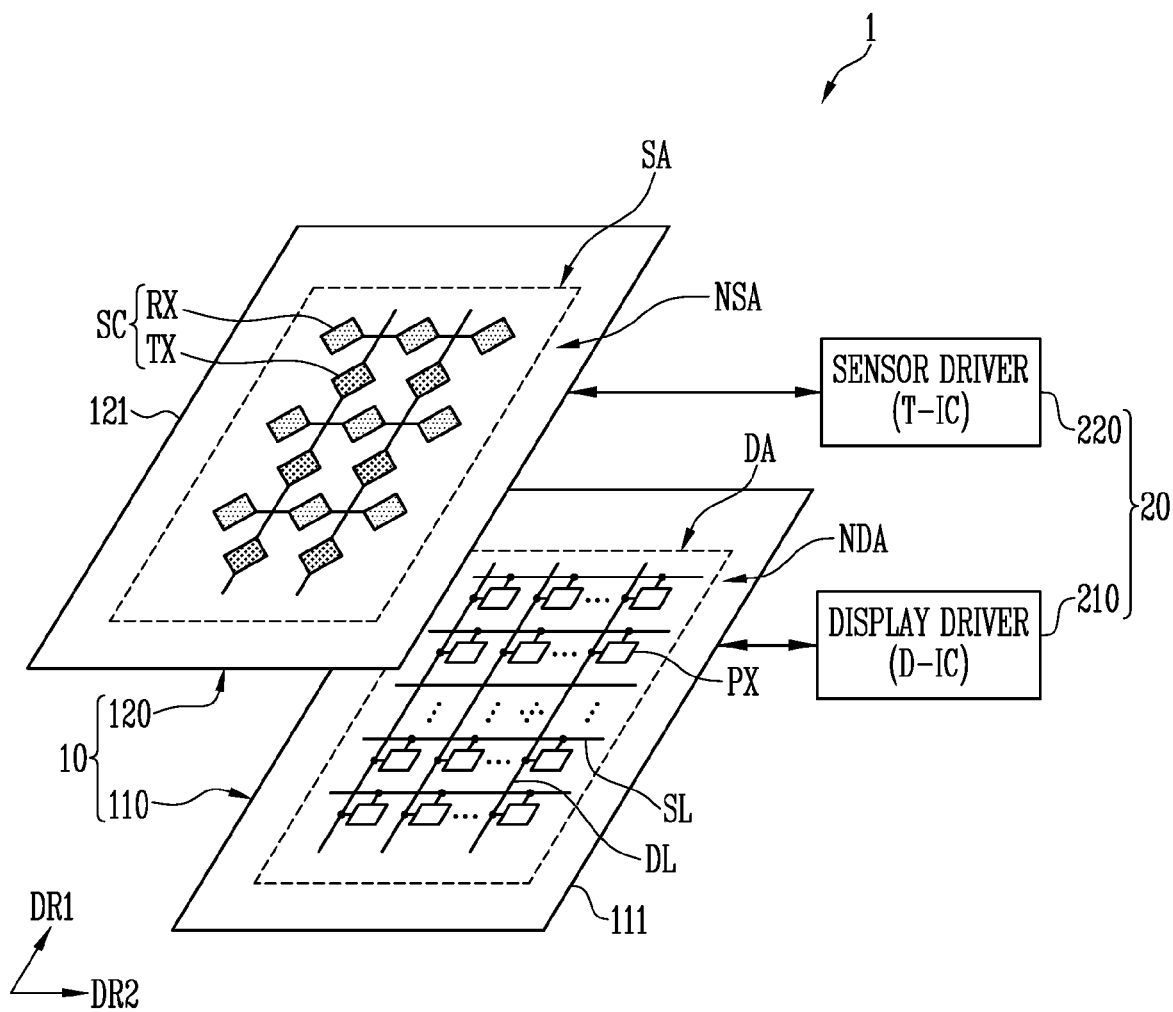
FIGS. 1A and 1B are diagrams illustrating a display device in accordance with embodiments of the present invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
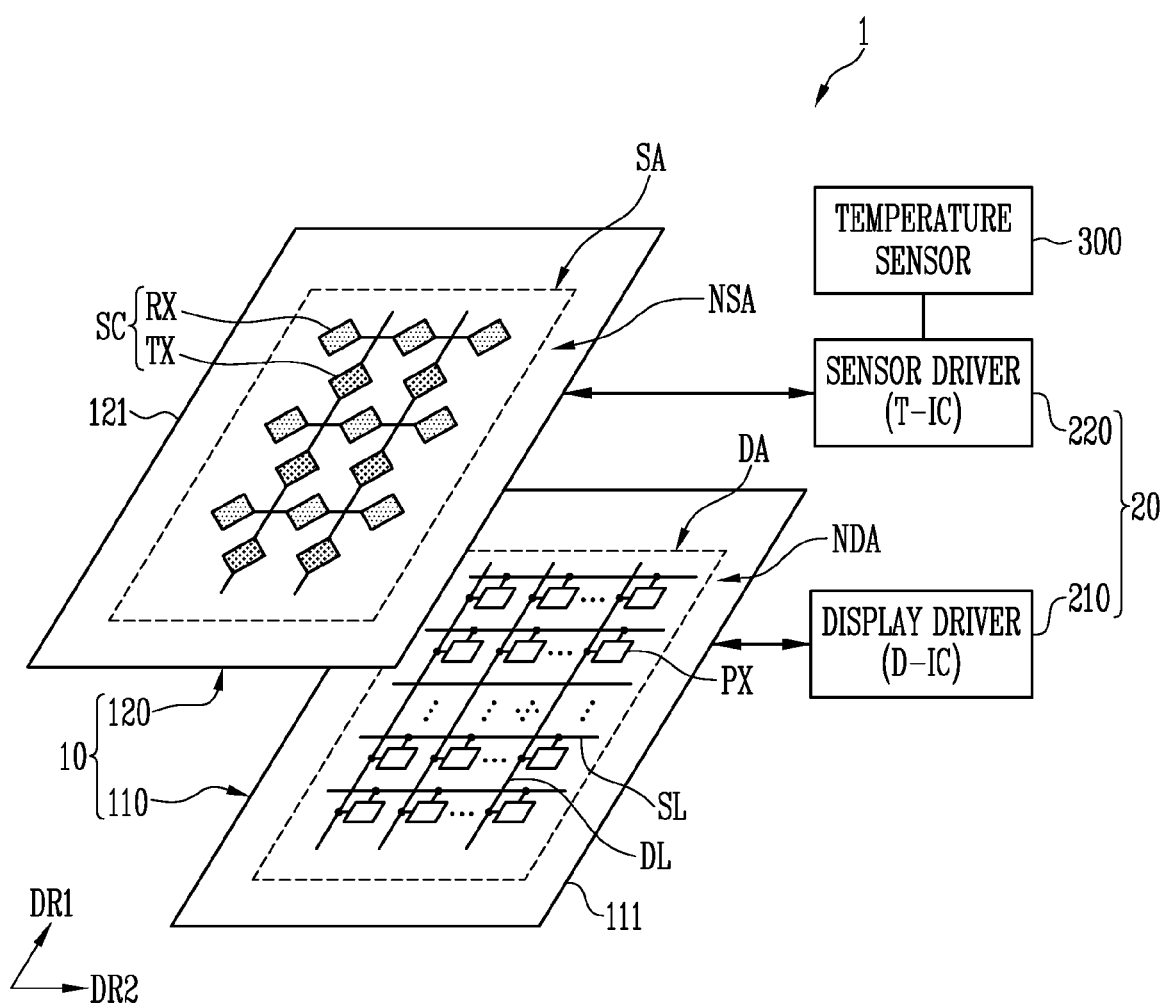

FIGS. 1A and 1B are diagrams illustrating a display device in accordance with embodiments of the present invention.

First, referring to FIG. 1A, the display device 1 may include a panel 10 and a driving circuit 20 for driving the panel 10.

The panel 10 may include a display unit 110 for displaying an image and a sensor unit 120 for sensing a touch, a pressure, a fingerprint, hovering, etc. For example, the panel 10 may include pixels PX and sensors SC located while overlapping with at least some of the pixels PX. In an embodiment, the sensors SC may include first sensors TX (or a driving electrode) and second sensors RX (or a sensing electrode). In another embodiment (e.g., a self-capacitance type), the sensors SC may be configured with one kind of sensors without distinguishing the first and second sensors TX and RX from each other.

The driving circuit 20 may include a display driver 210 for driving the display unit 110 and a sensor driver 220 for driving the sensor unit 120. For example, the pixels PX may display an image by using a display frame period as a unit. For example, the sensors SC may sense an input of a user by using a sensing frame period as a unit. The sensing frame period and the display frame period may be independent from each other, and may be different from each other. The sensing frame period and the display frame period may or may not be synchronized with each other. The sensor driver 220 along with the sensor unit 120 may constitute an input sensing device.

In some embodiments, after the display unit 110 and the sensor unit 120 are manufactured separately from each other, the display unit 110 and the sensor unit 120 may be disposed and/or coupled to overlap with each other in at least one area. Alternatively, in another embodiment, the display unit 110 and the sensor unit 120 may be integrally manufactured. For example, the sensor unit 120 may be formed directly on at least one substrate (e.g., an upper substrate and/or a lower substrate of a display panel, or a thin film encapsulation layer), or another insulating layer or one of various types of functional layers (e.g., an optical layer or a protective layer), which constitutes the display unit 110.

Although a case where the sensor unit 120 is disposed on a front surface (e.g., an upper surface on which an image is displayed) of the display unit 110 is illustrated in FIG. 1A, the position of the sensor unit 120 is not limited thereto. For example, in another embodiment, the sensor unit 120 may be disposed on a rear surface or both surfaces of the display unit 110. In still another embodiment, the sensor unit 120 may be disposed in at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA in which an image is displayed and a non-display area NDA at the periphery of the display area DA. In some embodiments, the display area DA may be disposed in a central area of the display unit 110, and the non-display area NDA is disposed in an edge area of the display unit 110 to surround the display area DA.

The display substrate 111 may be a rigid substrate or a flexible substrate, and the material or property of the display substrate 111 is not particularly limited. For example, the display substrate 111 may be a rigid substrate made of glass or tempered glass, or a flexible substrate configured with a thin film made of plastic or metal.

Scan lines SL and data lines DL, and the pixels PX connected to the scan lines SL and the data lines DL are disposed in the display area DA. Pixels PX are selected by a scan signal having a turn-on level, which is supplied from the scan lines SL, to be supplied with a data signal from the data lines DL, and emit light with a luminance corresponding to the data signal. Accordingly, an image corresponding to the data signal is displayed in the display area DA. In the present invention, the structure, driving method, and the like of the pixels PX are not particularly limited. For example, each of the pixels PX may be implemented as a pixel employing various structures and/or various driving methods, which are currently known in the art.

Various types of lines and/or a built-in circuit, connected to the pixels PX of the display area DA may be disposed in the non-display area NDA. In an example, a plurality of lines for supplying various power sources and various control signals to the display area DA may be disposed in the non-display area NDA. In addition, a scan driver and the like may be further disposed in the non-display area NDA.

In the present invention, the kind of the display unit 110 is not particularly limited. For example, the display unit 110 may be implemented as a self-luminescent display panel, such as an organic light emitting display panel. However, when the display unit 110 is implemented as a self-luminescent display panel, each of the pixels PX is not necessarily limited to a case where the pixel includes only an organic light emitting element. For example, a light emitting element of each of the pixels PX may be configured as an organic light emitting diode, an inorganic light emitting diode, a quantum dot/well light emitting diode, etc. A plurality of light emitting elements may be provided in each pixel. The plurality of light emitting elements may be connected in series, parallel, series/parallel, etc. Alternatively, the display unit 110 may be implemented as a non-light emitting display panel, such as a liquid crystal display panel. When the display unit 110 is implemented as a non-light emitting display panel, the display device 1 may additionally include a light source such as a back-light unit.

The sensor unit 120 may include a sensor substrate 121 and a plurality of sensors SC formed on the sensor substrate 121. The sensors SC may be disposed in a sensing area SA on the sensor substrate 121.

The sensor substrate 121 may include the sensing area SA capable of sensing a touch input or the like and a peripheral area NSA at the periphery of the sensing area SA. In some embodiments, the sensing area SA may be disposed to overlap with at least one area of the display area DA. In an example, the sensing area SA may be set as an area corresponding to the display area DA (e.g., an area overlapping with the display area DA), and the peripheral area NSA may be set as an area corresponding to the non-display area NDA (e.g., an area overlapping with the non-display area NDA). When a touch input or the like is provided on the display area DA, the touch input may be detected through the sensor unit 120.

The sensor substrate 121 may be a rigid or flexible substrate. In addition, the sensor substrate 121 may be configured with at least one insulating layer. Also, the sensor substrate 121 may be a transparent or translucent light transmission substrate, but the inventive concepts are not limited thereto. That is, in the present invention, the material and property of the sensor substrate 121 are not particularly limited. For example, the sensor substrate 121 may be a rigid substrate configured with glass or tempered glass, or a flexible substrate configured with a thin film made of plastic or metal. In some embodiments, at least one substrate (e.g., the display substrate 111, an encapsulation substrate, and/or a thin film encapsulation layer) constituting the display unit 110 or, at least one insulating layer or at least one functional layer, disposed at the inside and/or an outer surface of the display unit 110 may be used as the sensor substrate 121.

The sensing area SA is set as an area capable of reacting with a touch input (i.e., an active area of sensors). To this end, sensors SC for sensing a touch input or the like may be disposed in the sensing area SA. In some embodiments, the sensors SC may include first sensors TX and second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. In another embodiment, the extending direction and arrangement direction of the first sensors TX may follow another conventional configuration. Each of the first sensors TX may have a form in which first cells (or driving electrodes) having a relatively wide area and first bridges having a relatively narrow area are connected to each other. Although a case where each of the first cells has a diamond shape is illustrated in FIG. 1A, each of the first cells may be configured in various conventional shapes, including a circular shape, a quadrangular shape, a triangular shape, a mesh shape, and the like. For example, the first bridges may be integrally formed with the first cells on the same layer. In another embodiment, the first bridges may be formed in a layer different from that of the first cells, to electrically connect adjacent first cells to each other.

For example, each of the second sensors RX may extend in the second direction DR2. The second sensors RX may be arranged in the first direction DR1. In another embodiment, the extending direction and arrangement direction of the second sensors RX may follow another conventional configuration. Each of the second sensors RX may have a form in which second cells (or sensing electrodes) having a relatively wide area and second bridges having a relatively narrow area are connected to each other. Although a case where each of the second cells has a diamond shape is illustrated in FIG. 1A, each of the second cells may be configured in various conventional shapes, including a circular shape, a quadrangular shape, a triangular shape, a mesh shape, and the like. For example, the second bridges may be integrally formed with the second cells on the same layer. In another embodiment, the second bridges may be formed in a layer different from that of the second cells, to electrically connect adjacent second cells to each other.

In some embodiments, each of the first sensors TX and the second sensors RX may include at least one of a metal material, a transparent conductive material, and various other conductive materials, thereby having conductivity. In an example, the first sensors TX and the second sensors RX may include at least one of various metal materials, including gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. The first sensors TX and the second sensors RX may be configured in a mesh shape. Also, the first sensors TX and the second sensors RX may include at least one of various transparent conductive materials, including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and the like. In addition, the first sensors TX and the second sensors RX may include at least one of various conductive materials, thereby having conductivity. Also, each of the first sensors TX and the second sensors RX may be configured as a single layer or a multi-layer, and its sectional structure is not particularly limited.

Sensor lines for electrically connecting the first and second sensors TX and RX to the sensor driver 220, and the like may be concentrically disposed in the peripheral area NSA of the sensor unit 120.

The driving circuit 20 may include the display driver 210 for driving the display unit 110 and the sensor driver 220 for driving the sensor unit 120. In an embodiment, the display driver 210 and the sensor driver 220 may be configured as Integrated Chips (ICs) separate from each other. In another embodiment, at least a portion of the display driver 210 and at least a portion of the sensor driver 220 may be integrated together in one IC.

The display driver 210 is electrically connected to the display unit 110 to drive the pixels PX. For example, the display driver 210 may include a data driver 12 and a timing controller 11, and a scan driver 13 may be separately mounted in the non-display area NDA of the display unit 110 (see FIG. 20). In another embodiment, the display driver 210 may include the whole or at least a portion of the data driver 12, the timing controller 11, and the scan driver 13.

The sensor driver 220 is electrically connected to the sensor unit 120 to drive the sensor unit 120. The sensor driver 220 may include a sensor transmitter and a sensor receiver. In some embodiments, the sensor transmitter and the sensor receiver may be integrated in one IC, but the present invention is not limited thereto.

In an embodiment, the display device 1 may further include a temperature sensor 300. The temperature sensor 300 may measure a peripheral temperature of the display device 1 or measure an internal temperature of the display device 1. The arrangement position of the temperature sensor 300 may be variously changed within a range in which the peripheral temperature or internal temperature of the display device 1 can be measured.

In some embodiments, the sensor driver 220 may operate in a first mode or a second mode, based on the peripheral temperature (or internal temperature). In an embodiment, when the peripheral temperature is a reference temperature or higher (e.g., a room temperature), the sensor driver 220 may operate in the first mode. For example, in the first mode, the sensor driver 220 may sense an input of a user by using a first driving signal (or main driving signal) having a first frequency (or main frequency). In an embodiment, when the peripheral temperature is lower than the reference temperature (e.g., −20° C. or −10° C.), the sensor driver 220 may operate in the second mode. For example, in the second mode, the sensor driver 220 senses the input of the user by using the first driving signal having the first frequency, and may determine whether the sensed input is a real input by using a second driving signal (or auxiliary driving signal) having a second frequency (or auxiliary frequency).

Although later described with reference to FIG. 15A, when a touch input of a user occurs under a condition in which the peripheral temperature is relatively low, a temperature of the sensor unit 120 (e.g., one area of the sensor unit 120, in which the touch input occurs) may be changed by a body temperature of the user, and a ghost touch may occur due to the change in the temperature of the sensor unit 120 (and a re-change in the temperature after touch release). That is, although any real touch input caused by the user does not occur, the sensor driver 220 may determine that a touch input has occurred. Therefore, the sensor driver 220 may determine whether the touch input is a real input (or ghost touch) by using the second driving signal having the second frequency, which is insensitive to a temperature change. For example, when the touch input is determined as the ghost touch, the sensor driver 220 neglects the touch input, and may not transmit information on the touch input to the outside (e.g., an external application processor or the like).

Figure 2:
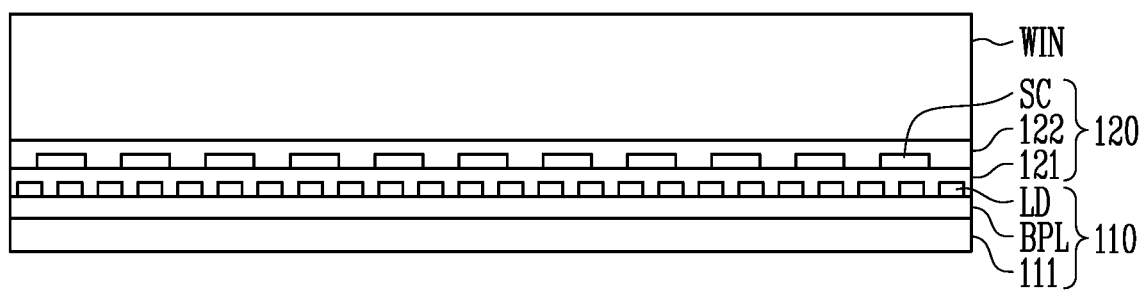
FIG. 2 is a sectional view illustrating an embodiment of the display device shown in FIGS. 1A and 1B.

FIG. 2 is a sectional view illustrating an embodiment of the display device shown in FIGS. 1A and 1B.

Referring to FIGS. 1A, 1B, and 2, the sensor unit 120 may be stacked on the top of the display unit 110, and a window WIN may be stacked on the top of the sensor unit 120.

The display unit 110 may include a display substrate 111, a circuit element layer BPL formed on the display substrate 111, and light emitting elements LD formed on the circuit element layer BPL. The circuit element layer BPL may include pixel circuits (e.g., a transistor and a capacitor) for driving light emitting elements LD of pixels PX, scan lines SL, data lines DL, and the like.

The sensor unit 120 may include a sensor substrate 121, sensors SC formed on the sensor substrate 121, and a protective layer 122 covering the sensors SC. In the embodiment shown in FIG. 2, the sensor substrate 121 may be illustrated in the form of an encapsulation layer covering the pixels PX. In another embodiment, the sensor substrate 121 may exist separately from the encapsulation layer covering the pixels PX.

The window WIN is a protective member disposed at the uppermost end of the module of the display device 1, and may be substantially a transparent light transmission substrate. The window WIN may have a multi-layered structure selected from a glass substrate, a plastic film, and a plastic substrate. The window WIN may include a rigid or flexible material, and the material constituting the window WIN is not particularly limited.

Although not shown in the drawing, the display device 1 may further include a polarizing plate (or another kind of anti-reflection layer) for preventing reflection of external light between the window WIN and the sensor unit 120.

Figure 3:
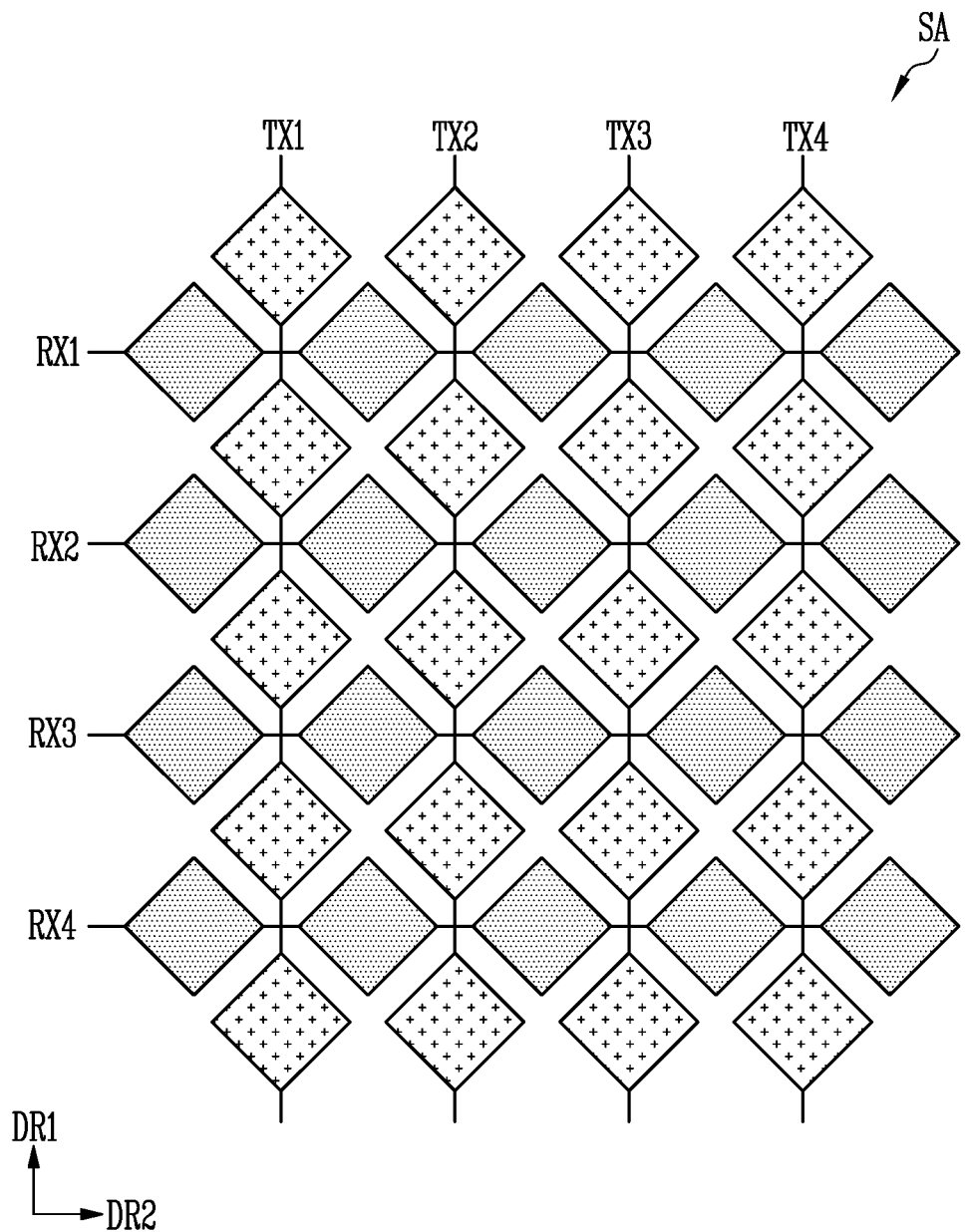
FIG. 3 is a diagram illustrating an embodiment of sensors included in the display device shown in FIG. 2.

FIG. 3 is a diagram illustrating an embodiment of sensors included in the display device shown in FIG. 2.

Referring to FIGS. 1A, 1B, 2, and 3, first sensors TX1, TX2, TX3, and TX4 and second sensors RX1, RX2, RX3, and RX4, which are located in the sensing area SA, are exemplarily illustrated. For convenience of description, it is assumed that four first sensors TX1 to TX4 and four second sensors RX1 to RX4 are disposed in the sensing area SA. A few tens to a few hundreds of first and second sensors TX and RX may be disposed in an actual display device 1.

Descriptions of the first sensors TX1 to TX4 and the second sensors RX1 to RX4 are identical to those of the first sensors TX and the second sensors RX, which are shown in FIG. 1A, and therefore, overlapping descriptions will be omitted.

Figure 4:
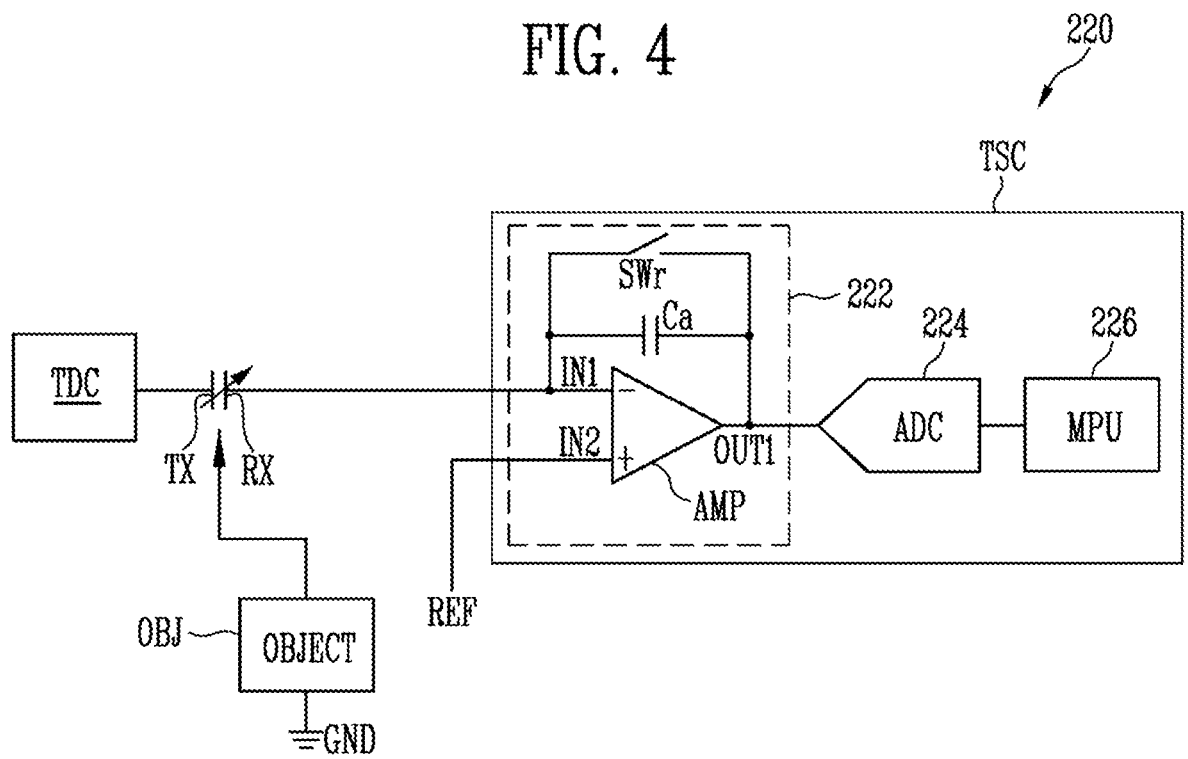
FIGS. 4 and 5 are diagrams illustrating a mutual sensing period.
Figure 5:
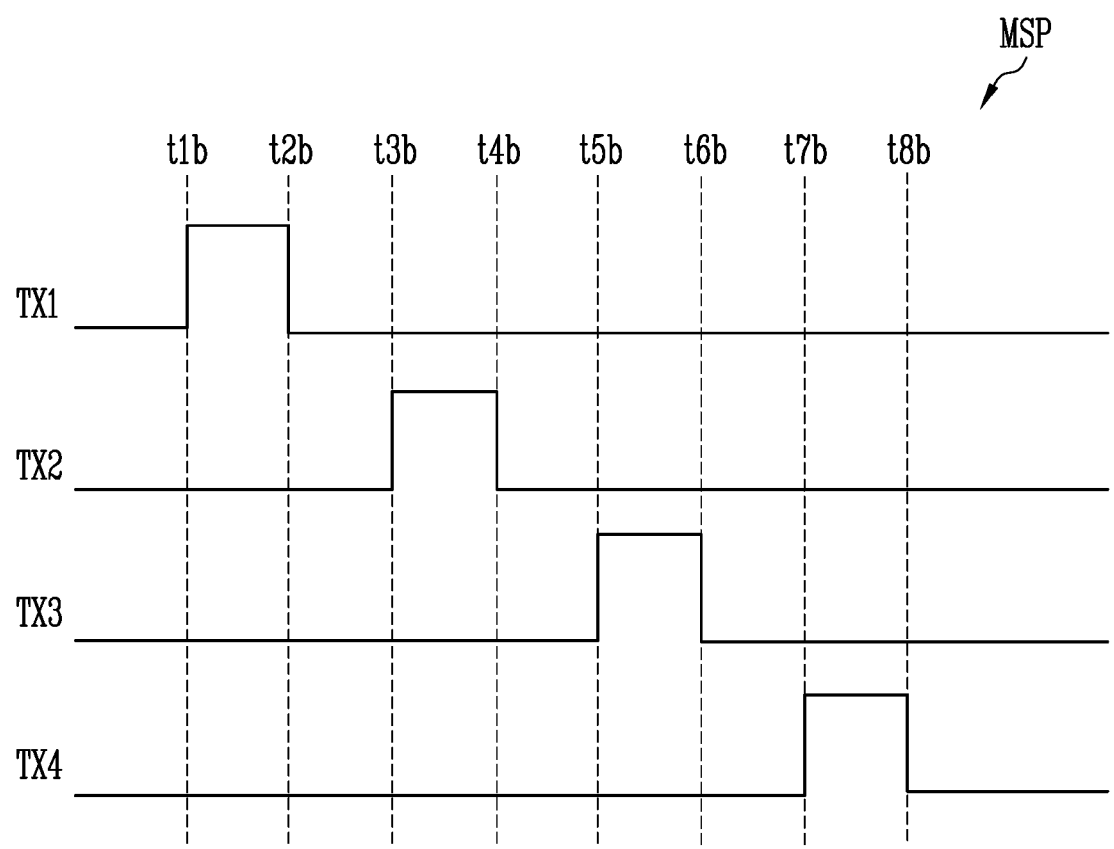

FIGS. 4 and 5 are diagrams illustrating a mutual sensing period.

Referring to FIGS. 1A, 1B, and 2 to 5, the mutual sensing period MSP may be a period in which the sensor unit 120 is driven by the sensor driver 220 in a mutual capacitance mode. In FIG. 4, a configuration of the sensor unit 120 and the sensor driver 220 will be illustrated based on any one sensor channel 222.

The sensor driver 220 may include a sensor receiver TSC and a sensor transmitter TDC. In the mutual sensing period MSP, the sensor transmitter TDC may be connected to the first sensors TX, and the sensor receiver TSC may be connected to the second sensors RX.

The sensor receiver TSC may include an operational amplifier AMP, an analog-to-digital converter 224, and a processor 226. In an example, each sensor channel 222 may be implemented as an analog front end (AFE) including at least one operational amplifier AMP. The analog-to-digital converter 224 and the processor 226 may be provided for each sensor channel 222, and be shared by a plurality of sensor channels 222.

A first input terminal IN1 of the operational amplifier AMP may be connected to a corresponding second sensor, and a second input terminal IN2 of the operational amplifier AMP may be connected to a reference signal REF. For example, the first input terminal IN1 may be an inverting terminal, and the second input terminal IN2 may be a non-inverting terminal. The reference signal REF may be a ground voltage or a voltage having a specific magnitude. In some embodiments, the reference signal REF may be a signal provided through a second sensor (e.g., an adjacent second sensor) different from a corresponding second sensor.

The analog-to-digital converter 224 may be connected to an output terminal OUT1 of the operational amplifier AMP. The analog-to-digital converter 224 may convert an output of the operational amplifier AMP into a sensing value in a digital form and output the sensing value. A capacitor Ca and a switch SWr may be connected in parallel to each other between the first input terminal IN1 and the output terminal OUT1.

Referring to FIG. 5, during the mutual sensing period MSP, the sensor driver 220 (e.g., the sensor transmitter TDC) may sequentially supply first driving signals (or a signal for sensing) to the first sensors TX1 to TX4. For example, first driving signals may be supplied twice to the first sensor TX1 (t1b and t2b), first driving signals may be supplied twice to the first sensor TX2 (t3b and t4b), first driving signals may be supplied twice to the first sensor TX3 (t5b and t6b), and first driving signals may be supplied twice to the first sensor TX4 (t7b and t8b). In some embodiments, a number of times first driving signals are supplied each of the first sensors TX1 to TX4 may be greater than twice.

Each of the first driving signals may correspond to a rising transition and/or a falling transition. For example, a first driving signal at a time t1b may correspond to the rising transition. That is, the first driving signal at the time t1b may rise from a low level to a high level. A first driving signal at a time t2b may correspond to the falling transition. That is, the first driving signal at the time t2b may fall from the high level to the low level.

The sensor receiver TSC may include a plurality of sensor channels 222 connected to a plurality of second sensors RX. Each of the sensor channels 222 may receive first sensing signals (or first sampling signals) corresponding to the first driving signals from a corresponding second sensor. For example, the sensor channels 222 connected to the second sensors RX1 to RX4 may independently receive the first sensing signals, corresponding to the first driving signal applied to the first sensor TX1 at the time t1b. Also, the sensor channels 222 connected to the second sensors RX1 to RX4 may independently receive the first sensing signals, corresponding to the first driving signal applied to the first sensor TX1 at the time t2b.

On the sensing area SA, mutual capacitances between the first sensors TX1 to TX4 and the second sensors RX1 to RX4 may be different from each other according to the position of an object OBJ, such as a finger of a user, and accordingly, the first sensing signals received by the sensor channels 222 may be different from each other. A touch position of the object OBJ may be detected by using such a difference between the first sensing signals.

The sensor channel 222 may generate an output signal corresponding to a voltage difference between the first and second input terminals IN1 and IN2. For example, the sensor channel 222 may amplify and output a difference voltage between the first and second input terminals IN1 and IN2 to a degree corresponding to a predetermined gain.

In some embodiments, the sensor channel 222 may be implemented as an integrator. The capacitor Ca and the switch SWr may be connected in parallel to each other between the first input terminal IN1 and the output terminal OUT1 of the operational amplifier AMP. For example, the switch SWr may be turned on before a first sampling signal is received, so that charges of the capacitor Ca are initialized. The switch SWr may be in a turn-off state at the time at which the first sampling signal is received.

The analog-to-digital converter 224 converts an analog signal input from each of the sensor channels 222 into a digital signal. The processor 226 may detect a user input by analyzing the digital signal. The processor 226 may be included in an application processor.

Figure 6:
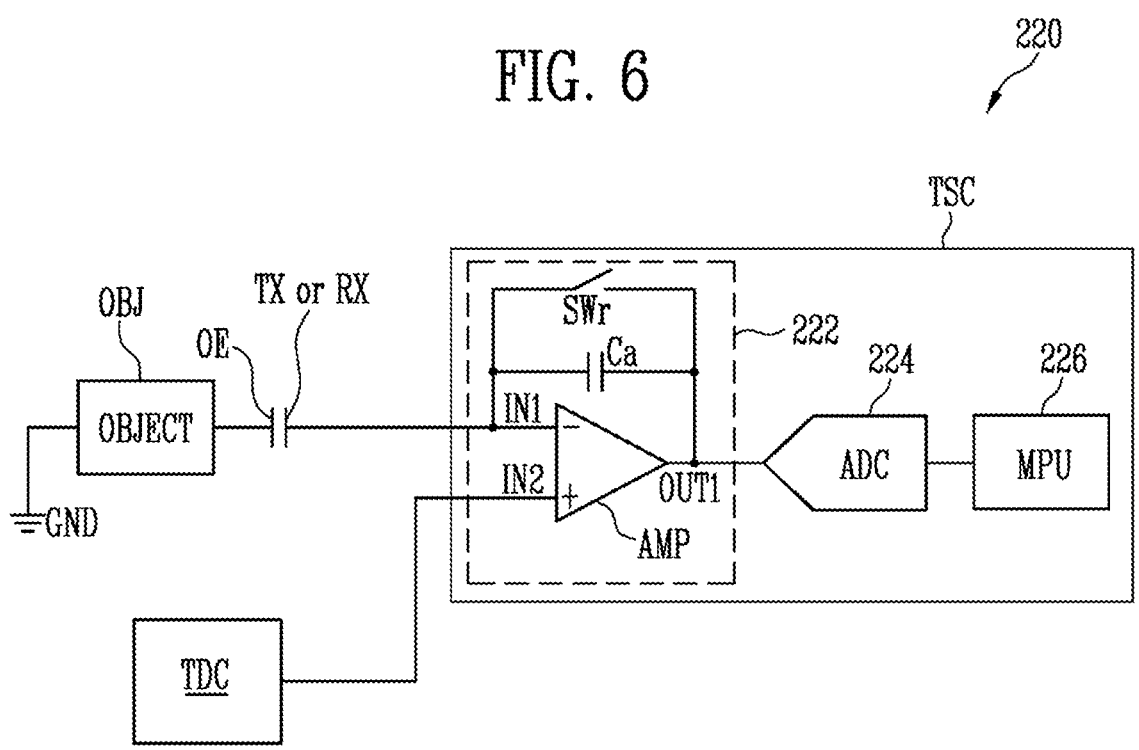
FIGS. 6, 7, and 8 are diagrams illustrating a first self-sensing period and a second self-sensing period.
Figure 7:
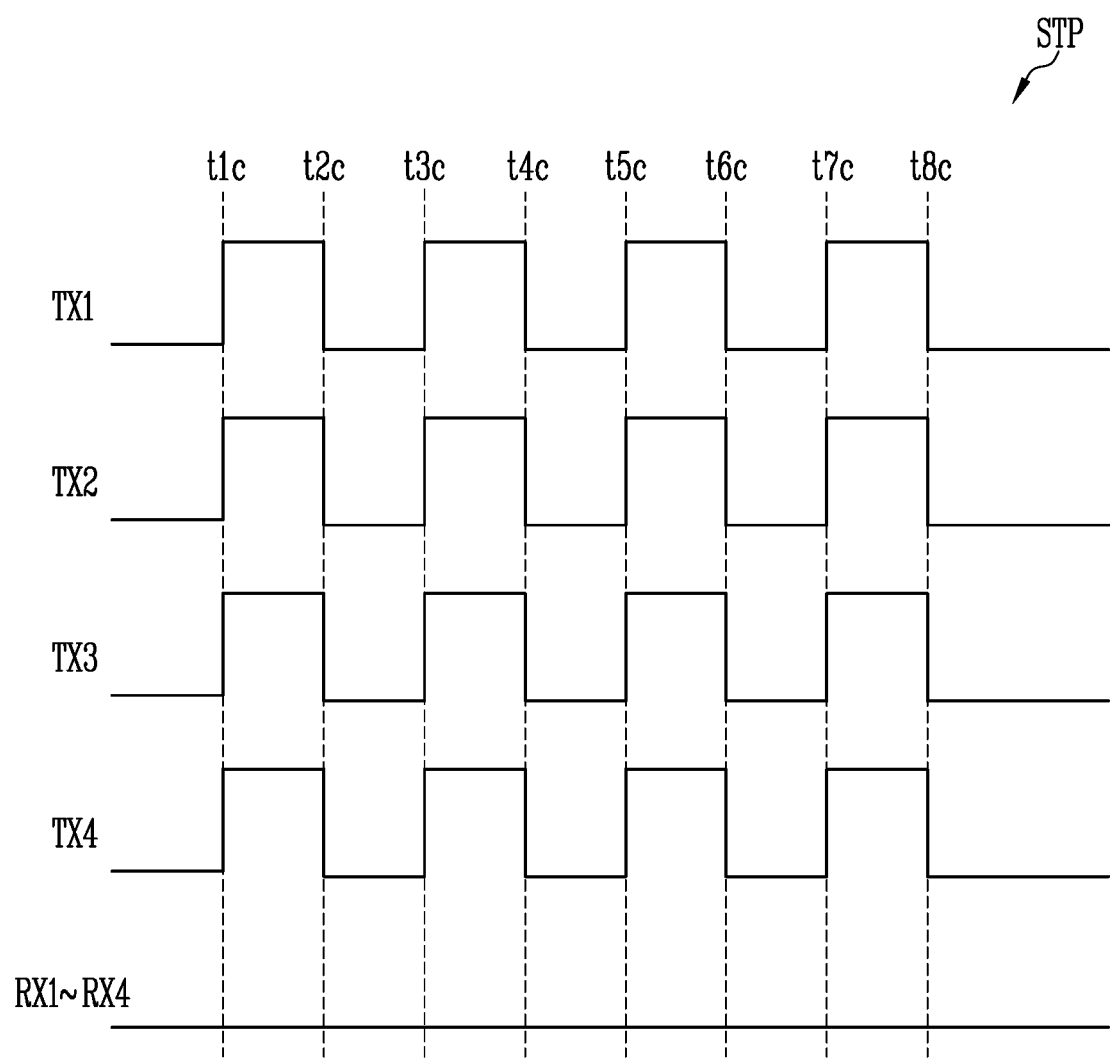
Figure 8:
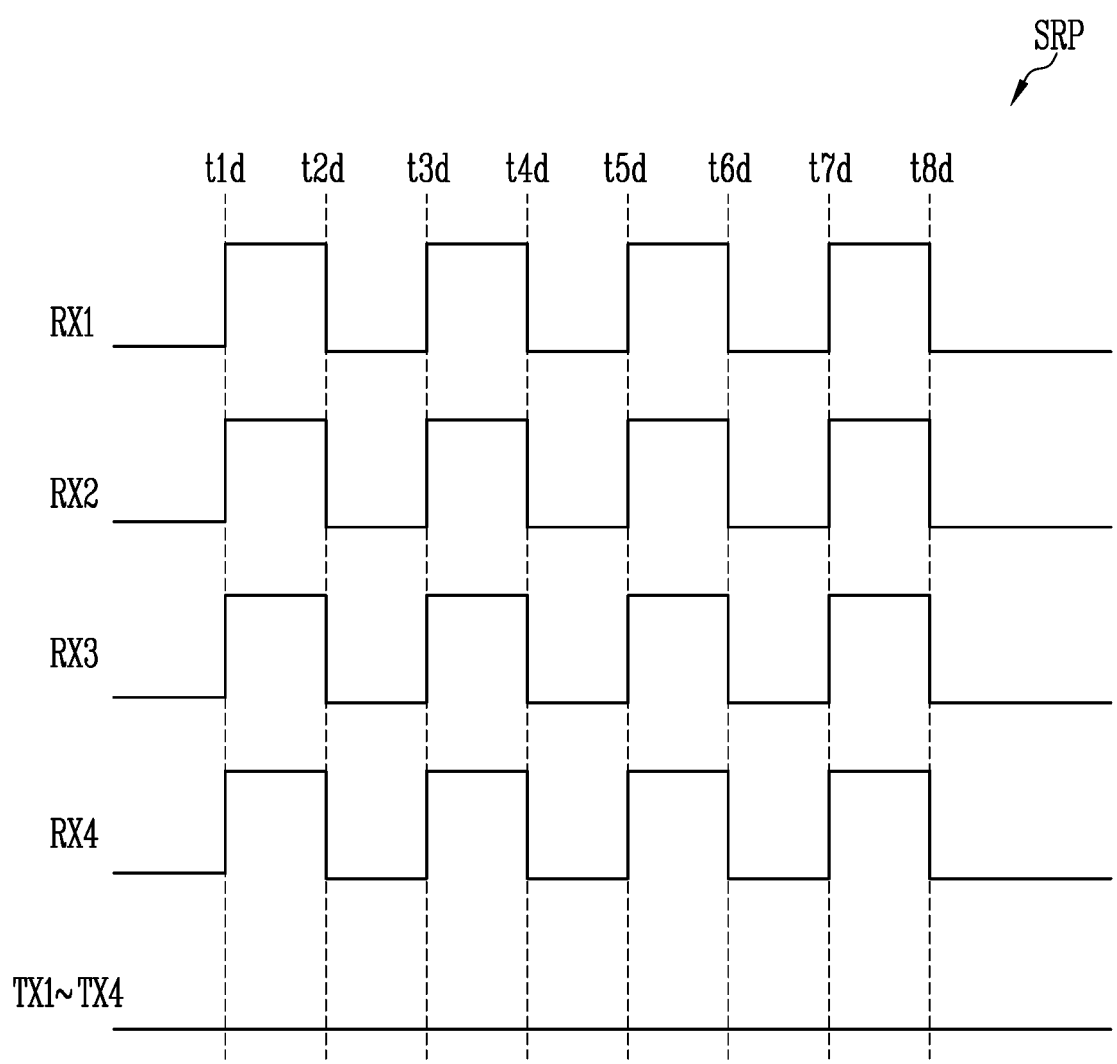

FIGS. 6 to 8 are diagrams illustrating a first self-sensing period and a second self-sensing period. In FIG. 6, a configuration of the sensor unit 120 and the sensor driver 220 will be illustrated based on any one sensor channel 222. An internal configuration of a sensor receiver TSC and a sensor transmitter TDC may be substantially identical to the case shown in FIG. 4, and therefore, overlapping descriptions will be omitted. Hereinafter, portions different from the case shown in FIG. 4 will be mainly described.

Referring to FIGS. 6 to 8, the first self-sensing period STP may be a period in which the sensor unit 120 is driven the sensor driver 220 in a self-capacitance mode. In the first self-sensing period STP, the sensor transmitter TDC may be connected to a second input terminal IN2 of each sensor channel 222, and a corresponding first sensor may be connected to a first input terminal IN1 of each sensor channel 222. In another embodiment, the sensor transmitter TDC may be connected to the first input terminal IN1. The reference signal REF (see FIG. 4) may be applied to the second input terminal IN2.

An example will be described with reference to FIGS. 6 and 7. During the first self-sensing period STP, the sensor transmitter TDC may supply a driving signal to the second input terminal IN2 of each sensor channel 222. The driving signal may be supplied to the first sensor connected to the first input terminal IN1 according to characteristics of an operational amplifier AMP. In an embodiment, the sensor driver 220 may simultaneously supply driving signals to the first sensors TX1 to TX4 during the first self-sensing period STP. For example, referring to FIG. 7, the driving signals may be simultaneously supplied to the first sensors TX1 to TX4 at each of times t1c, t2c, t3c, t4c, t5c, t6c, t7c, and t8c. The second sensors RX1 to RX4 may receive a separate reference signal (e.g., a ground voltage), or be in a floating state. Each of the driving signals may correspond to a rising transition and/or a falling transition.

The first sensors TX1 to TX4 may have a self-capacitance. When an object OBJ, such as a finger of a user, comes close to the first sensors TX1 to TX4, the self-capacitance of the first sensors TX1 to TX4 may be changed according to a capacitance formed on an object surface OE. The driving signal to which the self-capacitance is reflected may be referred to as a sensing signal (or sampling signal). A touch position of the object OBJ in the second direction DR2 may be detected by using a difference between sensing signals with respect to the first sensors TX1 to TX4 (see FIG. 3).

Referring to FIGS. 6 and 8, the second self-sensing period SRP may be a period in which the sensor unit 120 and the sensor driver 220 are driven in the self-capacitance mode. In the second self-sensing period SRP, the sensor transmitter TDC may be connected to the second input terminal IN2 of each sensor channel 222, and a corresponding second sensor may be connected to the first input terminal IN1 of each sensor channel 222.

For example, during the second self-sensing period SRP, the sensor transmitter TDC may supply a driving signal to the second input terminal IN2 of each sensor channel 222. The driving signal may be supplied to the second sensor connected to the first input terminal IN1 according to characteristics of the operational amplifier AMP. In an embodiment, the sensor driver 220 may simultaneously supply driving signals to the second sensors RX1 to RX4 during the second self-sensing period SRP. For example, referring to FIG. 8, the driving signals may be simultaneously supplied to the second sensors RX1 to RX4 at each of times t1d, t2d, t3d, t4d, t5d, t6d, t7d, and t8d. The first sensors TX1 to TX4 may receive a separate reference signal (e.g., a ground voltage), or be in the floating state. Each of the driving signals may correspond to a rising transition and/or a falling transition.

The second sensors RX1 to RX4 may have a self-capacitance. When an object OBJ, such as a finger of a user, comes close to the second sensors RX1 to RX4, the self-capacitance of the second sensors RX1 to RX4 may be changed according to a capacitance formed on an object surface OE. The driving signal to which the self-capacitance is reflected may be referred to as a sensing signal (or sampling signal). A touch position of the object OBJ in the first direction DR1 may be detected by using a difference between sensing signals with respect to the second sensors RX1 to RX4 (see FIG. 3).

As described above, the sensor driver 220 may be driven in at least one of the mutual sensing period MSP, the first self-sensing period STP, and the second self-sensing period SRP with respect to the whole of the sensing area SA of the sensor unit 120 (see FIGS. 5, 7, and 8).

Figure 9:
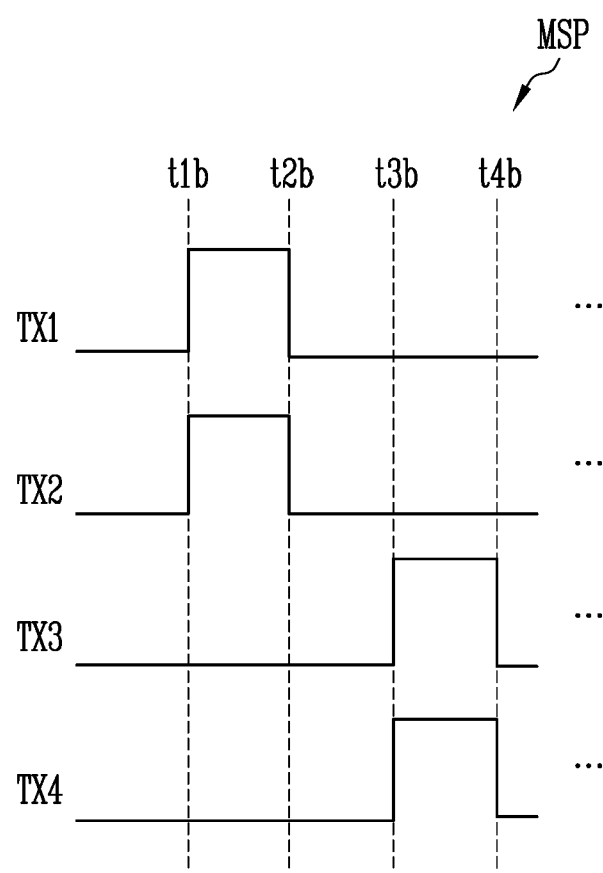
FIG. 9 is a diagram illustrating a sensing method in accordance with another embodiment of the present invention.

FIG. 9 is a diagram illustrating a sensing method in accordance with another embodiment of the present invention.

Referring to FIGS. 1A, 1B, and 4 to 9, the sensor driver 220 may transmit a driving signal to the sensing area SA of the sensor unit 120 by using p sensors as a unit.

For example, as shown in FIG. 9, the sensor driver 220 may transmit a driving signal by using two first sensors as a unit in the mutual sensing period MSP. Here, p may be 2. For example, driving signals may be simultaneously supplied to two sensors among the first sensors TX1 to TX4, and then driving signals may be simultaneously supplied to next two first sensors.

In an actual display device in which a few tens to a few hundreds of first sensors TX are provided, p may be about 4. For example, driving signals may be simultaneously supplied to four first sensors TX1 to TX4, and then driving signals may be simultaneously supplied to next four first sensors.

Figure 10A:
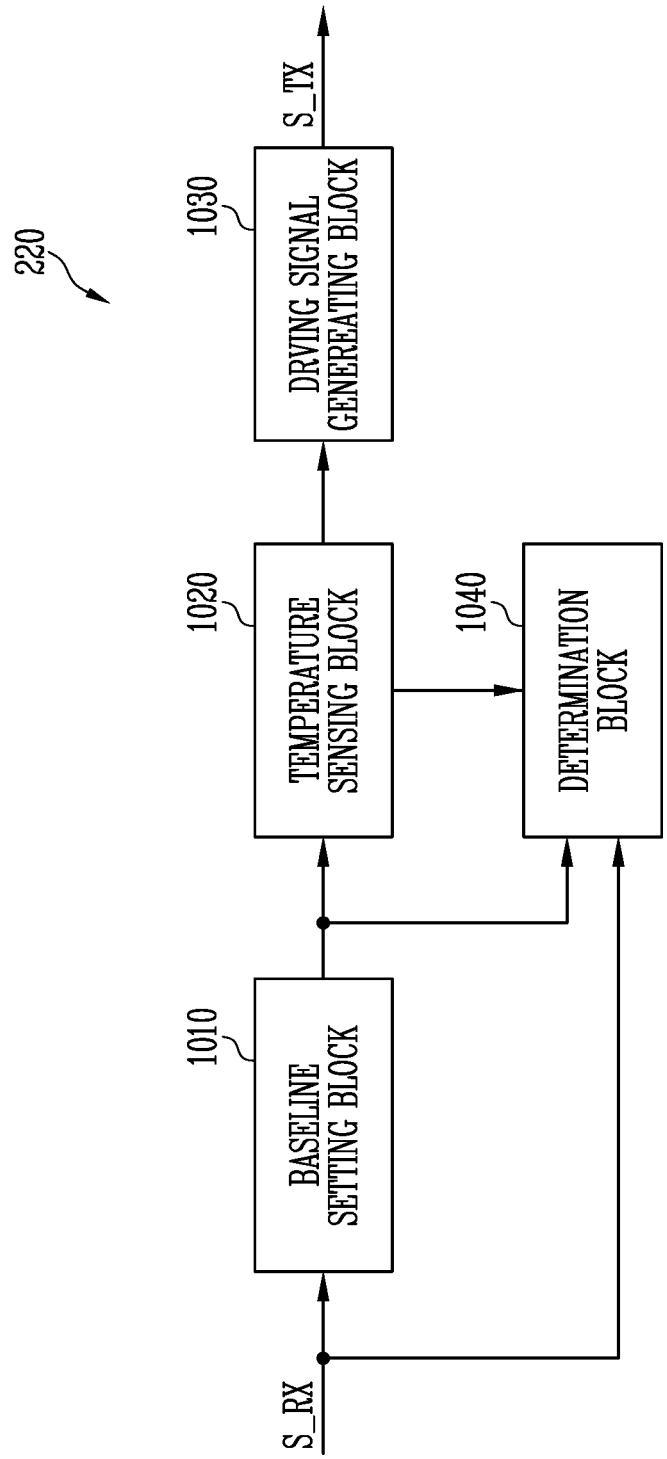
FIGS. 10A and 10B are diagrams illustrating an embodiment of a sensor driver included in the display device shown in FIGS. 1A and 1B.
Figure 10B:
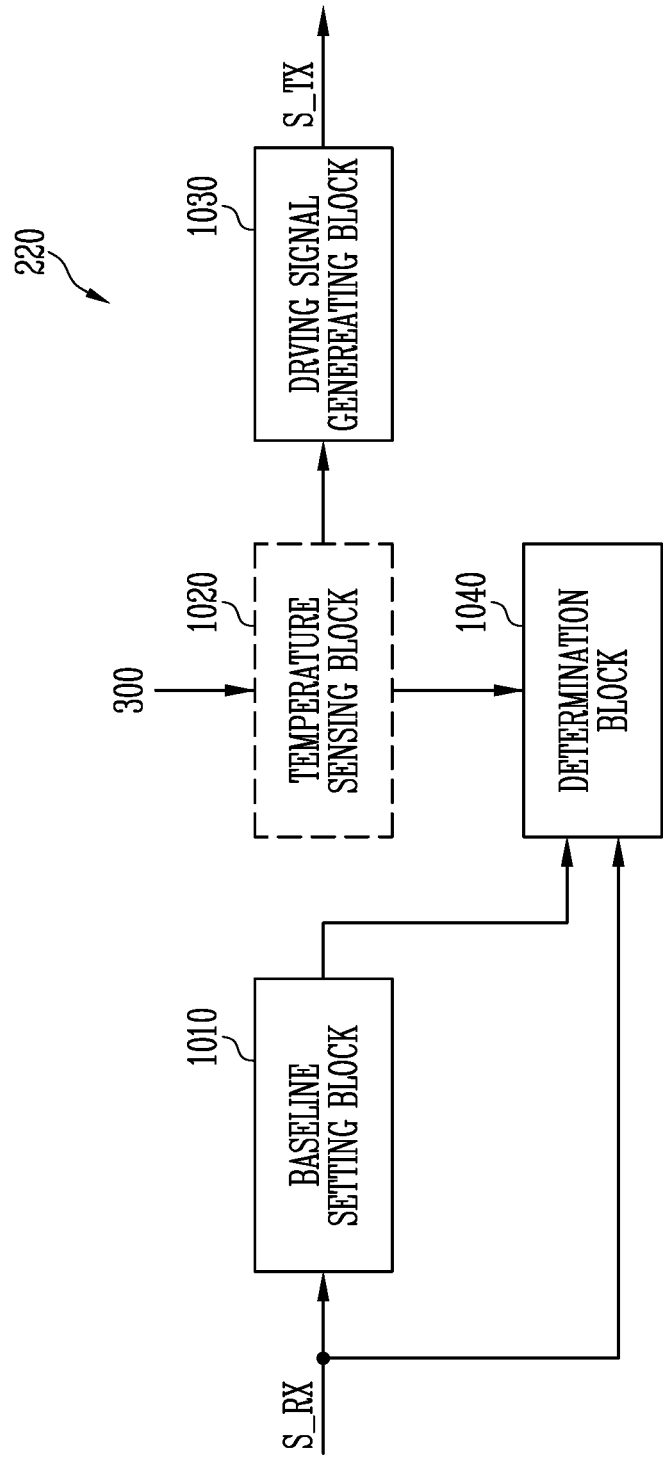
Figure 12:
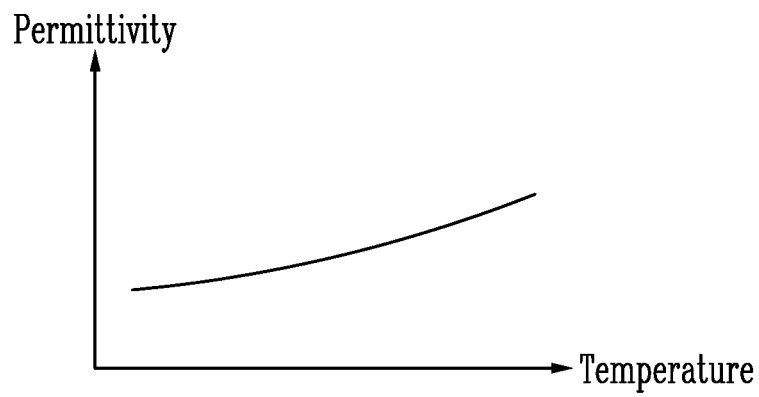
FIG. 12 is a graph illustrating a relationship between permittivity and temperature.
Figure 13:
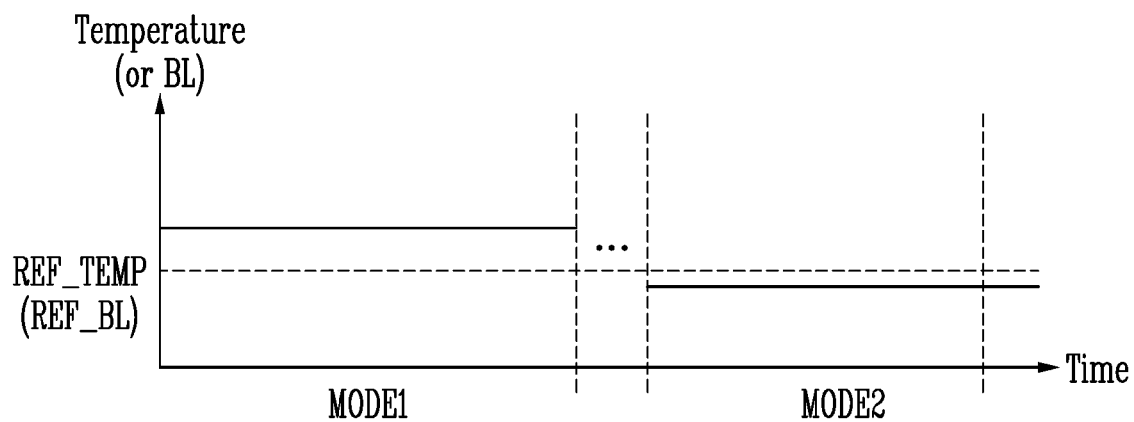
FIG. 13 is a diagram illustrating a mode of the sensor driver shown in FIGS. 10A and 10B.
Figure 14A:
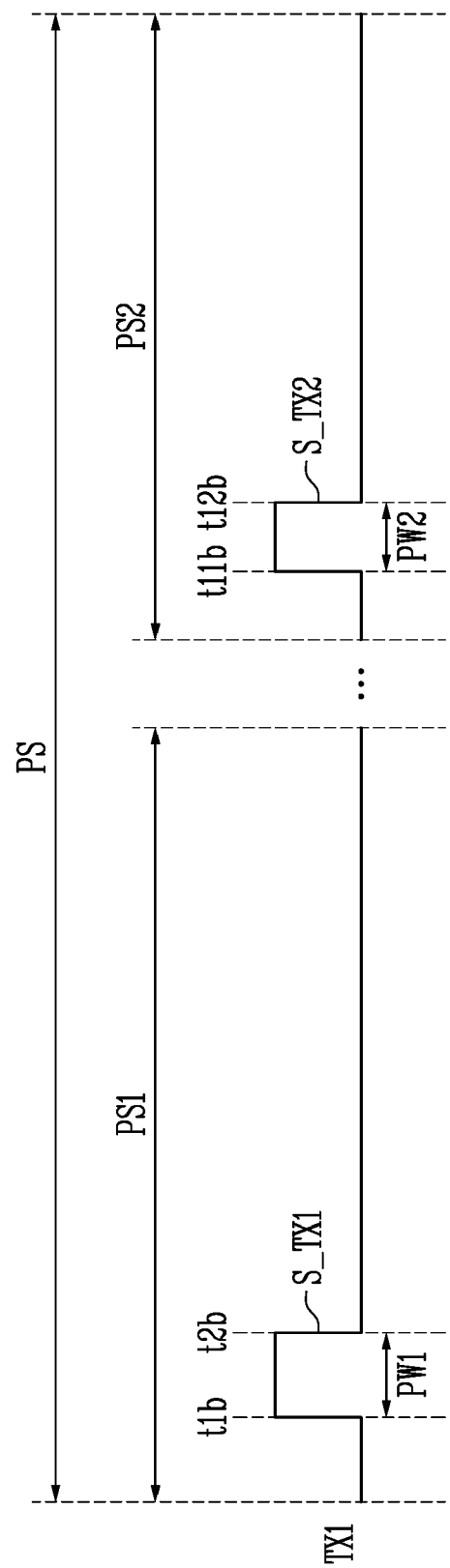
FIGS. 14A, 14B, and 14C are diagrams illustrating an operation of the sensor driver in a second mode.
Figure 14B:
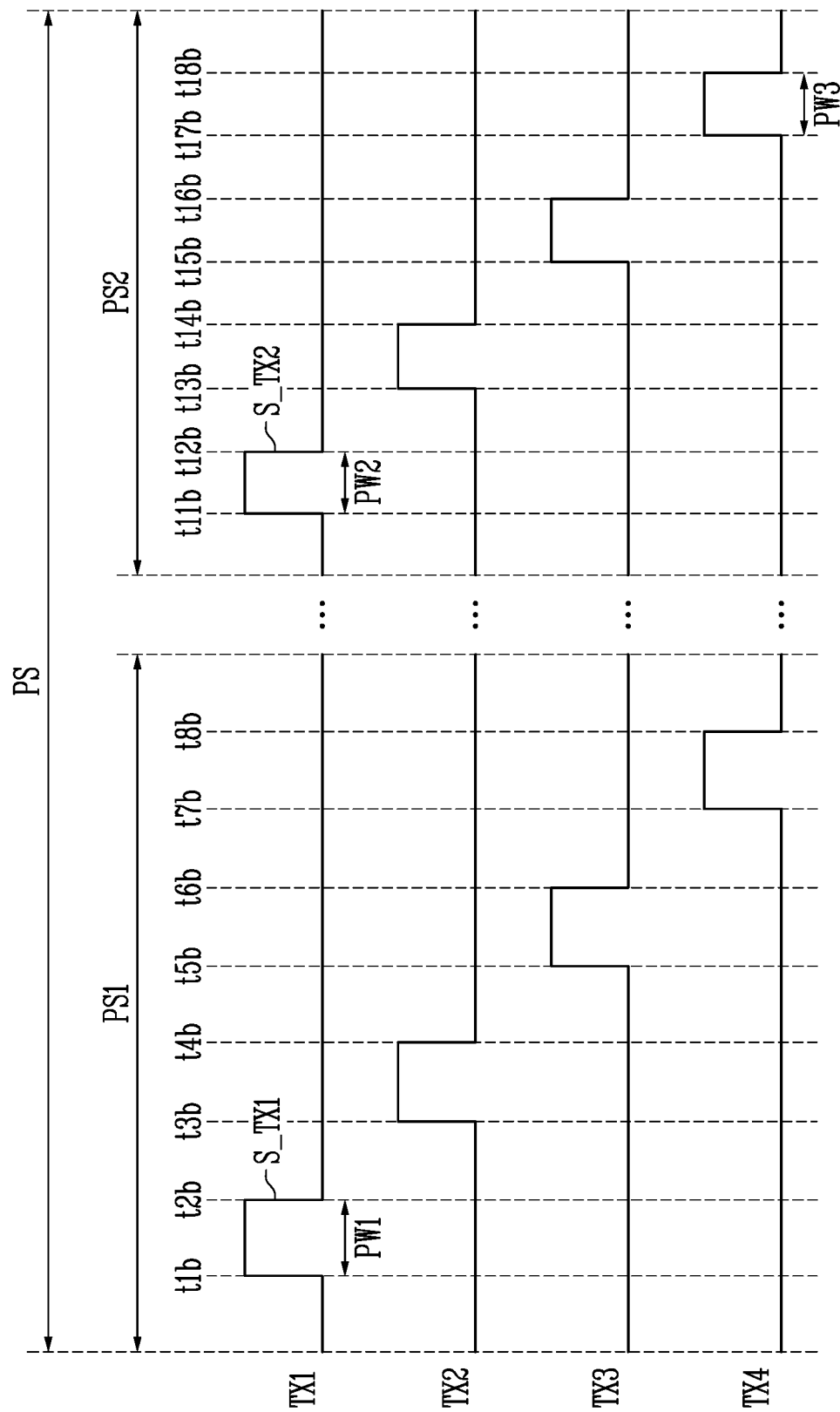
Figure 14C:
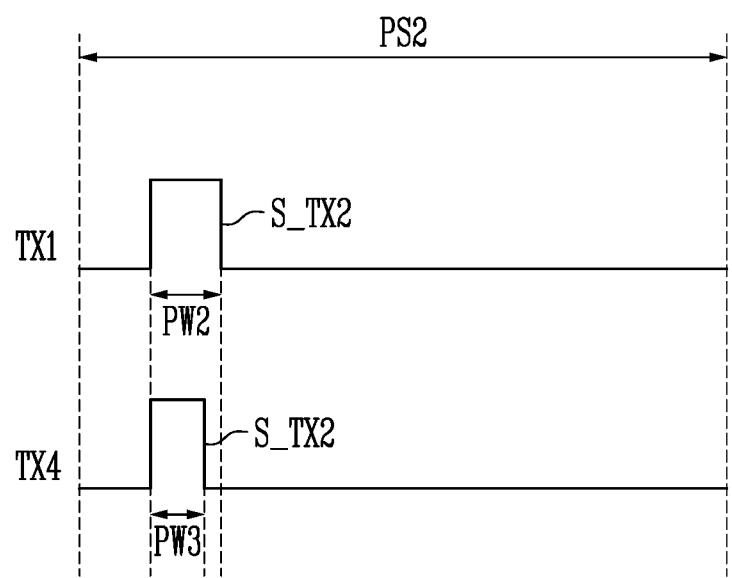

FIGS. 10A and 10B are diagrams illustrating an embodiment of the sensor driver included in the display device shown in FIGS. 1A and 1B. In FIGS. 10A and 10B, other embodiments of the sensor driver 220 are illustrated in relation to peripheral temperature sensing. FIG. 11 is a diagram illustrating a baseline setting block included in the sensor driver shown in FIGS. 10A and 10B. FIG. 12 is a graph illustrating a relationship between permittivity and temperature. FIG. 13 is a diagram illustrating a mode of the sensor driver shown in FIGS. 10A and 10B. FIGS. 14A to 14C are diagrams illustrating an operation of the sensor driver in a second mode.

First, referring to FIGS. 1A, 3, and 10A, the sensor driver 220 may include a baseline setting block 1010, a temperature sensing block 1020 (or mode determination block, or control block), a driving signal generating block 1030, and a determination block 1040.

The baseline setting block 1010 may set a baseline BL, based on sensing signals S_RX provided from the second sensors RX1 to RX4, corresponding to driving signals S_TX. The sensing signals S_RX may be a signal output from the analog-to-digital converter 224 shown in FIG. 4, or correspond to the signal. The baseline BL may mean a reference value or reference capacitance of capacitances formed between the sensors SC (or the first sensors TX and the second sensors RX) or in the sensors SC. For example, the reference capacitance may be a mutual capacitance which is formed between the first sensors TX and the second sensors RX and is measured by the sensor driver 220, in a state in which any input of a user does not exist. In another example, the reference capacitance may be a self-capacitance which each of the first sensors TX and/or the second sensors RX has, in a state in which any input of a user does not exist. The baseline setting block 1010 may set a baseline BL with respect to each of capacitances formed in the sensor unit 120.

Referring to FIG. 11, a capacitance measured at a specific position (e.g., between a specific first sensor and a specific second sensor) in the sensor unit 120 is illustrated. The capacitance (or reference capacitance) may be changed by a peripheral environment factor. The peripheral environment factor may include a temperature.

For example, the capacitance between the specific first sensor and the specific second sensor may be in proportion to a permittivity of an insulator disposed between the first sensor and the second sensor, and the permittivity may be changed according to temperature. For example, as shown in FIG. 12, the permittivity may increase as the temperature increases. Accordingly, the capacitance (or reference capacitance) may become greater as the temperature increases. The capacitance may become smaller as the temperature becomes lower.

Referring back to FIG. 11, a change ACM in capacitance may occur according to a touch input. When the magnitude of the change ACM in capacitance is greater than a reference magnitude, the sensor driver 220 may determine that the touch input has occurred. A reference for determining the change ACM in capacitance may be the baseline BL.

In an embodiment, the baseline setting block 1010 may periodically set the base line BL.

For example, the baseline setting block 1010 may set a capacitance measured at a first time TP1 to a baseline BL in a corresponding period. Similarly, the baseline setting block 1010 may set or update a capacitance measured at a second time TP2 after a specific time from the first time TP1 to a baseline BL in a corresponding period. The baseline setting block 1010 may set or update a capacitance measured at a third time TP3 to a baseline BL in a corresponding period. For example, a setting cycle of the baseline BL may be a ⅙ second, but the inventive concepts are not limited thereto. For example, the setting cycle of the baseline BL may be longer than ⅙ second or be shorter than ⅙ second. The setting cycle of the baseline BL may be variously changed according to products.

When the baseline BL is updated at a time at which a touch input occurs, a capacitance to which the touch input is reflected may be erroneously set as the base line BL, and the touch input may be released or an error occurs in touch sensing, due to the erroneously set baseline BL. Therefore, the baseline BL may not be updated while the touch input occurs (e.g., while the change ACM in capacitance is maintained).

Referring back to FIG. 10A, the temperature sensing block 1020 may sense a peripheral temperature and determine a mode of the sensor driver 220, based on the peripheral temperature.

In some embodiments, the temperature sensing block 1020 may determine a peripheral temperature, based on the base line BL (or information on the base line BL or a reference capacitance).

In an embodiment, when an average of base lines BL (or reference capacitances) with respect to all positions in the sensor unit 120 is greater than or equal to a reference value REF_BL, the temperature sensing block 1020 may determine that the peripheral temperature is a room temperature, and determine the mode of the sensor driver 220 as a first mode. For example, as shown in FIG. 13, when the average of base lines BL (or reference capacitances) is greater than the reference value REF_BL, the temperature sensing block 1020 may determine the mode of the sensor driver 220 as a first mode MODE1.

In an embodiment, when the average of base lines BL (or reference capacitances) is less than the reference value REF_BL, the temperature sensing block 1020 may determine that the peripheral temperature is a low temperature, and determine the mode of the sensor driver 220 as a second mode. For example, as shown in FIG. 13, when the average of base lines BL (or reference capacitances) is less than the reference value REF_BL, the temperature sensing block 1020 may determine the mode of the sensor driver 220 as a second mode MODE2.

This is because the capacitance decreases as the temperature becomes lower. Also, this is because, when the peripheral temperature becomes less than the reference temperature, the reference capacitances with respect to all the positions in the sensor unit 120 entirely become less than the reference value.

Although a case where the temperature sensing block 1020 determines a room temperature or a low temperature with respect to one reference value REF_BL has been described in FIG. 13, the inventive concepts are not limited thereto. For example, when a plurality of reference values with respect to a plurality of temperature are set, the temperature sensing block 1020 may further subdivide the peripheral temperature, thereby sensing or determine the subdivided temperatures.

Although a case where the temperature sensing block 1020 determines the peripheral temperature, based on only the base line BL has been described in FIG. 10A, the inventive concepts are not limited thereto. For example, referring to FIGS. 1B and 10B, the temperature sensing block 1020 may receive temperature information on the peripheral temperature from the temperature sensor 300, instead of the base line BL. The temperature sensing block 1020 may determine the mode of the sensor driver 220, based on the temperature information. For example, as shown in FIG. 13, when the peripheral temperature is greater than a reference temperature REF_TEMP, the temperature sensing block 1020 may determine the mode of the sensor driver 220 as the first mode MODE1. In another example, as shown in FIG. 13, when the peripheral temperature is less than the reference temperature REF_TEMP, the temperature sensing block 1020 may determine the mode of the sensor driver 220 as the second mode MODE2. In some embodiments, the temperature sensing block 1020 may be omitted. The temperature information may be directly provided to another component (e.g., the driving signal generating block 1030 and the determination block 1040), and the mode of the sensor driver 220 (or the another component) may be determined in the corresponding component.

Referring back to FIG. 10A, the driving signal generating block 1030 may generate a driving signal S_TX. The driving signal generating block 1030 may be substantially identical or similar to the sensor transmitter TDC (see FIG. 4).

In some embodiments, the driving signal generating block 1030 may output a first driving signal having a first frequency in the first mode, and further output a second driving signal having a second frequency in addition to the first driving signal in the second mode. The second frequency may be different from the first frequency. For example, the second frequency may be greater than the first frequency.

In the first mode, the first driving signal may be sequentially supplied to the first sensors TX1 to TX4 as described with reference to FIG. 5, or be simultaneously supplied to at least some of the first sensors TX1 to TX4 as described with reference to FIGS. 7 and 9. Alternatively, in the first mode, the first driving signal may be simultaneously supplied to the second sensors RX1 to RX4 as described with reference to FIG. 8.

In the second mode, the driving signal generating block 1030 may sequentially output the first driving signal and the second driving signal.

Referring to FIG. 14A, a first driving signal S_TX1 and a second driving signals S_TX2, which are provided to the first sensor TX1, are illustrated. One sensing period PS in the first mode may include a first sensing period PS1 (or first sub-period) and a second sensing period PS2 (or second sub-period). One sensing period PS (or sensing frame period) may be a period for generating a one-time touch coordinate. For example, the sensing period PS may be 1/240 second, 1/120 second, 1/60 second, or the like. In other words, touch coordinates of 240 times, 120 times, 60 times, or the like per second may be generated.

For example, the first driving signal S_TX1 may be supplied twice to the first sensor TX1 in the first sensing period PS1 (t1b and t2b), and the second driving signal S_TX2 may be supplied twice to the first sensor TX1 in the second sensing period PS2 (t11b and t12b). The number of times each of the first driving signal S_TX1 and the second driving signal S_TX2 is supplied to the first sensor TX1 may be greater than two in some embodiments.

An interval PW2 at which the second driving signal S_TX2 is supplied may be less than that an interval PW1 at which the first driving signal S_TX1 is supplied. It may be understood that, when the first and second driving signals S_TX1 and S_TX2 correspond to a rising transition and/or a falling transition, a frequency of the second driving signal S_TX2 according to the interval PW2 is greater than that of the first driving signal S_TX1 according to the interval PW1.

Referring to FIG. 14B, the driving signal generating block 1030 (or the sensor driver 220) may sequentially supply the first driving signal S_TX1 to the first sensors TX1 to TX4 in the first sensing period PS1, and sequentially supply the second driving signal S_TX2 to the first sensors TX1 to TX4 in the second sensing period PS2.

For example, in the first sensing period PS1, the driving signal generating block 1030 may supply the first driving signal S_TX1 to the first sensor TX1 twice (t1b and t2b), supply the first driving signal S_TX1 to the first sensor TX2 twice (t3b and t4b), supply the first driving signal S_TX1 to the first sensor TX3 twice (t5b and t6b), and supply the first driving signal S_TX1 to the first sensor TX4 twice (t7b and t8b). Also, in the second sensing period PS2, the driving signal generating block 1030 may supply the second driving signal S_TX2 to the first sensor TX1 twice (t11b and t12b), supply the second driving signal S_TX2 to the first sensor TX2 twice (t13b and t14b), supply the second driving signal S_TX2 to the first sensor TX3 twice (t15b and t16b), and supply the second driving signal S_TX2 to the first sensor TX4 twice (t17b and t18b). In some embodiments, the number of times each of the first driving signal S_TX1 and the second driving signal S_TX2 is supplied to the first sensors TX1 to TX4 may be greater than two.

In an embodiment, an interval PW2 (or frequency) at which the second driving signal S_TX2 is supplied to the first sensor TX1 may be different from an interval PW3 (or frequency) at which the second driving signal S_TX2 is supplied to the first sensor TX4.

Referring to FIG. 14C, an interval PW3 at which the second driving signal S_TX2 is supplied to the first sensor TX4 may be less than an interval PW2 at which the second driving signal S_TX2 is supplied to the first sensor TX1. In other words, a frequency of the second driving signal S_TX2 supplied to the first sensor TX4 may be greater than that of the second driving signal S_TX2 supplied to the first sensor TX1. The first sensor TX4 may be relatively adjacent to the sensor driver 220, and have a signal transfer path relatively short up to the sensor driver 220. The first sensor TX1 may be spaced apart from the sensor driver 220, and have a signal transfer path relatively long up to the sensor driver 220. A case where frequencies of the second driving signal S_TX2 with respect to the first sensors TX1 and TX4 are set different from each other will be described later with reference to FIG. 18.

Referring back to FIG. 10A, the determination block 1040 may sense a touch input or sense a touch position, based on a first sensing signal corresponding to the first driving signal, and determine whether the touch input has been really input based on a second sensing signal corresponding to the second driving signal.

In an embodiment, the determination block 1040 may sense a touch input by comparing the first sensing signal or the second sensing signal with the baseline BL. For example, when a magnitude of a change ACM in capacitance according to the first sensing signal with respect to the baseline BL is greater than the reference magnitude, the determination block 1040 may determine that the touch input has occurred. Similarly, the determination bock 1040 may again sense a touch input or again sense a touch position, based on the second sensing signal. The determination block 1040 may determine whether the touch input (e.g., the touch input sensed based on the first sensing signal) has been really input, based on a result obtained by sensing the touch input based on the second sensing signal.

Since only the first driving signal is supplied to the sensor unit 120 in the first mode, the determination block 1040 may sense a touch input or sense a touch position, based on the first sensing signal corresponding to the first driving signal. In the first mode, the determination block 1040 may not determine whether the touch input has been really input.

Since the first driving signal is supplied to the sensor unit 120 in a first sensing period PS1 of the second mode, the determination block 1040 may sense a touch input or sense a touch position, based on the first sensing signal corresponding to the first driving signal. Subsequently, since the second driving signal is supplied to the sensor unit 120 in a second sensing period PS2 of the second mode, the determination block 1040 may determine whether the touch input has been really input, based on the second sensing signal corresponding to the second driving signal. For example, the determination block 1040 may again sense a touch input or again sense a touch position, based on the second sensing signal corresponding to the second driving signal. When the touch input is again sensed based on the second sensing signal, the determination block 1040 may finally determine that the touch input has occurred. Alternatively, when the touch input is not sensed based on the second sensing signal, the determination block 1040 may finally determine that the touch input has not occurred. In other words, when the touch input is not sensed based on the second sensing signal, the determination block 1040 may determine that the touch input sensed based on the first sensing signal is a ghost touch. A case where the ghost touch is determined based on the second driving signal will be described in detail below.

Figure 15A:
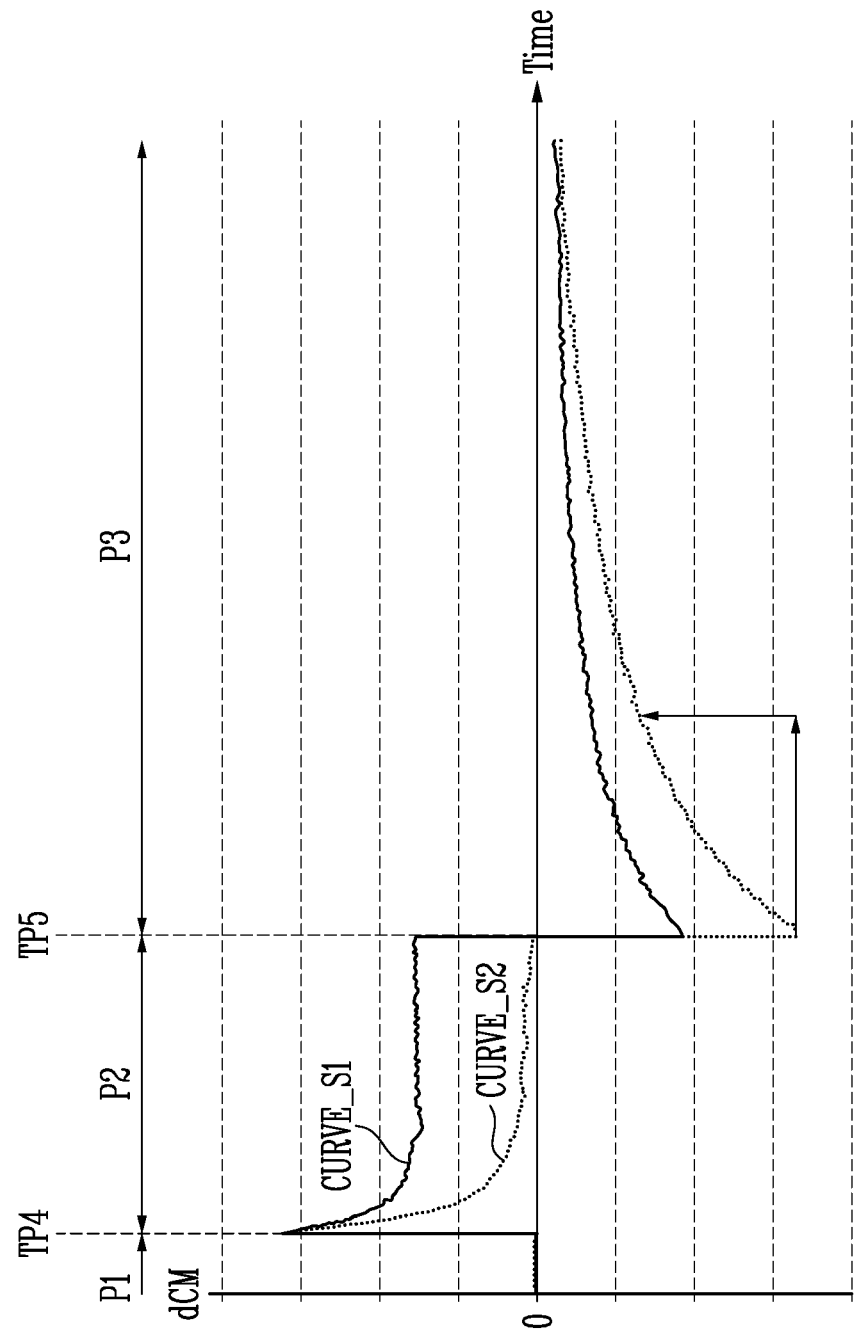
FIGS. 15A and 15B are diagrams illustrating change in sensing sensitivity according to touch input.
Figure 15B:
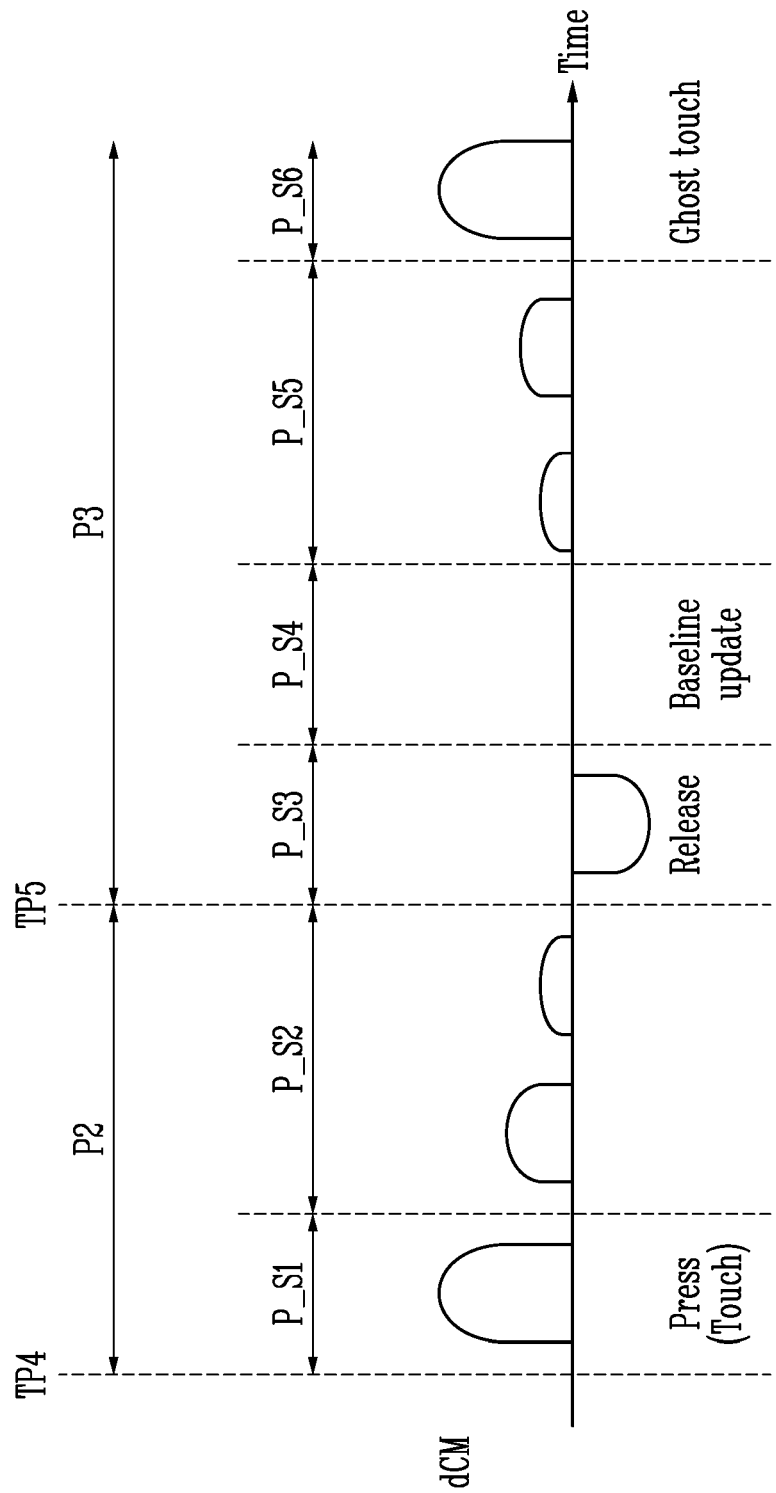

FIGS. 15A and 15B are diagrams illustrating change in sensing sensitivity according to touch input. A sensing sensitivity dCM according to a touch input in a low-temperature condition is illustrated in FIG. 15A, and a sensing sensitivity dCM (or sensing value) according to update of the base line BL (see FIG. 11) and a touch sensing result are illustrated in FIG. 15B. The sensing sensitivity may be a change (or variation) in capacitance per unit time.

Referring to FIGS. 1A, 1B, 10A, 10B, 15A, and 15B, a first sensitivity curve CURVE_S1 may represent a sensing sensitivity dCM in the sensor unit 120 (or the display device 1) which is relatively insensitive to temperature change. For example, a second sensitivity curve CURVE_S2 may represent a sensing sensitivity dCM of the sensor unit 120 which is separately manufactured and then coupled to the display unit 110. The second sensitivity curve CURVE_S2 may represent a sensing sensitivity dCM in the sensor unit 120 (or the display device 1) which is relatively sensitive to temperature change. For example, the second sensitivity curve CURVE_S2 may represent a sensing sensitivity dCM of the sensor unit 120 directly formed on the substrate (e.g., the thin film encapsulation layer) constituting the display unit 110.

FIGS. 15A and 15B will be described by assuming that the display device 1 senses a touch input by only the first driving signal except the second driving signal.

It is assumed that the display device 1 is operating in a low-temperature state. For example, the peripheral temperature may be about −20° C. For example, it is assumed that the display device 1 is operating in an external environment of about −20° C. As described with reference to FIG. 12, a capacitance in the sensor unit 120 may be in a state in which the capacitance becomes relatively lower than it would be at a room temperature. A reference capacitance in a first period P1 may be relatively low.

At a fourth time TP4, a touch of a user may occur in the display device 1. The capacitance may increase due to the touch of the user, and the sensing sensitivity dCM may increase. The sensor driver 220 may determine that a touch input has occurred based on an increase in the sensing sensitivity dCM in a first sub-period P_S1.

During a second period P2, the touch of the user may be maintained. For example, the second period P2 may be a few to a few tens of seconds. During the second period P2, a body temperature of the user may be transferred to the sensor unit 120 by the touch of the user. A temperature in the sensor unit 120 (or a portion of the sensor unit 120) in which the touch occurs due to the body temperature of the user may increase. The sensing sensitivity dCM may be degraded by the increase in the temperature of the sensor unit 120. For example, while the reference capacitance increases due to the increase in the temperature of the sensor unit 120, the sensing sensitivity dCM may be relatively degraded. The sensing sensitivity dCM (see the second sensitivity curve CURVE_S2) in the sensor unit 120 relatively sensitive to a temperature change may be further degraded than that the sensing sensitivity dCM (see the first sensitivity curve CURVE_S1) in the sensor unit 120 relatively insensitive to the temperature change.

Since the sensing sensitivity dCM has a positive value even in a second sub-period P_S2 of the second period P2, the sensor driver 220 may determine that the touch input is maintained in the second sub-period P_S2.

Subsequently, at a fifth time TP5, the touch of the user may be released from the display device 1. A variation in the sensing sensitivity dCM may be returned to that prior to the time at which the touch occurred. For example, at the fifth time TP5, the sensing sensitivity dCM may become low by the variation in the sensing sensitivity dCM, which is increased by the touch of the user at the fourth time TP4. The sensor driver 220 may determine that the touch input has been released based on the degradation of the sensing sensitivity dCM in a third sub-period P_S3.

Since the sensing sensitivity dCM is degraded or becomes low due to the increase in temperature in the second period P2, the sensing sensitivity dCM may have a value less than that in the first period P1 (i.e., before the touch occurred) at the fifth time TP5.

Since the display device 1 is exposed to the low-temperature state, the temperature of the sensor unit 120 (i.e., the portion of the sensor unit 120, of which temperature is increased by the touch input) may again become low during a third period P3. The sensing sensitivity dCM may increase due to a decrease in the temperature of the sensor unit 120. For example, the sensing sensitivity dCM may relatively increase, while the reference capacitance decreases due to the decrease in the temperature of the sensor unit 120. When a variation in the sensing sensitivity (i.e., a variation in capacitance during a specific time), which is caused by the decrease in the temperature of the sensor unit 120, is greater than a reference magnitude, it may be determined that a touch has occurred.

For example, since the touch input has been released in the third sub-period P_S3, the base line (or reference state) of the sensor unit 120 may be updated after the touch input is released. For example, in a fourth sub-period P_S4 of the third period P3, the base line (or reference state) may be updated based on a state of the third period P3. Similarly, the reference value of the sensing sensitivity dCM may also be updated to a sensing sensitivity dCM in the third sub-period P_S3. The sensing sensitivity dCM may increase in fifth and sixth sub-periods P_S5 and PS6 in the third period P3. When the variation in the sensing sensitivity dCM is greater than the reference magnitude in the sixth sub-period P_S6, a ghost touch may occur. Accordingly, the sensor driver 220 may be determined that a touch input has occurred in the sixth sub-period P_S6. That is, although any touch input caused by the user does not actually exist, it may be determined that a touch input has occurred due to a change in the sensing sensitivity according to the temperature change of the sensor unit 120.

Thus, the display device 1 in accordance with the embodiments of the present invention can determine whether a touch input is an actual input by additionally using the second driving signal having the second frequency, which is insensitive to temperature change.

Figure 16:
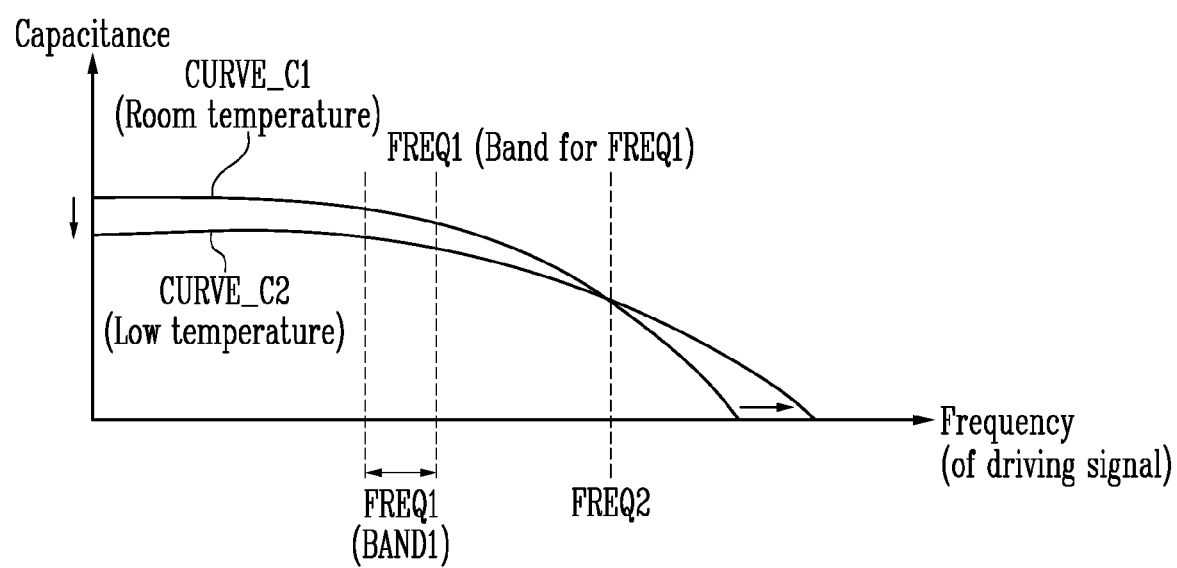
FIG. 16 is a graph illustrating capacitance sensed according to frequency of a driving signal.

FIG. 16 is a graph illustrating capacitance sensed according to frequency of a driving signal.

Referring to FIGS. 1A and 16, a first characteristic curve CURVE_C1 represents capacitance of the sensor unit 120 (or the first and second sensors TX and RX) at room temperature, and a second characteristic curve CURVE_C2 represents capacitance of the sensor unit 120 at a low temperature. For example, the low temperature may mean that the peripheral temperature is about −20° C.

As the temperature becomes lower, the permittivity decreases, and the capacitance may also decrease. That is, a maximum value of the capacitance (or a maximum charge of charges) according to the second characteristic curve CURVE_C2 may be less than that of the capacitance according to the first characteristic curve CURVE_C1.

A capacitance sensed in the sensor driver 220 may be decreased as the frequency of the driving signal becomes greater. This is because charges are not completely charged in a capacitor corresponding to the capacitance, while charge and discharge are more rapidly repeated as the frequency becomes larger. A frequency which allows the sensed capacitance to become about 95% of the maximum value or become about 90% or more of the maximum value may be used so as to more accurately sense a touch input. A main frequency, i.e., a first frequency FREQ1 of the driving signal for touch sensing, may be determined by considering several driving conditions of the display device 1. For example, the first frequency FREQ1 may be within a frequency range of about 300 kHz to about 400 kHz.

A resistance value may be decreased as the temperature becomes lower. For example, a resistance value of the first and second sensors TX and RX may be decreased. Due to the decrease in resistance value, a time constant may increase (or an RC delay may decrease), and a frequency band may increase. A maximum frequency of the driving signal according to the second characteristic curve CURVE_C2 may be greater than a frequency of the driving signal according to the first characteristic curve CURVE_C1. Accordingly, the first characteristic curve CURVE_C1 and the second characteristic curve CURVE_C2 may intersect each other.

When a driving signal (i.e., the second driving signal) having a second frequency FREQ2 at a point (or period) at which the first characteristic curve CURVE_C1 and the second characteristic curve CURVE_C2 intersect each other, a capacitance at the room temperature and a capacitance at the low temperature may be equally measured. That is, when touch sensing is performed by using the driving signal having the second frequency FREQ2, the sensing sensitivity with respect to a touch input may become low according to a relatively small capacitance, but only a change in capacitance caused by the touch input may be measured regardless of the temperature change of the sensor unit 120. Therefore, the second frequency FREQ2 may be determined as an auxiliary frequency for determining whether the touch input is an actual input. The second frequency FREQ2 may be changed according to positions of the first and second sensors TX and RX in the sensor unit 120 (or a capacitance formed therebetween). However, for example, the second frequency FREQ2 may be within a range of about 450 kHz to about 600 kHz.

As described above, the second frequency FREQ2 at which the change in capacitance according to the temperature change is minimized can be determined as an auxiliary frequency for determining whether the touch input is an actual input.

Figure 17A:
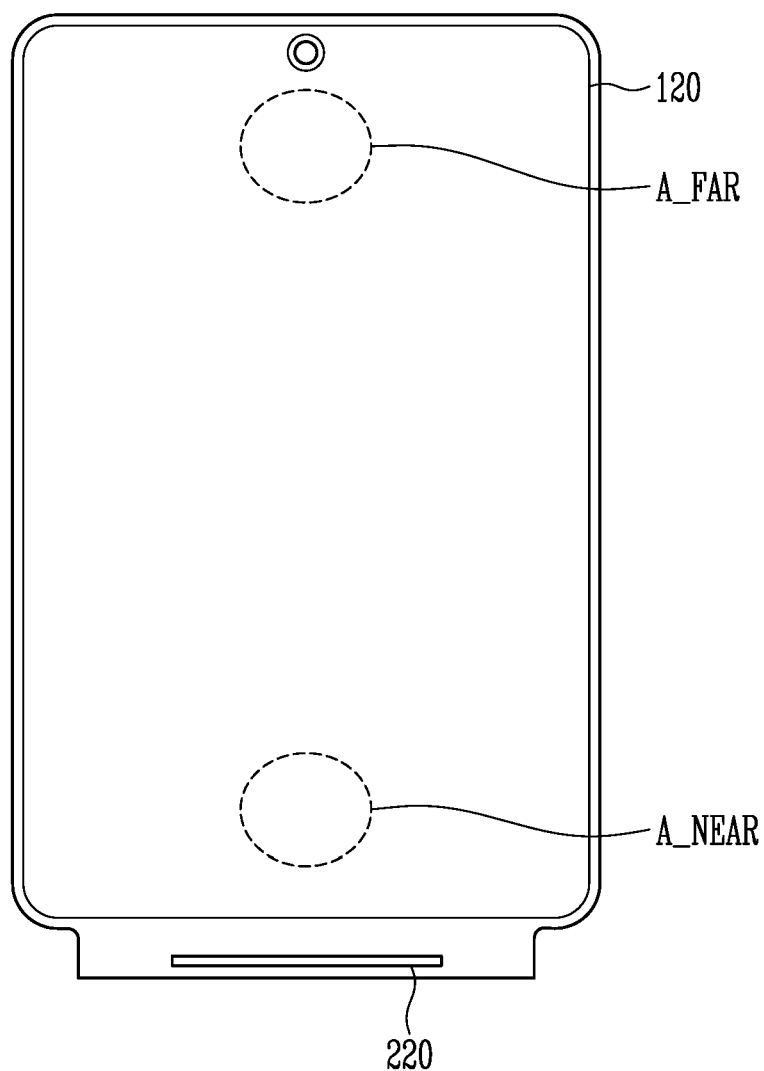
FIG. 17A is a diagram illustrating an example of a sensor unit included in the display device shown in FIGS. 1A and 1B.
Figure 17B:
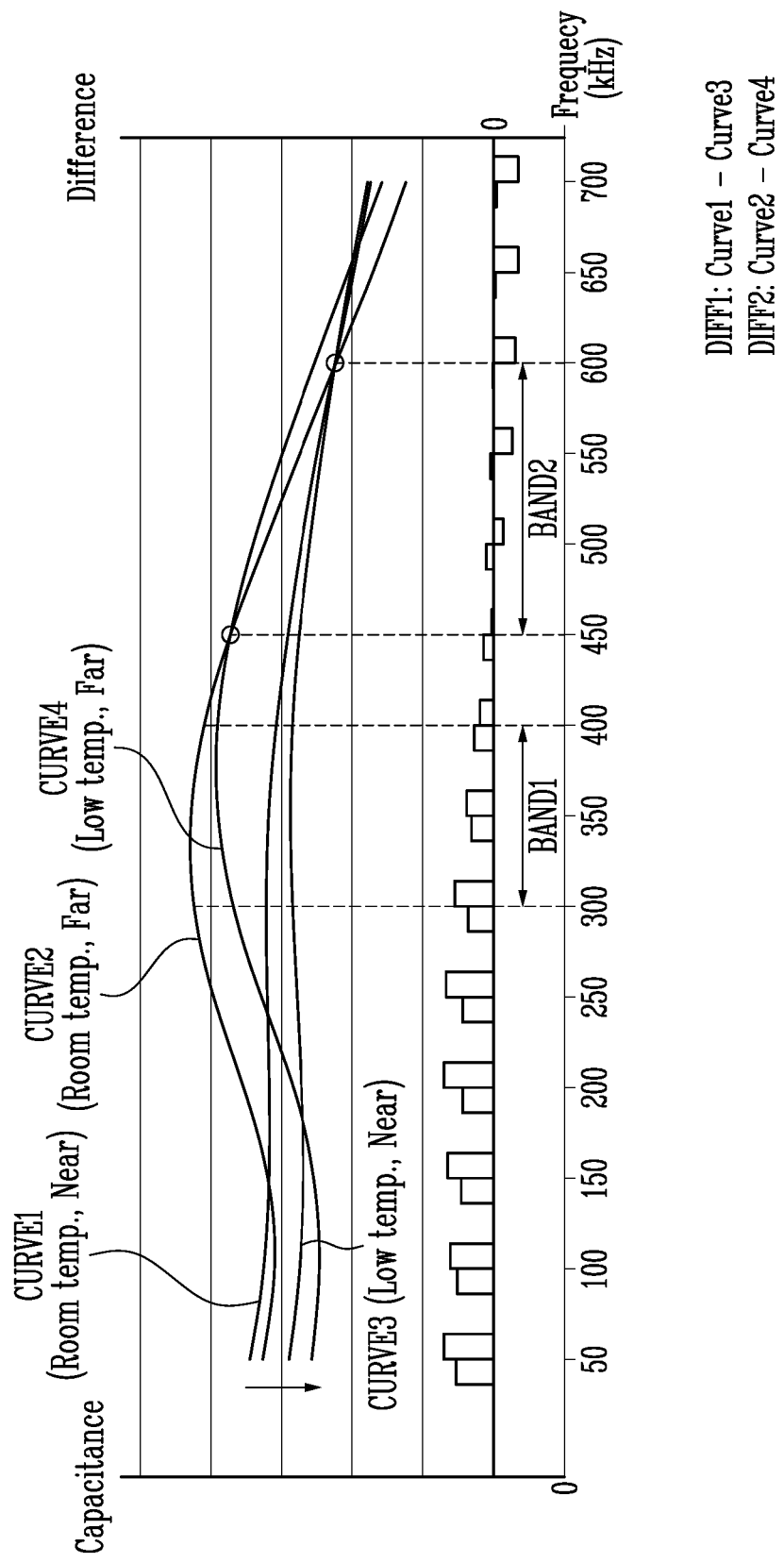
FIG. 17B is a graph illustrating sensed capacitance according to frequency of a driving signal for each position of the sensor unit shown in FIG. 17A.

FIG. 17A is a diagram illustrating an example of the sensor unit included in the display device shown in FIGS. 1A and 1B. FIG. 17B is a graph illustrating sensed capacitance according to frequency of a driving signal for each position of the sensor unit shown in FIG. 17A.

First, referring to FIGS. 1A, 1B, and 17A, a first area A_NEAR of the sensor unit 120 may be relatively adjacent to the sensor driver 220. A signal transfer path again continued to the sensor driver 220 via the first area A_NEAR from the sensor driver 220 (i.e., a signal transfer path of the driving signal and the sensing signals) may be relatively short. For example, the signal transfer path may have a relatively small resistance value.

A second area A_FAR of the sensor unit 120 may be spaced relatively apart from the sensor driver 220. A signal transfer path again continued to the sensor driver 220 via the second area A_FAR from the sensor driver 220 may be relatively long. For example, the signal transfer path may have a relatively large resistance value.

Referring to FIG. 17B, a first curve CURVE1 may represent capacitance measured with respect to the first area A_NEAR at a room temperature, and a second curve CURVE2 may represent capacitance measured with respect to the second area A_FAR at the room temperature. A third curve CURVE3 may represent capacitance measured with respect to the first area A_NEAR at a low temperature, and a fourth curve CURVE4 may represent capacitance measured with respect to the second area A_FAR at the low temperature. For example, the low temperature may mean that the peripheral temperature is about −20° C.

Due to a difference in signal transfer path between the first area A_NEAR and the second area A_FAR, the first curve CURVE1 and the second curve CURVE2 may partially have a difference. The first curve CURVE1 with respect to the first area A_NEAR may be similar to the first characteristic curve CURVE_C1 shown in FIG. 16. The second curve CURVE2 with respect to the second area A_FAR has a capacitance relatively increased in a first frequency band BAND1, but may have a form in which the capacitance decreases as the frequency becomes greater than that in the first frequency band BAND1.

Similarly to the second characteristic curve CURVE_C2 shown in FIG. 16, the third curve CURVE3 has a capacitance (or a maximum value of the capacitance) relatively less than that of the first curve CURVE1, and may have a frequency band relatively greater than that of the first curve CURVE1 according to a decrease in resistance. Similarly, the fourth curve CURVE4 has a capacitance (or a maximum value of the capacitance) relatively lower than that of the second curve CURVE2, and may have a frequency band relatively greater than that of the second curve CURVE2 according to a decrease in resistance.

A first difference value DIFF1 may represent a difference between the capacitance according to the first curve CURVE1 and the capacitance according to the third curve CURVE3. A third difference value DIFF3 may represent a difference between the capacitance according to the second curve CURVE2 and the capacitance according to the fourth curve CURVE4.

The first frequency band BAND1 may represent a main frequency (i.e., the first frequency FREQ1 shown in FIG. 16) of the driving signal for touch sensing. In the first frequency band BAND1, each of the first difference value DIFF1 and the second difference value DIFF2 may have a positive value. That is, when touch sensing is performed by using a frequency in the first frequency band BAND1, a change in capacitance according to a temperature change may occur. For example, the first frequency band BAND1 may be a range from about 300 kHz to about 400 kHz.

A second frequency band BAND2 may represent an auxiliary frequency (i.e., the second frequency FREQ2 shown in FIG. 16) for determining whether a touch input is an actual input. The second frequency band BAND2 may be a range from about 450 kHz to about 600 KHz.

For example, the first curve CURVE1 and the third CURVE3 may intersect each other at a point (or period) adjacent to a maximum frequency of the second frequency band BAND2. Accordingly, the first difference value DIFF1 at the point adjacent to the maximum frequency of the second frequency band BAND2 may be 0. That is, when touch sensing with respect to the first area A_NEAR is performed by using a driving signal having the maximum frequency of the second frequency band BAND2, only a change in capacitance based on a touch input to the first area A_NEAR may be sensed regardless of the temperature change.

For example, the second curve CURVE2 and the fourth curve CURVE4 may intersect each other at a point (or period) adjacent to a minimum frequency of the second frequency band BAND2. Accordingly, the second difference value DIFF2 at the point (or period) adjacent to the minimum frequency of the second frequency band BAND2 may be 0. That is, when touch sensing with respect to the second area A_FAR is performed by using a driving signal having the minimum frequency of the second frequency band BAND2, only a change in capacitance based on a touch input to the second area A_FAR may be sensed regardless of the temperature change.

Frequencies in the second frequency band BAND2 may be used for areas of the sensor unit 120 between the first area A_NEAR and the second area A_FAR. Only a change in capacitance based on a touch input to each of the areas may be sensed regardless of the temperature change. By considering this, the frequency of the second driving signal for the first sensor TX1 and the frequency of the second driving signal for the first sensor TX4, which are described with reference to FIG. 14C, may be set different from each other.

As shown in FIG. 17B, although the first difference value DIFF1 and the second difference DIFF2 are not 0 at a point of about 500 kHz, both the first difference value DIFF1 and the second difference DIFF2 may have relatively small values. That is, when touch sensing with respect to the whole of the sensor unit 120 is performed by using a driving signal having a frequency of about 500 kHz, only a change in capacitance based on a touch input may be sensed while being hardly influenced by the temperature change. In consideration of this, frequencies of the second driving signal for the first sensors TX1 to TX4, described with reference to FIG. 14B, may be the same.

As described above, a specific frequency (e.g., about 500 kHz) at which the change in capacitance (e.g., the first difference value DIFF1 and the second difference value DIFF2) according to the temperature change for each position in the sensor unit 120 is entirely minimized may be determined as the auxiliary frequency. Alternatively, the auxiliary frequency may be differently set for each position in the sensor unit 120 such that the change in capacitance according to the temperature change for each position in the sensor unit 120 is minimized.

Figure 18:
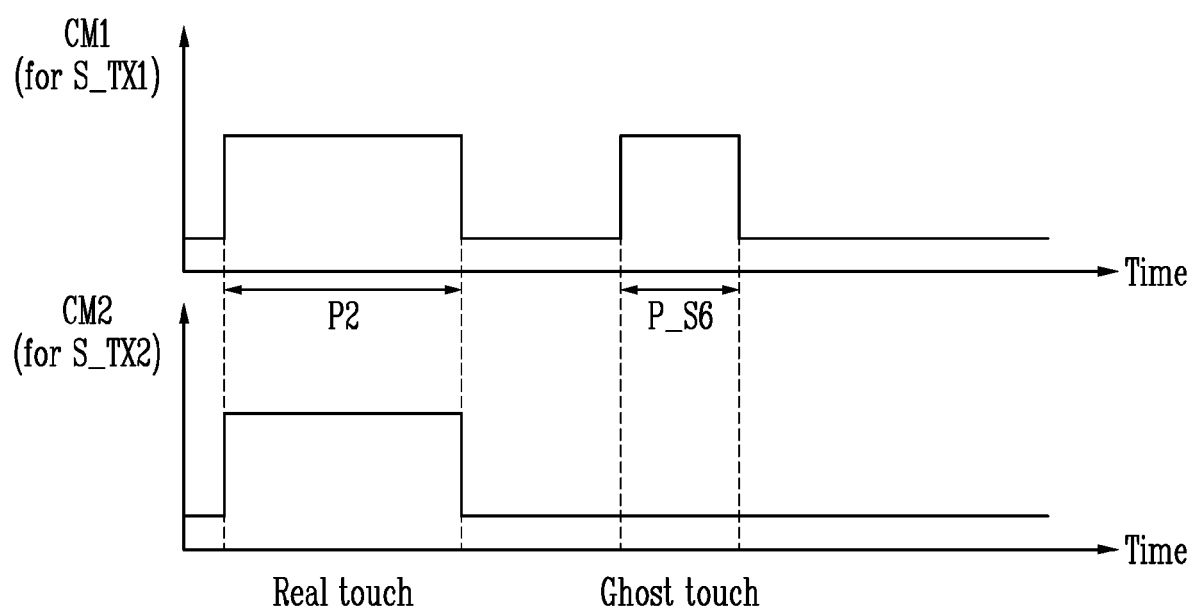
FIG. 18 is a diagram illustrating an operation of the sensor driver shown in FIGS. 10A and 10B in the second mode.

FIG. 18 is a diagram illustrating an operation of the sensor driver shown in FIGS. 10A and 10B in the second mode.

Referring to FIGS. 10A, 10B, 15B, 16, and 18, a second period P2 and a sixth sub-period P_S6 may be the second period P2 and the sixth sub-period P_S6, which are shown in FIG. 15B. A first capacitance CM1 represents a capacitance (or change in capacitance, or sensing sensitivity) sensed based on the first driving signal S_TX1 having the first frequency FREQ1, and a second capacitance CM2 represents a capacitance (or change in capacitance, or sensing sensitivity) sensed based on the second driving signal S_TX2 having the second frequency FREQ2. For convenience of description, a change in the first capacitance CM1 and a change in the second capacitance CM2 are briefly illustrated.

In the second period P2, the sensor driver 220 (or the determination block 1040) may determine that a touch input has occurred based on the change in the first capacitance CM1 according to the first driving signal S_TX1.

Also, in the second period P2, the sensor driver 220 may determine that a touch input has occurred based on the change in the second capacitance CM2 according to the second driving signal S_TX2. The sensor driver 220 may determine that the touch input sensed by the first driving signal S_TX1 is an actual touch input.

In the sixth sub-period P_S6, the sensor driver 200 may determine that a touch input has occurred based on the change in the first capacitance CM1 according to the first driving signal S_TX1.

Also, in the sixth sub-period P_S6, the sensor driver 220 may determine that any touch input has not occurred based on that the second capacitance CM2 according to the second driving signal S_TX2 is not changed (that the second capacitance CM2 is hardly changed, or that the second capacitance CM2 is changed within a reference range). That is, the sensor driver 220 may determine that the touch input sensed by the first driving signal S_TX1 is not the actual touch input or that the touch input sensed by the first driving signal S_TX1 is a ghost touch. For example, the sensor driver 220 may neglect the touch input sensed by the first driving signal S_TX1.

Figure 19A:
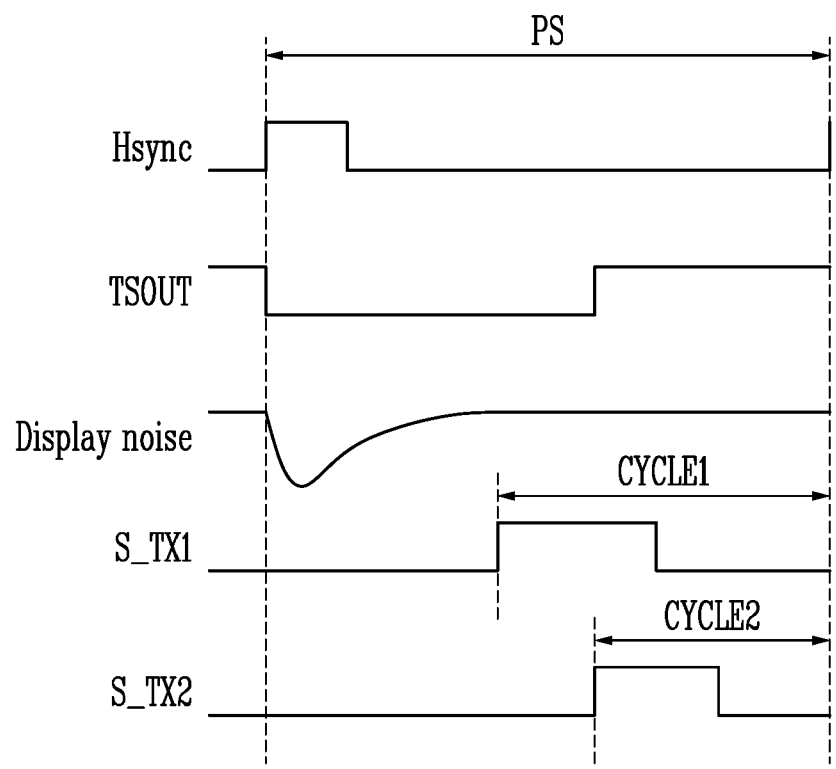
FIGS. 19A and 19B are diagrams illustrating a driving method of the display device shown in FIGS. 1A and 1B.
Figure 19B:
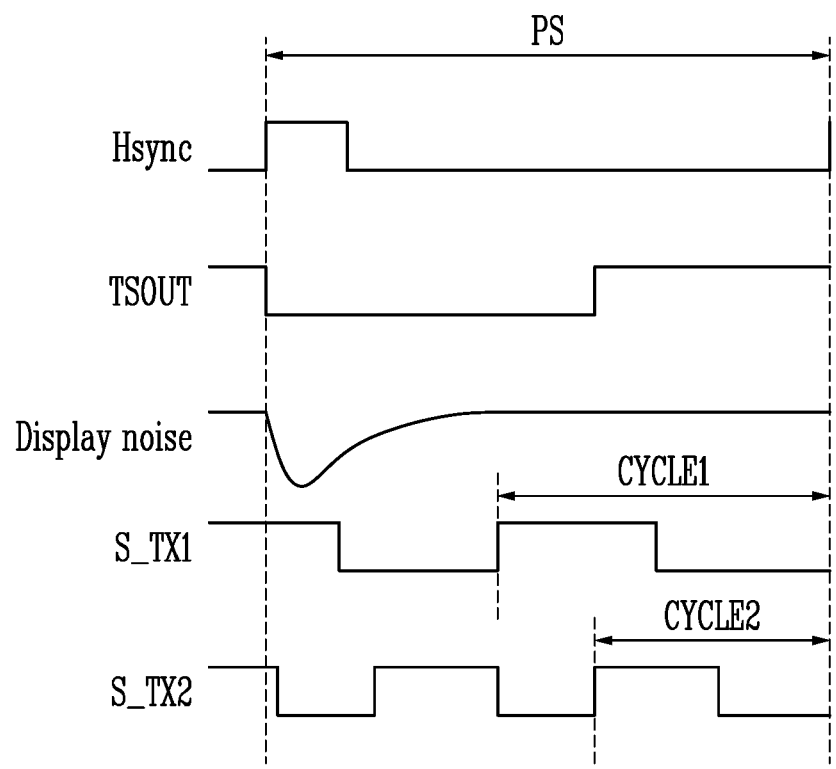

FIGS. 19A and 19B are diagrams illustrating a driving method of the display device shown in FIGS. 1A and 1B.

First, referring to FIGS. 1A, 1B, 19A, and 19B, a horizontal synchronization signal Hsync may be a control signal for driving the display unit 110. For example, the display driver 210 may provide a scan signal to the display unit 110 in response to the horizontal synchronization signal Hsync. For example, the display driver 210 may sequentially provide the scan signal to the scan lines SL in the display unit 110 by using the horizontal synchronization signal Hsync as a cycle.

A source out signal TSOUT may be a signal for controlling a timing at which a data signal is supplied to the display unit 110. The source out signal TSOUT may be synchronized with the horizontal synchronization signal Hsync. For example, the display driver 210 may provide data signals to the data lines DL in response to the source out signal TSOUT. Pixels PX may be selected by the scan signal, be supplied with a data signal from the data lines DL, and emit light with a luminance corresponding to the data signal.

The horizontal synchronization signal Hsync (and the source out signal TSOUT) may act as noise (or display noise) with respect to first and second driving signals S_TX1 and S_TX2 applied to the sensor unit 120. For example, the noise may occur in a period in which the horizontal synchronization signal Hsync has a logic high level. The first driving signal S_TX1 may have a first cycle CYCLE1, and the second driving signal S_TX2 may have a second cycle CYCLE2.

As shown in FIG. 19A, in order to remove the noise with respect to the first and second driving signals S_TX1 and S_TX2, the first and second driving signals S_TX1 and S_TX2 may be set while avoiding the horizontal synchronization signal Hsync. For example, the first and second driving signals S_TX1 and S_TX2 may be applied in a period in which the horizontal synchronization signal Hsync has a logic low level (or a period in which the noise disappears). That is, the first and second driving signals S_TX1 and S_TX2 may be synchronized with the horizontal synchronization signal Hsync.

However, the first and second driving signals S_TX1 and S_TX2 are not limited thereto. As shown in FIG. 19B, the first and second driving signals S_TX1 and S_TX2 may be applied even in the period in which the horizontal synchronization signal Hsync has the logic high level (or a period in which the noise exists). That is, the first and second driving signals S_TX1 and S_TX2 may not be synchronized with the horizontal synchronization signal Hsync.

For example, when the first and second driving signals S_TX1 and S_TX2 have a sine wave (i.e., a sine wave insensitive to the noise) instead of a square wave, or when the analog front end described with reference to FIG. 4 is implemented as a fully differential analog front end (i.e., an analog front end capable of removing noise commonly included in two adjacent sensing signals by differentially amplifying the sensing signals), the first and second driving signals S_TX1 and S_TX2 may not be synchronized with the horizontal synchronization signal Hsync.

As described above, the first and second driving signals S_TX1 and S_TX2 may be synchronized with the horizontal synchronization signal Hsync or may not be synchronized with the horizontal synchronization signal Hsync.

A driving method of a display device (or input sensing device) in accordance with embodiments of the present invention may be performed in the display device 1 shown in FIGS. 1A and 1B. In the driving method, a first driving signal having a first frequency may be transmitted to sensors SC through the sensor driver 220. In the driving method, a touch input may be sensed based on a first sensing signal provided from the sensors SC, corresponding to the first driving signal. In addition, a second driving signal having a second frequency may be transmitted to the sensors SC through the sensor driver 220. The second frequency may be insensitive to a temperature change. In other words, a capacitance measured based on the second driving signal having the second frequency may be insensitive to the temperature change. In the driving method, whether the touch input is an actual input may be determined, based on a second sensing signal provided from the sensors SC, corresponding to the second driving signal. For example, in the driving method, a touch input may be again sensed based on the second sensing signal, it may be determined that a touch input is an actual input when the touch input is again sensed, and it may be determined that the touch input is a ghost touch when any touch input is not again sensed.

Figure 20:
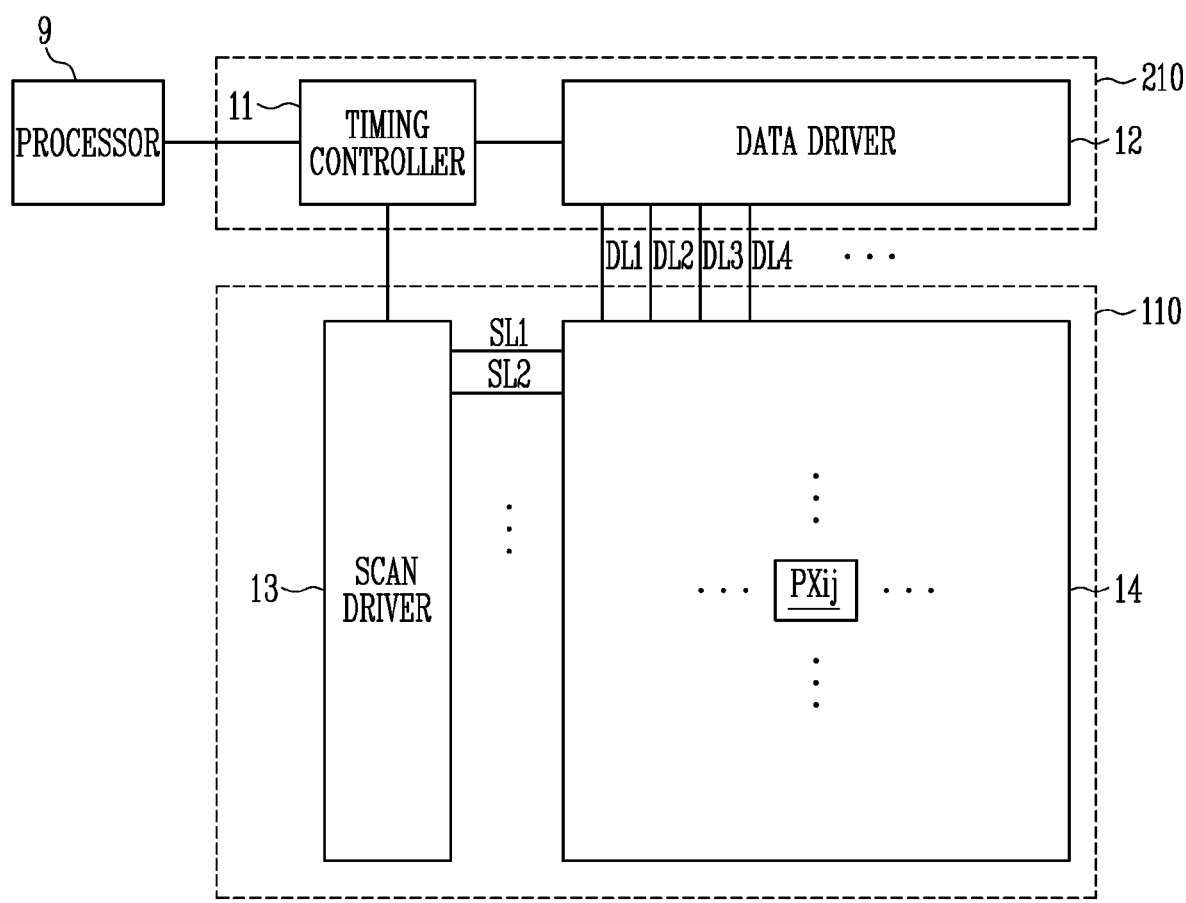
FIG. 20 is a diagram illustrating a display unit and a display driver in accordance with an embodiment of the present invention.

FIG. 20 is a diagram illustrating a display unit and a display driver in accordance with an embodiment of the present invention.

Referring to FIGS. 1A, 1B and 20, the display driver 210 may include a data driver 12 and a timing controller 11, and the display unit 110 may include a scan driver 13. However, as described above, whether functional units are to be integrated in one IC, to be integrated in a plurality of ICs, or to be mounted on the display substrate 111 may be variously configured according to specifications of the display device 1.

The timing controller 11 may receive grayscales for each frame period and timing signals from a processor 9. The processor 9 may correspond to at least one of a Graphics Processing Unit (GPU), a Central Processing Unit (CPU), an Application Processor (AP), and the like. For example, the processor 9 may be the above-described application processor. The timing signals may include a vertical synchronization signal, a horizontal synchronization signal, a data enable signal, and the like.

Cycles of the vertical synchronization signal may correspond to the display frame periods, respectively. Cycles of the horizontal synchronization signal Hsync may correspond to horizontal periods, respectively. The grayscales may be supplied by using a horizontal line as a unit in each horizontal period, corresponding to a pulse having an enable level of the data enable signal. The horizontal line may mean pixels connected to the same scan line (e.g., a pixel row).

The timing controller 11 may render grayscales to correspond to the specifications of the display device 1 (or a pixel unit 14). For example, the processor 9 may provide a red grayscale, a green grayscale, and a blue grayscale with respect to each unit dot. For example, when the pixel unit 14 has an RGB stripe structure, pixels PXij may correspond one-to-one to the respective grayscales. Therefore, it may be unnecessary to render the grayscales. However, for example, when the pixel unit 14 has a PENTILE™ structure, adjacent unit dots share a pixel with each other, and hence, the pixels may not correspond one-to-one to the respective grayscales. Therefore, it may be necessary to render the grayscales. Grayscales which are rendered or are not rendered may be provided to the data driver 12. Also, the timing controller 11 may provide a data control signal to the data driver 12. Also, the timing controller 11 may provide a scan control signal to the scan driver 13.

The data driver 12 may generate data voltages to be provided to data lines DL1, DL2, DL3, DL4, . . . by using the grayscales and the data control signal, which are received from the timing controller 11.

The scan driver 13 may generate scan signals to be provided to scan lines SL1, SL2, . . . by using a clock signal, a scan start signal, and the like, which are received from the timing controller 11. The scan driver 13 may sequentially supply the scan signals having a pulse of a turn-on level to the scan lines SL1, SL2, . . . . For example, the scan driver 13 may supply the scan signals having the turn-on level to the scan line in a cycle corresponding to that of the horizontal synchronization signal during an active period in which grayscales are supplied. The scan driver 13 may include scan stages configured in the form of shift registers. The scan driver 13 may generate the scan signals in a manner that sequentially transfers the scan start signal in the form of a pulse of the turn-on level to a next scan stage under the control of the clock signal.

The pixel unit includes pixels PXij. Each of the pixels PXij may be connected to a corresponding data line and a corresponding scan line. For example, a pixel PXij may be connected to an ith scan line and a jth data line. The pixels PXij may include pixels emitting light of a first color, pixels emitting light of a second color, and pixels emitting light of a third color. The first color, the second color, and the third color may be different colors. For example, the first color may be one color among red, green, and blue, the second color may be one color except the first color among red, green, and blue, and the third color may be the other color except the first color and the second color among red, green, and blue. In addition, magenta, cyan, and yellow instead of red, green, and blue may be used as the first to third colors.

Figure 21:
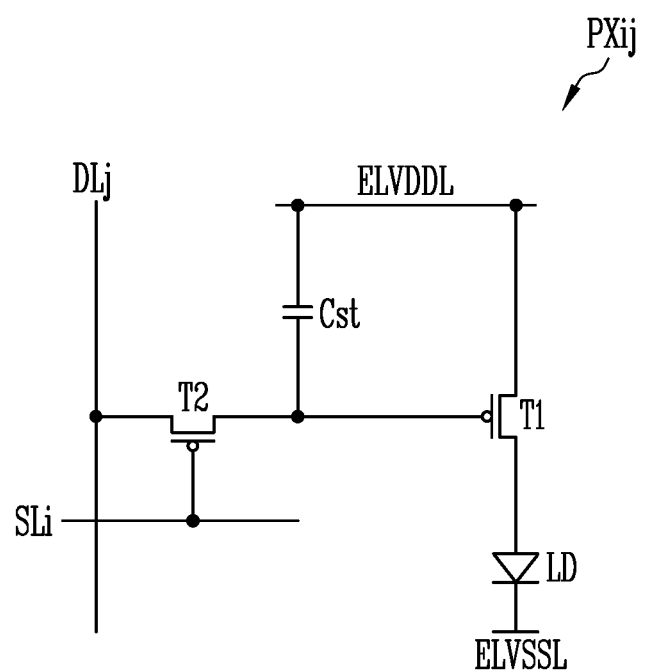
FIG. 21 is a circuit diagram illustrating an embodiment of a pixel included in the display unit shown in FIG. 20.

FIG. 21 is a circuit diagram illustrating an embodiment of the pixel included in the display unit shown in FIG. 20.

Referring to FIGS. 20 and 21, an exemplary pixel PXij is illustrated. The other pixels may also have a configuration substantially identical to that of the pixel PXij, and therefore, overlapping descriptions will be omitted.

A gate electrode of a transistor T1 may be connected to a second electrode of a storage capacitor Cst, a first electrode of the transistor T1 may be connected to a first power line ELVDDL, and a second electrode of the transistor T1 may be connected to an anode of a light emitting element LD. Hereinafter, the transistor T1 may be referred to as a driving transistor.

A gate electrode of a transistor T2 may be connected to an ith scan line SLi, a first electrode of the transistor T2 may be connected to a jth data line DLj, and a second electrode of the transistor T2 may be connected to the second electrode of the storage capacitor Cst. Hereinafter, the transistor T2 may be referred to as a scan transistor.

A first electrode of the storage capacitor Cst may be connected to the first power line ELVDDL, and the second electrode of the storage capacitor Cst may be connected to the gate electrode of the transistor T1.

The anode of the light emitting element LD may be connected to the second electrode of the transistor T1, and a cathode of the light emitting element LD may be connected to a second power line ELVSSL. The light emitting element LD may be a light emitting diode. As described above, the light emitting element of each pixel may be configured as an organic light emitting element, an inorganic light emitting element, a quantum dot/well light emitting element, or the like. A plurality of light emitting elements may be connected in series, parallel, series/parallel, etc. During an emission period of the light emitting element LD, a first power voltage applied to the first power line ELVDDL may be higher than a second power voltage of the second power line ELVSSL.

The transistors T1 and T2 may be implemented with a P-type transistor, but those skilled in the art may use at least one transistor as an N-type transistor by reversing the phase of a signal.

When a scan signal having a turn-on level is applied to the ith scan line SLi, the transistor T2 may be turned on. A data voltage charged in the jth data line DLj may be stored in the storage capacitor Cst. The transistor T1 may allow a driving current to flow corresponding to a gate-source voltage difference maintained by the storage capacitor Cst. The driving current may flow through a path of the first power line ELVDDL, the transistor T1, the light emitting element LD, and the second power line ELVSSL. The light emitting element LD may emit light with a luminance corresponding to an amount of the driving current.

Figure 22:
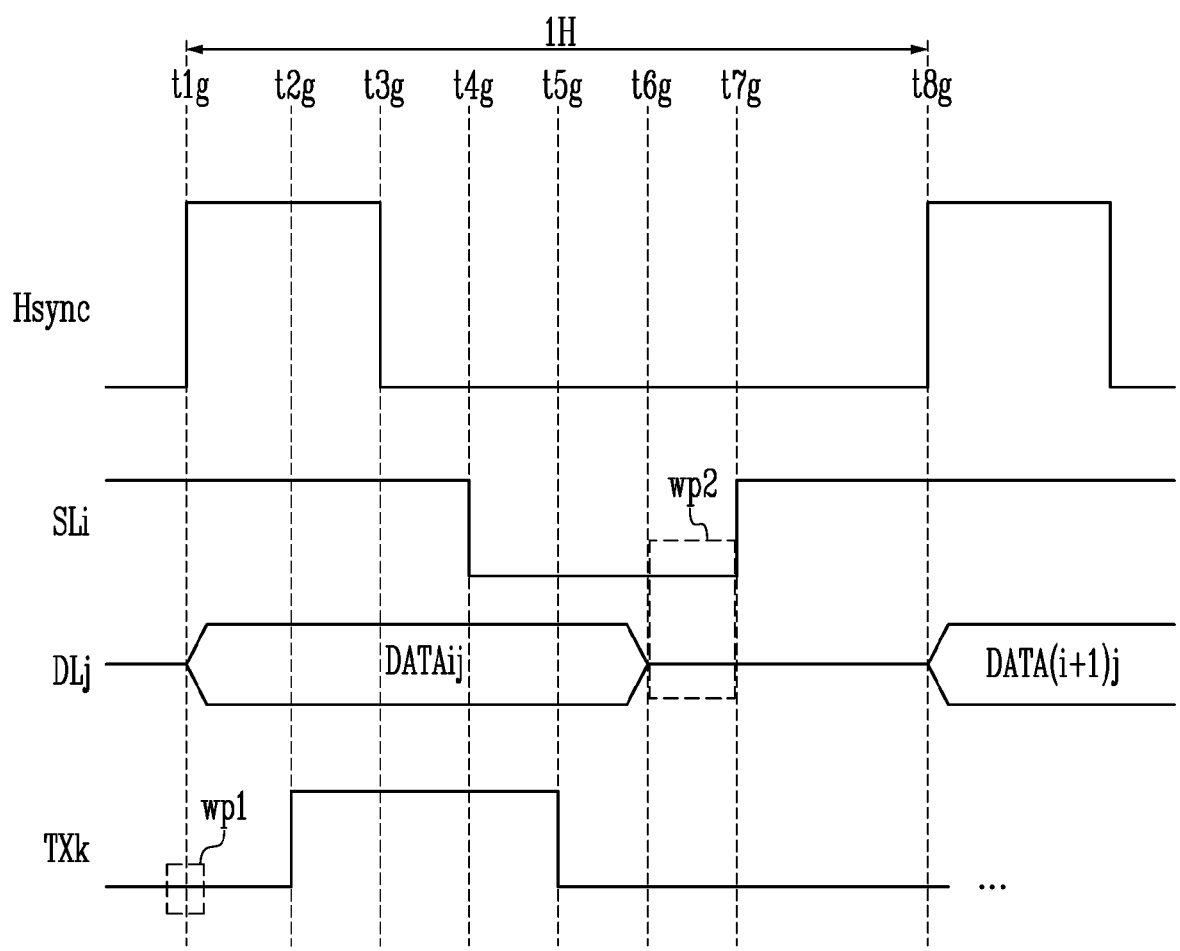
FIGS. 22, 23, and 24 are diagrams illustrating whether timing signals of the sensor driver and a pixel unit are synchronized with each other.
Figure 23:
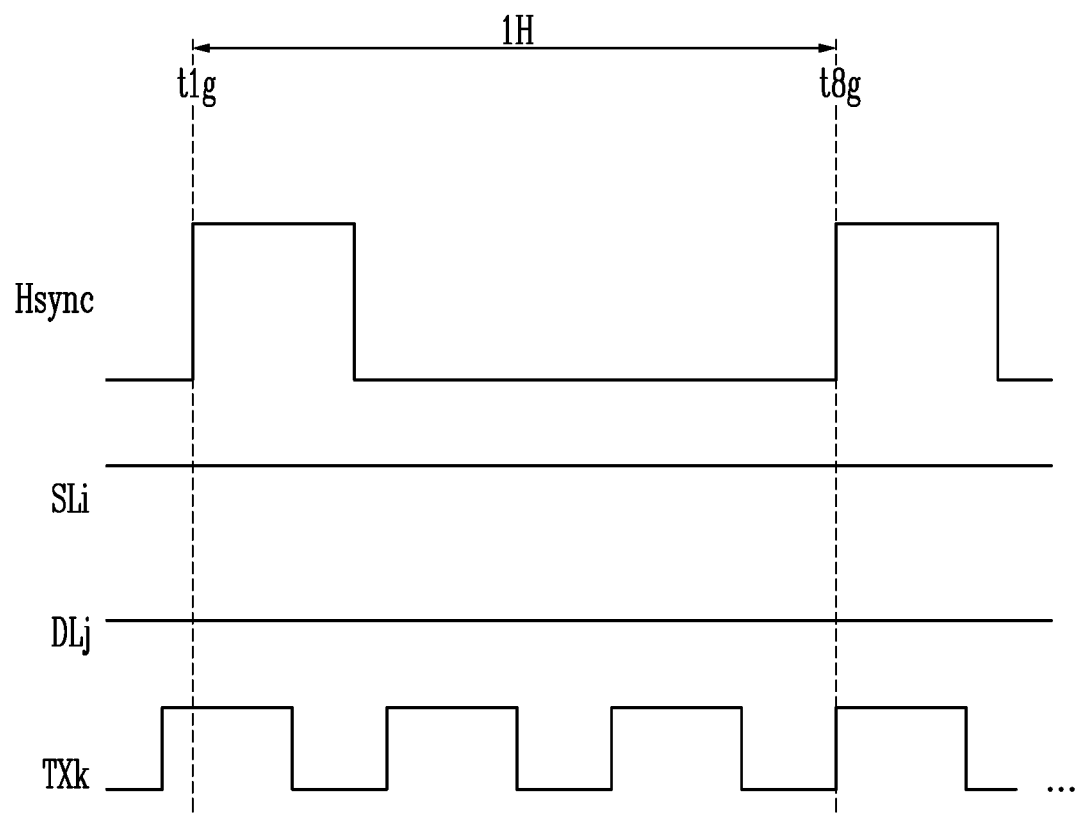
Figure 24:
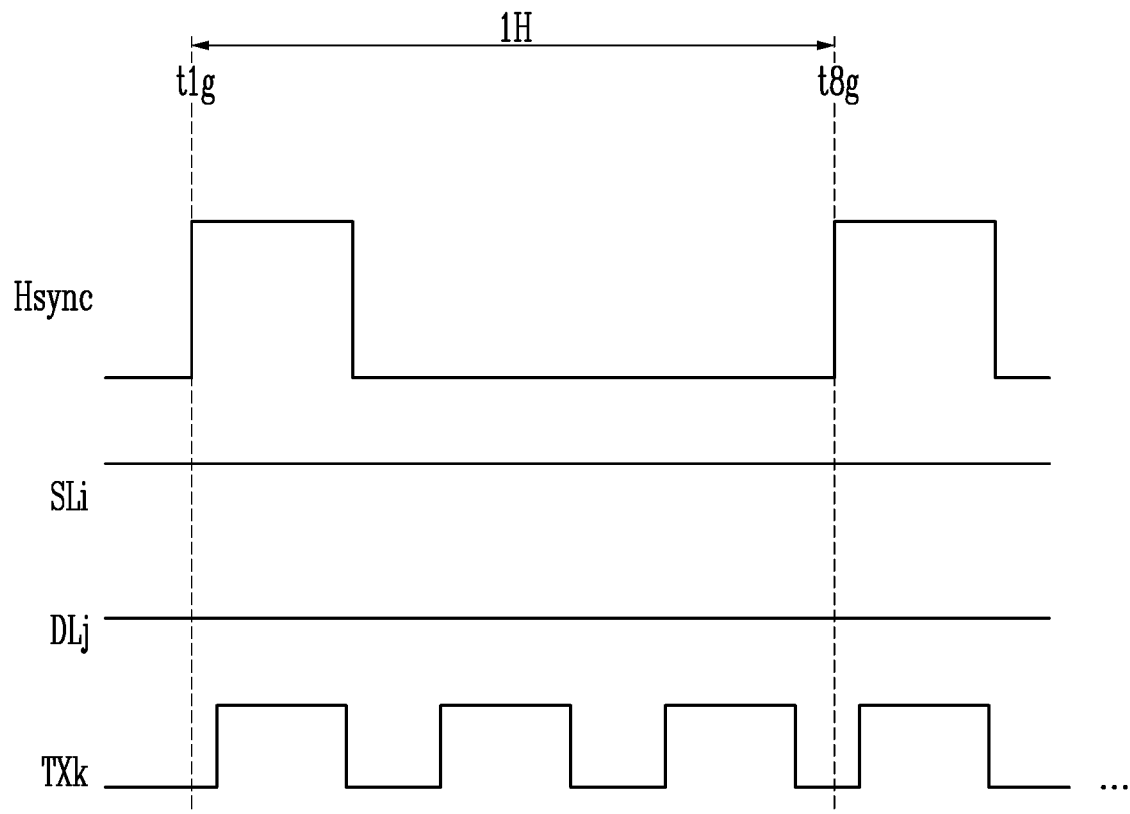

FIGS. 22 to 24 are diagrams illustrating whether timing signals of the sensor driver and the pixel unit are synchronized with each other.

First, referring to FIGS. 1A, 1B, 20 to 22, signals of the ith scan line SLi and the jth data line DLj, which are connected to the pixel PXij, are exemplarily illustrated. In addition, a signal of a kth first sensor TXk is exemplarily illustrated. A horizontal period 1H may include a data write period (i.e., a data voltage storage period) of pixels (e.g., an ith pixel row) connected to the ith scan line SLi.

As described above, the processor 9 may provide timing signals including the vertical synchronization signal and the like to the timing controller 11 (or the display driver 210). In the embodiment shown in FIG. 22, the sensor driver 220 may be configured to receive at least some of the timing signals. The sensor driver 220 may directly receive the timing signals from the processor 9, or receive the timing signals from the timing controller 11 (or the display driver 210). For example, the sensor driver 220 may receive the horizontal synchronization signal Hsync.

The horizontal period 1H may be from a time t1g at which the horizontal synchronization signal Hsync is changed from a first logic level (e.g., a low logic level) to a second logic level (e.g., a high logic level) to a next time t8g at which the horizontal synchronization signal Hsync is changed from the first logic level to the second logic level.

The data driver 12 (or the display driver 210) may start outputting of data voltages DATAij, . . . with respect to at least some (e.g., the ith pixel row) among the pixels PXij at the time t1g during the horizontal period 1H, and end the outputting of the data voltages DATAij, . . . at a time t0g during the horizontal period 1H. For example, the data driver 12 may output a data voltage DATAij to the jth data line DLj during a period t1g to t6g.

The sensor driver 220 (or the sensor transmitter TDC) may transmit a driving signal (e.g., a rising transition signal) to at least some of the sensors at a time t2g different from the time t1g and the time t0g during the horizontal period 1H. For example, the sensor driver 220 may supply a driving signal (e.g., a falling transition signal) to the kth first sensor TXk at a time t5g.

The time t1g at which the data voltage DATAij is changed may correspond to a sensor weakness period wp1. An unintended parasitic capacitance may exist between the kth first sensor TXk and the pixel PXij, and the change of the data voltage DATAij at the time t1g may act as sensing noise on the sensor unit 120. Therefore, the sensor driver 220 may perform sensing while avoiding the sensor weakness period wp1.

In addition, a period t0g to t7g in which the scan transistor T2 is turned on in a state in which the data line DLj is floated since the supply of the data voltage DATAij is ended may correspond to a display weakness period wp2. When a driving signal is supplied in the display weakness period wp2, an erroneous data voltage may be written in the pixel PXij. Therefore, the sensor driver 220 may perform sensing while avoiding the display weakness period wp2.

In accordance with an embodiment, the scan driver 13 may output a scan signal having a turn-on level with respect to at least some PXij of the pixels from a time t4g to the time t7g during the horizontal period 1H. The driving signal may not be supplied from the time t0g to the time t7g.

That is, in a second mode in which the pixel unit 14 is in a display state, it is necessary for the sensor driver 220 to supply the driving signal while avoiding the sensor weakness period wp1 and the display weakness period wp2. Therefore, in the second mode, the sensor driver 220 may be preferably synchronized with the horizontal synchronization signal Hsync.

On the other hand, in a third mode in which the pixel unit 14 is in a non-display state, the sensor driver 220 may not be synchronized with the horizontal synchronization signal Hsync (see FIG. 23). This is because the sensor weakness period wp1 and the display weakness period wp2 do not exist in the third mode. The sensor driver 220 may not receive the timing signals including the horizontal synchronization signal. When the sensor driver 220 is not synchronized with the horizontal synchronization signal Hsync, driving signals are freely supplied, and therefore, a driving signal supply frequency may increase. For example, the sensor driver 220 may set a sensing number per sensing frame period of the third mode to be greater than that per sensing frame period of the second mode. With reference to the sensing frequency shown in FIG. 18, since the sensing frame period of the first mode is shorter than that of the second mode, the sensor driver 220 may set a sensing number per sensing frame period of the first mode to be smaller than that per sensing frame period of the second mode.

In some embodiments, the sensor driver 220 may be synchronized with the horizontal synchronization signal Hsync even in the third mode (see FIG. 24). In the third mode, since the sensor weakness period wp1 and the display weakness period wp2 do not also exist, the driving signals freely supplied as compared with the first mode and the second mode, and therefore, the driving signal supply frequency may increase. However, when comparing a case shown in FIG. 24 with that shown in FIG. 23, the driving signal supply frequency in the case shown in FIG. 24 may be lower than that in the case shown in FIG. 23.

The sensor driver 220 may not be synchronized with the horizontal synchronization signal Hsync in the first mode. In another embodiment, the sensor driver 220 may be synchronized with the horizontal synchronization signal Hsync in the first mode.

FIGS. 25 to 31 are views illustrating an exemplary configuration of the display device. Reference numerals shown in FIGS. 25 to 31 and reference numerals shown in FIGS. 1 to 24 are independent from each other.

Figure 25:
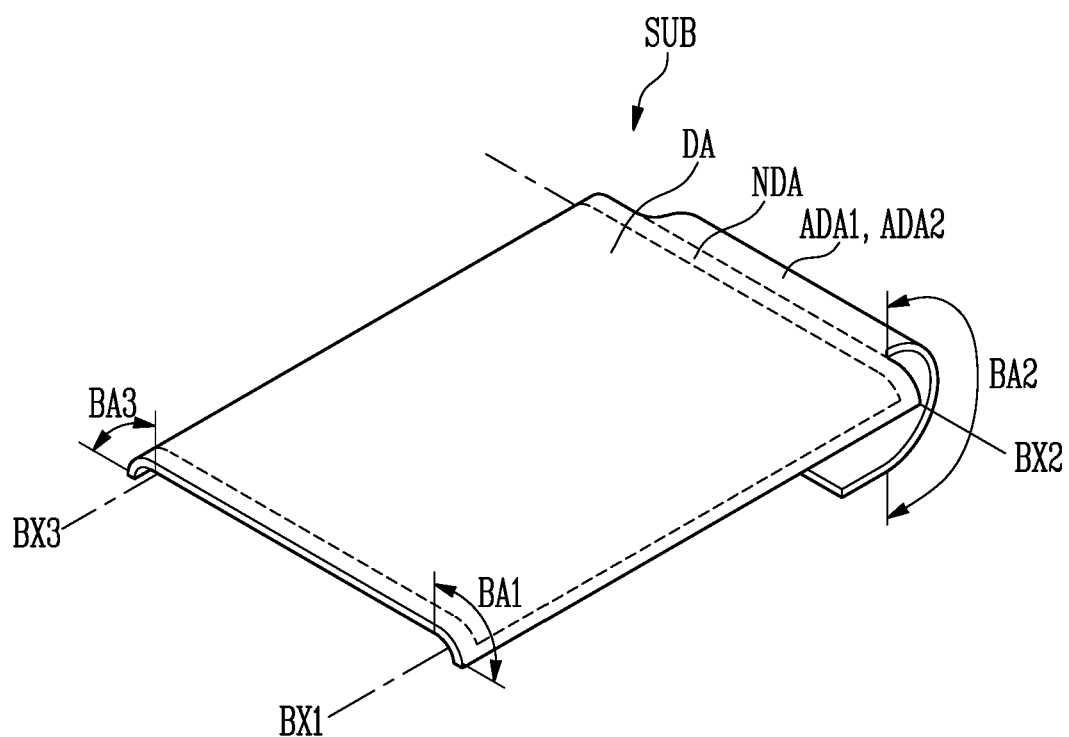
FIGS. 25, 26, 27, 28, 29, 30, and 31 are views illustrating an exemplary configuration of the display device.
Figure 26:
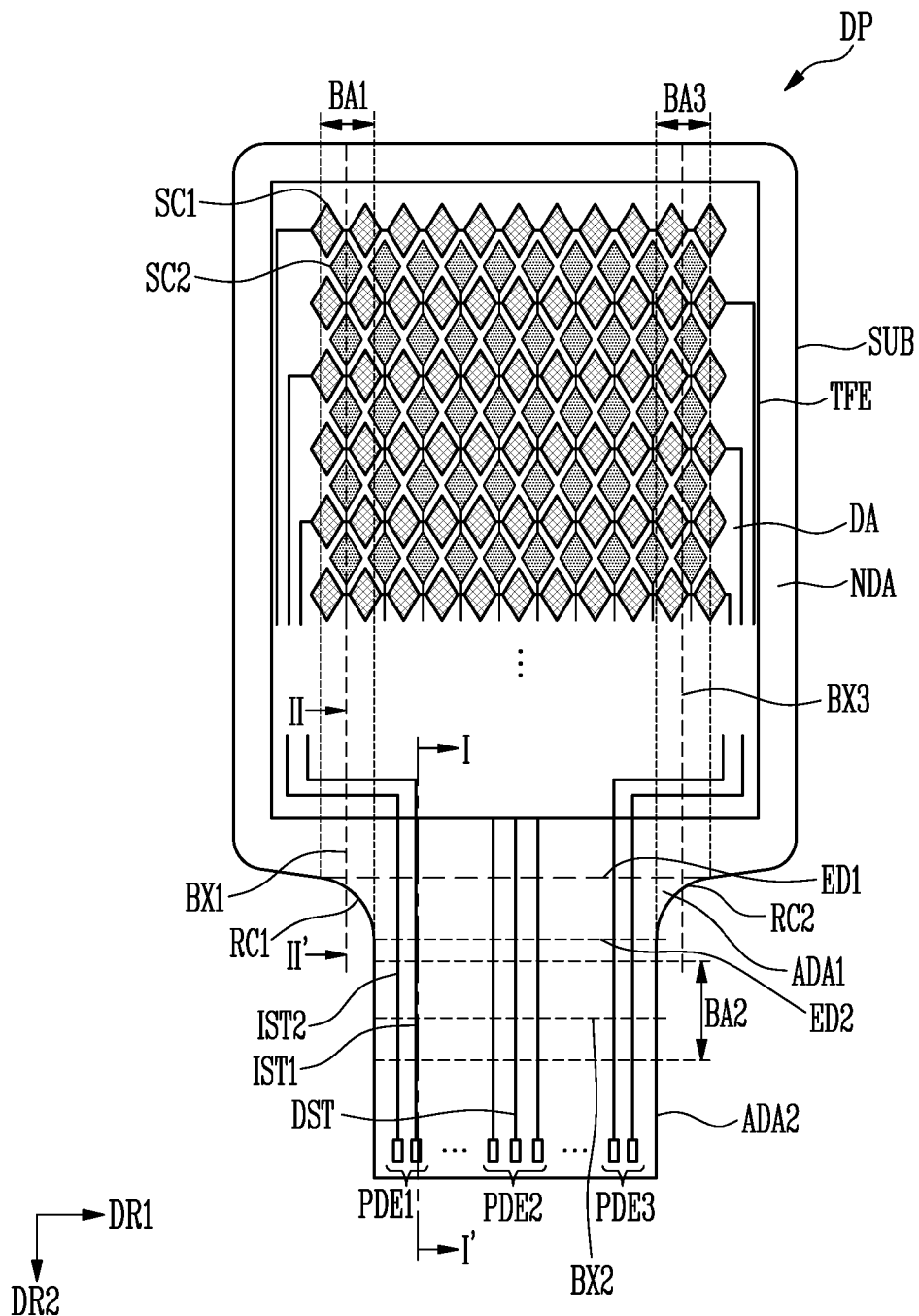

FIG. 25 is a view illustrating a substrate in accordance with an embodiment of the present invention, and FIG. 26 is a view illustrating a display device in accordance with an embodiment of the present invention.

In the following embodiments, a plane may define a position in a first direction DR1 and a second direction DR2, and a height may define a position in a third direction DR3 (see FIG. 27). The first direction DR1, the second direction DR2, and the third direction DR3 may be directions orthogonal to each other.

The substrate SUB may include a display area DA, a non-display area NDA, a first additional area ADA1, and a second additional area ADA2.

The display area DA may have a rectangular shape. Each corner of the display area DA may have an angular shape or a curved shape. Also, in the case of a circular display, the display area DA may have a circular shape. Also, the display area DA may be configured in a polygonal shape, an elliptical shape, or the like, instead of a quadrangular shape. As described above, the shape of the display area DA may be differently set according to products.

Pixels may be located on the display area DA. Each pixel may include a light emitting diode or include a liquid crystal layer according to the kind of the display device DP.

The non-display area NDA may surround the periphery of the display area DA. For example, the display area NDA may have a rectangular shape. Each corner of the non-display area NDA may have an angular shape or a curved shape. A case where each corner of the non-display area NDA has a curved shape is assumed and illustrated in FIG. 26. The non-display area NDA may have a circular shape. That the non-display area NDA is minimized is advantageous in a narrow bezel structure, and therefore, the shape of the non-display area NDA may be similar to that of the display area DA.

The first additional area ADA1 may be located between the non-display area NDA and the second additional area ADA2. The first additional area ADA1 may be connected to the non-display area NDA at a first boundary ED1. The first additional area ADA1 may be connected to the second additional area ADA2 at a second boundary ED2. Each of the first boundary ED1 and the second boundary ED2 may extend in the first direction DR1.

A width of the first additional area ADA1 may become smaller as approaching the second boundary ED2 from the first boundary ED1. That is, a width of the first additional area ADA1 in the first direction DR1 may become smaller along the second direction DR2. Accordingly, the first additional area ADA1 may include a curved first side surface RC1 and a curved second side surface RC2. The side surfaces RC1 and RC2 may be convex toward the inside of the substrate (e.g., the center of the substrate).

In FIG. 26, the first additional area ADA1 is illustrated to include two side surfaces RC1 and RC2 in the first direction DR1 and the opposite direction thereof. In another embodiment, the first additional area ADA1 may include only the first side surface RC1 as a boundary of the first additional area ADA1, which is located in the first direction DR1, accords with that of the non-display area NDA. In still another embodiment, the first additional area ADA1 may include only the second side surface RC2 as a boundary of the first additional area ADA1, which is located in the opposite direction of the first direction DR1, accords with that of the non-display area NDA.

The second additional area ADA2 may have a rectangular shape. Each corner of the second additional area ADA2, which is located in the second direction DR2, may have an angular shape or a curved shape. A case where each corner of the second additional area ADA2, which is located in the second direction DR2, has an angular shape is assumed and illustrated in FIG. 26.

An encapsulation layer TFE may be located over the pixels. For example, the encapsulation layer TFE may cover the pixels in the display area DA, and a boundary of the encapsulation layer TFE may be located in the non-display area NDA. The encapsulation layer TFE covers light emitting elements and pixel circuit elements of the pixels in the display area DA, to prevent damage from external moisture or impact.

Sensing electrodes SC1 and SC2 may be located on the encapsulation layer TFE. The sensing electrodes SC1 and SC2 may sense a touch input by a body of a user, hovering, a gesture, proximity, etc. The sensing electrodes SC1 and SC2 may be configured in another shape according to various types including a resistive type, a capacitive type, an electro-magnetic (EM) type, an optical type, and the like. For example, when the sensing electrodes SC1 and SC2 is configured using the capacitive type, the sensing electrodes SC1 and SC2 may be configured using a self-capacitive type, a mutual capacitive type, or the like. Hereinafter, for convenience of description, a case where the sensing electrodes SC1 and SC2 are configured using the mutual capacitive type will be described as an example.

When the sensing electrodes SC1 and SC2 are configured using the mutual capacitive type, a driving signal may be transmitted through a sensing line corresponding to a first sensing electrode SC1, a sensing signal may be received through a sensing line corresponding to a second sensing electrode SC2 which forms a mutual capacitance together with the first sensing electrode SC1. When a body of a user comes close, the mutual capacitance between the first sensing electrode SC1 and the second sensing electrode SC2 may be changed, and whether a touch of the user is input may be detected according to a difference in sensing signal, which is caused by the change in the mutual capacitance. In another embodiment, a driving signal may be transmitted through the sensing line corresponding to the second sensing electrode SC2, and a sensing signal may be received through the sensing line corresponding to the first sensing electrode SC1 which forms the mutual capacitance together with the second sensing electrode SC2.

Pads PDE1, PDE2, and PDE3 may be located on the second additional area ADA2. Pads PDE1 and PDE3 may be connected to the sensing electrodes SC1 and SC2 located on the encapsulation layer TFE through sensing lines IST1 and IST2. The pads PDE1 and PDE3 may be connected to an external touch integrated circuit (IC). In addition, pads PDE2 may be connected to the pixels or a driver of the pixels, located on the bottom of the encapsulation layer TFE, through display lines DST. The driver may include a scan driver, an emission driver, a data driver, and the like. The driver may be located on the bottom of the encapsulation layer TFE, and be located in an external display IC connected through the pads PDE2.

When the display device DP is of the mutual capacitive type, the touch IC may transmit a driving signal through a first sensing line IST1, and receive a sensing signal through a second sensing line IST2. In another embodiment, the touch IC may transmit a driving signal through the second sensing line IST2, and receive a sensing signal through the first sensing line IST1. When the display device DP is of the self-capacitive type, there may be no difference in driving method between the first sensing line IST1 and the second sensing line IST2. The display lines DST may include a control line, a data line, a power line, and the like, and provide signals such that the pixels can display an image. The signals may be provided from the driver connected to the display lines DST.

FIG. 25 illustrates a state in which the substrate SUB is bent, and FIG. 26 illustrates a state in which the substrate Sub is not bent. The display device DP may be bent as shown in FIG. 25, after elements are stacked on the substrate SUB in a state in which the display device DP is not bent as shown in FIG. 26.

The substrate SUB may include a first bending area BA1 extending to overlap with the non-display area NDA from the first side surface RC1 of the first additional area ADA1. Additionally, the first bending area BA1 may extend to overlap with the display area DA. That is, each of the display area DA, the non-display area NDA, and the first additional area ADA1 may partially overlap with the first bending area BA1. The first bending area BA1 may have a width in the first direction DR1, and have a length extending in the second direction DR2. A first bending axis BX1 may be defined as a folding line extending in the second direction DR2 at the center of the first bending area BA1. In some embodiments, the first bending area BA1 may be a portion at which stress is reduced as a partial insulating layer or the like is removed unlike another portion at the periphery thereof. In some embodiments, the first bending area BA1 may have the same configuration as the another portion at the periphery thereof.

The substrate SUB may include a third bending area BA3 extending to overlap with the non-display area NDA from the second side surface RC2 of the first additional area ADA1. Additionally, the third bending area BA3 may extend to overlap with the display area DA. That is, each of the display area DA, the non-display area NDA, and the first additional area ADA1 may partially overlap with the third bending area BA3. The third bending area BA3 may have a width in the first direction DR1, and have a length extending in the second direction DR2. A third bending axis BX3 may be defined as a folding line extending in the second direction DR2 at the center of the third bending area BA3. In some embodiments, the third bending area BA3 may be a portion at which stress is reduced as a partial insulating layer or the like is removed unlike another portion at the periphery thereof. In some embodiments, the third bending area BA3 may have the same configuration as the another portion at the periphery thereof.

The second additional area ADA2 may include a second bending area BA2. The second bending area BA2 may have a width in the second direction DR2, and have a length extending in the first direction DR1. A second bending axis BX2 may be defined as a folding line extending in the first direction DR1 at the center of the second bending area BA2. In some embodiments, the second bending area BA2 may be a portion at which stress is reduced as a partial insulating layer or the like is removed unlike another portion at the periphery thereof. In some embodiments, the second bending area BA2 may have the same configuration as the another portion at the periphery thereof.

The first to third bending areas BA1, BA2, and BA3 may not overlap with each other.

The term "folded" does not mean a fixed shape but may inclusively mean a shape deformable into another shape from the original shape. The term "folded" may include a shape folded, curved, or rolled like a roll along at least one bending axis. By the first and third bending areas BA1 and BA3, side bezel widths of the display device DP in the first direction DR1 and the opposite direction of the first direction DR1 may be decreased. In addition, by the second bending area BA2, a side bezel width of the display device DP in the second direction DR2 may be decreased.

Figure 27:
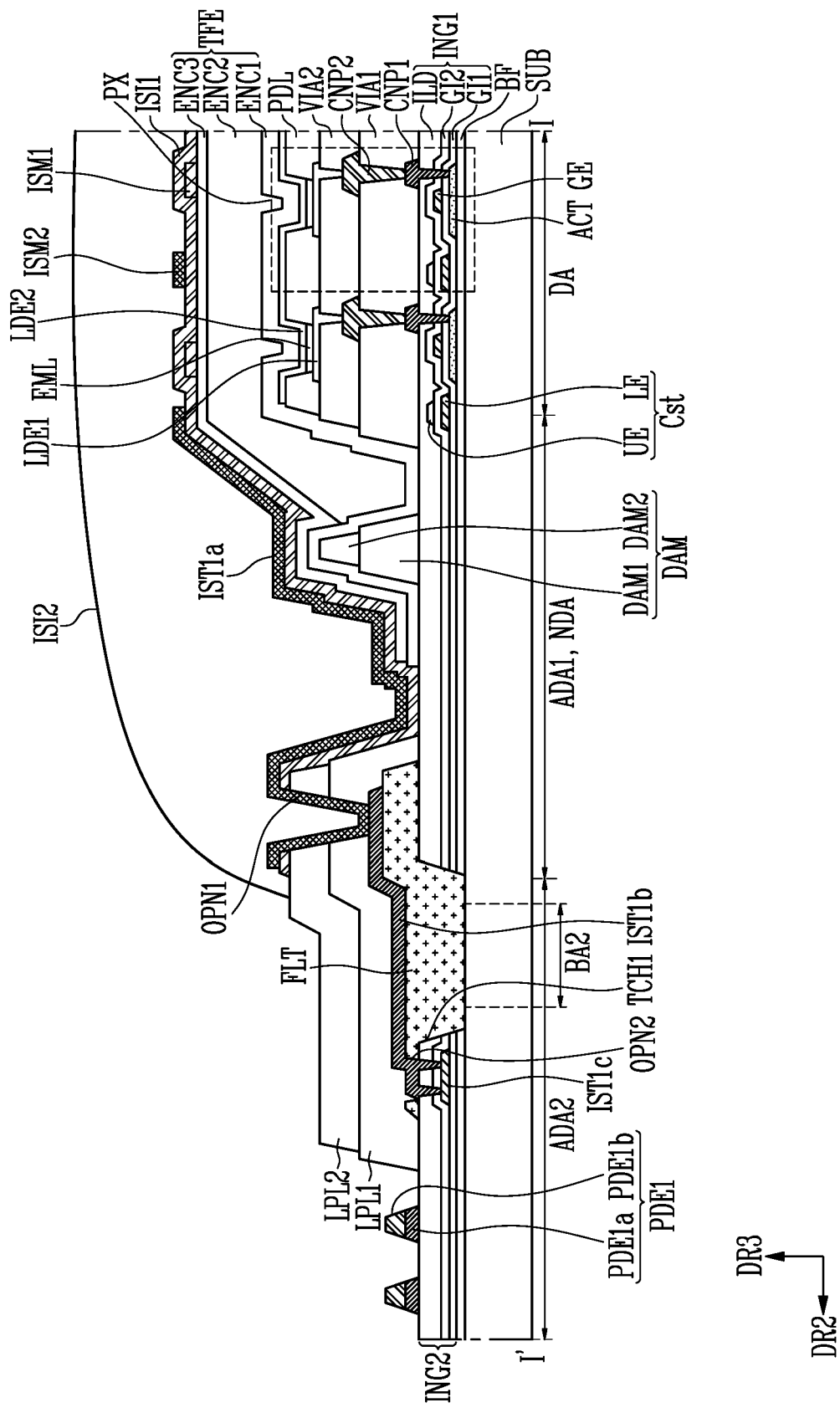

FIG. 27 illustrates an embodiment of a section corresponding to line I-I' shown in FIG. 26. It is assumed that the line I-I' shown in FIG. 26 passes through the first pad PDE1 and the first sensing line IST1.

First, the display area DA will be described. In an embodiment of the present invention, pixels PX are provided in the display area DA. Each pixel PX may include a transistor connected to a corresponding line among the display lines DST, a light emitting element connected to the transistor, and a capacitor Cst. In FIG. 27, for convenience of description, one transistor, one light emitting element, and one capacitor Cst are exemplarily illustrated with respect to one pixel PX.

The substrate SUB may be made of an insulative material, such as glass or resin. Also, the substrate SUB may be made of a material having flexibility to be bendable or foldable, and have a single- or multi-layered structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the substrate SUB may be variously changed, and the substrate SUB may be made of a Fiber Reinforced Plastic (FRP), etc.

For example, when the substrate SUB has a multi-layered structure, inorganic materials, such as silicon nitride, silicon oxide, and silicon oxynitride, may be interposed as a single layer or a multi-layer between a plurality of layers.

A buffer layer BF may cover the substrate SUB. The buffer layer BF may prevent an impurity from being diffused into a channel of the transistor. The buffer layer BF may be an inorganic insulating layer made of an inorganic material. For example, the buffer layer BF may be formed of silicon nitride, silicon oxide, silicon oxynitride, etc. The buffer layer BF may be omitted according to the material and process conditions of the substrate SUB. In some embodiments, a barrier layer may be further provided.

An active layer ACT may be located on the buffer layer BF. The active layer ACT may be patterned to constitute the channel, a source electrode, and a drain electrode of the transistor or to constitute a line. The active layer ACT may be formed of a semiconductor material. The active layer ACT may be a semiconductor pattern made of poly-silicon, amorphous silicon, an oxide semiconductor, etc. The channel of the transistor is a semiconductor pattern undoped with an impurity, and may be an intrinsic semiconductor. The source electrode, the drain electrode, and the line may correspond to a semiconductor pattern doped with the impurity. The impurity may include impurities such as an n-type impurity, a p-type impurity, and other metals.

A first gate insulating layer GI1 may cover the active layer ACT. The first gate insulating layer GI1 may be an inorganic insulating layer made of an inorganic material. The inorganic material may include inorganic insulating materials, such as polysiloxane, silicon nitride, silicon oxide, and silicon oxynitride.

A gate electrode GE of the transistor and a lower electrode LE of the capacitor Cst may be located on the first gate insulating layer GI1. The gate electrode GE may overlap with an area corresponding to the channel.

The gate electrode GE and the lower electrode LE may be made of a metal. For example, the gate electrode GE may be made of at least one of metals, such as gold (Au), silver (Ag), aluminum (Al), molybdenum (Mo), chromium (Cr), titanium (Ti), nickel (Ni), neodymium (Nd), and copper (Cu), or any alloy thereof. Also, the gate electrode GE may be formed as a single layer. However, the inventive concepts are not limited thereto, and the gate electrode GE may be formed as a multi-layer in which two or more material among metals and alloys are stacked.

A second gate insulating layer GI2 may cover the gate electrode GE and the lower electrode LE. The second gate insulating layer GI2 may be an inorganic insulating layer made of an inorganic material. The inorganic material may include polysiloxane, silicon nitride, silicon oxide, silicon oxynitride, etc.

An upper electrode UE of the capacitor Cst may be located on the second gate insulating layer GI2. The upper electrode of the capacitor Cst may be made of a metal. For example, the upper electrode UE may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. Also, the upper electrode UE may be formed as a single layer. However, the inventive concepts are not limited thereto, and the upper electrode UE may be formed as a multi-layer in which two or more material among metals and alloys are stacked.

The lower electrode LE and the upper electrode UE may constitute the capacitor Cst with the second gate insulating layer GI2 interposed therebetween. In FIG. 20, a case where the capacitor Cst has a two-layer electrode structure of the lower electrode LE and the upper electrode UE has been illustrated. However, in another embodiment, the capacitor Cst may be configured in a three-layer electrode structure by using the active layer ACT, be configured in a three-layer electrode structure by using an electrode in the same layer as a first connection pattern CNP1, or be configured in a four or more-layer electrode structure.

An interlayer insulating layer ILD may cover the upper electrode UE. The interlayer insulating layer ILD may be an inorganic insulating layer made of an inorganic material. The inorganic material may include polysiloxane, silicon nitride, silicon oxide, silicon oxynitride, etc.

In this embodiment, for convenience of description, the first gate insulating layer GI1, the second gate insulating layer GI2, and the interlayer insulating layer ILD may be designated as a first insulating layer group ING1. The first insulating layer group ING1 may cover a portion of the transistor. In some embodiments, the first insulating layer group ING1 may further include the buffer layer BF.

The first connection pattern CNP1 may be located on the interlayer insulating layer ILD. The first connection pattern CNP1 may be in contact with each of the source electrode and the drain electrode of the active layer ACT through a contact hole formed in the interlayer insulating layer ILD, the second gate insulating layer GI2, and the first gate insulating layer GI1.

The first connection pattern CNP1 may be made of a metal. For example, the first connection pattern CNP1 may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof.

Although not shown in the drawing, in some embodiments, a passivation layer may cover the first connection pattern CNP1. The passivation layer may be an inorganic insulating layer made of an inorganic material. The inorganic material may include polysiloxane, silicon nitride, silicon oxide, silicon oxynitride, etc.

A first via layer VIA1 may cover the passivation layer or the transistor. The first via layer VIA1 may be an organic insulating layer made of an organic material. The organic material may include an organic insulating material, such as a polyacryl-based compound, a polyimide-based compound, a fluorine-based compound such as Teflon™, or a benzocyclobutene-based compound.

A second connection pattern CNP2 may be connected to the first connection pattern CNP1 through an opening of the first via layer VIA1. The second connection pattern CNP2 may be made of at least one of metals, such as gold (Au), silver (Ag), aluminum (Al), molybdenum (Mo), chromium (Cr), titanium (Ti), nickel (Ni), neodymium (Nd), and copper (Cu), or any alloy thereof.

A second via layer VIA2 may cover the first via layer VIA1 and the second connection pattern CNP2. The second via layer VIA2 may be an organic insulating layer made of an organic material. The organic material may include an organic insulating material, such as a polyacryl-based compound, a polyimide-based compound, a fluorine-based compound such as Teflon™, or a benzocyclobutene-based compound.

A first light emitting element electrode LDE1 may be connected to the second connection pattern CNP2 through an opening of the second via layer VIA2. In some embodiments, the first light emitting element electrode LDE1 may be an anode of the light emitting element.

In some embodiments, the configuration of the second via layer VIA2 and the second connection pattern CNP2 may be omitted, and the first light emitting element electrode LDE1 may be directly connected to the first connection pattern CNP1 through the opening of the first via layer VIA1.

The first light emitting element electrode LDE1 may be made of a metal layer, such as Ag, Mg, Al, Pt, Pd, Au, Ni, Nd, Ir, Cr, or any alloy thereof, and/or a transparent conductive layer, such as indium tin oxide (ITO), indium zinc oxide (IZO), zinc oxide (ZnO), or indium tin zinc oxide (ITZO). The first light emitting element electrode LDE1 may be made of a kind of metal. However, the present invention is not limited thereto, and the first light emitting element electrode LDE1 may be made of an alloy of two or more kinds of metals, e.g., Ag and Mg.

When an image is to be provided in a lower direction of the substrate SUB, the first light emitting element electrode LDE1 may be formed as a transparent conductive layer. When an image is to be provided in an upper direction of the substrate SUB, the first light emitting element electrode LDE1 may be formed as a metal reflective layer and/or a transparent conductive layer.

A pixel defining layer PDL defining an emission area of each pixel PX is provided on the substrate SUB on which the first light emitting element electrode LDE1 and the like are formed. The pixel defining layer PDL may be an organic insulating layer made of an organic material. The organic material may include an organic insulating material, such as a polyacryl-based compound, a polyimide-based compound, a fluorine-based compound, such as Teflon™, or a benzocyclobutene-based compound.

The pixel defining layer PDL may expose a top surface of the first light emitting element electrode LDE1, and protrude from the substrate SUB along the circumference of the pixel PX. A light emitting layer EML may be provided in an area of the pixel PX surrounded by the pixel defining layer PDL.

The light emitting layer EML may include a low molecular material or a high molecular material. The low molecular material may include copper phthalocyanine (CuPc), N,N'-Di(naphthalene-1-yl)-N,N'-diphenyl-benzidine (NPB), tris-8-hydroxyquinoline aluminum ($Alq_3$), etc. These materials may be formed through vacuum deposition. The high molecular material may include PEDOT, a poly-phenylenevinylene-based (PPV)-based material, a polyfluorene-based material, etc.

The light emitting layer EML may be provided as a single layer, but may be provided as a multi-layer including various functional layers. When the light emitting layer EML is provided as the multi-layer, the light emitting layer EML may have a structure in which a hole injection layer (HIL), a hole transport layer (HTL), an emission layer (EMSL), an electron transport layer (ETL), an electron injection layer (EIL), and the like are stacked in a single- or multi-layered structure. The light emitting layer EML may be formed through screen printing or inkjet printing, laser induced thermal imaging (LITI), etc.

In some embodiments, at least a portion of the light emitting layer EML may be integrally formed throughout a plurality of first light emitting element electrodes LDE1, and be individually provided to correspond to each of the plurality of first light emitting element electrodes LDE1.

A second light emitting element electrode LDE2 may be provided on the light emitting layer EML. The second light emitting element electrode LDE2 may be provided for each pixel PX. However, the second light emitting element electrode LDE2 may be provided to cover most of the display area DA, and be shared by a plurality of pixels PX.

In some embodiments, the second light emitting element electrode LDE2 may be used as a cathode or an anode. When the first light emitting element electrode LDE1 is the anode, the second light emitting element electrode LDE2 may be used as the cathode. When the first light emitting element electrode LDE1 is the cathode, the second light emitting element electrode LDE2 may be used as the anode.

The second light emitting element electrode LDE2 may be made of a metal layer, such as Ag, Mg, Al, Pt, Pd, Au, Ni, Nd, Ir, Cr, or any alloy thereof, and/or a transparent conductive layer, such as indium tin oxide (ITO), indium zinc oxide (IZO), zinc oxide (ZnO), or indium tin zinc oxide (ITZO). In an embodiment of the present invention, the second light emitting element electrode LDE2 may be configured as a multi-layer having two or more layers including a metal thin film. For example, the second light emitting element electrode LDE2 may be configured as a triple layer of ITO/Ag/ITO.

When an image is to be provided in a lower direction of the substrate SUB, the second light emitting element electrode LDE2 may be formed as a metal reflective layer and/or a transparent conductive layer. When an image is to be provided in an upper direction of the substrate SUB, the first light emitting element electrode LDE1 may be formed as a transparent conductive layer.

A set of the first light emitting element electrode LDE1, the light emitting layer EML, and the second light emitting element electrode LDE2, which are described above, may be designated as the light emitting element.

The encapsulation layer TFE may be provided over the second light emitting element electrode LDE2. The encapsulation layer TFE may be provided as a single layer or a multi-layer. In this embodiment, the encapsulation layer TFE may be provided with first-to-third encapsulation layers ENC1, ENC2, ENC3. The first-to-third encapsulation layers ENC1, ENC2, and ENC3 may be made of an organic material and/or an inorganic material. The third encapsulation layer ENC3 located at an outermost portion of the encapsulation layer TFE may be made of an inorganic material. For example, the first encapsulation layer ENC1 may be an inorganic layer made of an inorganic material, the second encapsulation layer ENC2 may be an organic layer made of an organic material, and the third encapsulation layer ENC3 may be an inorganic layer made of an inorganic material. As compared with the organic material, moisture or oxygen may penetrate less into the inorganic material, but the inorganic material is weaker and more prone to cracking due to its lesser degree of flexibility. The first encapsulation layer ENC1 and the third encapsulation layer ENC3 are formed of an inorganic material, and the second encapsulation layer ENC2 is formed of an organic material, so that the propagation of cracks can be prevented. The layer made of the organic material, i.e., the second encapsulation layer ENC2 may be completely covered by the third encapsulation layer ENC3 such that an end portion of the second encapsulation layer ENC2 is not exposed to the outside. The organic material may include organic insulating materials, such as a polyacryl-based compound, a polyimide-based compound, a fluorine-based compound, such as Teflon™, and a benzocyclobutene-based compound. The inorganic material may include inorganic insulating materials, such as polysiloxane, silicon nitride, silicon oxide, and silicon oxynitride.

The light emitting layer EML constituting the light emitting element may be easily damaged by moisture, oxygen or the like from the outside. The encapsulation layer TFE covers and thereby protects the light emitting layer EML. The encapsulation layer TFE may cover the display area DA, and extend up to the non-display area NDA as the outside of the display area DA. In the case of insulating layers made of an organic material, the insulating layers are advantageous in terms of flexibility, elasticity, and the like, but moisture or oxygen easily penetrates into the insulating layers, as compared with insulating layers made of an inorganic material. In an embodiment of the present invention, in order to prevent penetration of moisture or oxygen through the insulating layers made of the organic material, end portions of the insulating layers made of the organic material may be covered by the insulating layers made of the inorganic material. For example, the first via layer VIA1, the second via layer VIA2, and the pixel defining layer PDL, which are made of an organic material, do not continuously extend, and may be covered by the first encapsulation layer ENC1. Accordingly, a top surface of the pixel defining layer PDL and side surfaces of the first via layer VIA1, the second via layer VIA2, and the pixel defining layer PDL are encapsulated by the encapsulation layer TFE including an inorganic material, so that exposure to the outside can be prevented.

However, the encapsulation layer TFE is provided as a multi-layer or the material of the encapsulation layer TFE is not limited thereto, and may be variously changed. For example, the encapsulation layer TFE may include a plurality of organic material layers and a plurality of inorganic material layers, which are alternately stacked.

A first sensing electrode layer ISM1 may be located on the encapsulation layer TFE. In some embodiments, an additional buffer layer may be located between the first sensing electrode layer ISM1 and the encapsulation layer TFE. The first sensing electrode layer ISM1 may be configured as a metal layer including Ag, Mg, Al, Pt, Pd, Au, Ni, Nd, Ir, Cr, etc., and/or a transparent conductive layer including indium tin oxide (ITO), indium zinc oxide (IZO), zinc oxide (ZnO), indium tin zinc oxide (ITZO), etc.

A first sensing insulating layer ISI1 may be located over the first sensing electrode layer IMS1. The first sensing insulating layer ISI1 may be an inorganic insulating layer made of an inorganic material. The inorganic material may include inorganic insulating materials, such as polysiloxane, silicon nitride, silicon oxide, and silicon oxynitride.

A second sensing electrode layer ISM2 may be located on the first sensing insulating layer ISI1. The second sensing electrode layer ISM2 may be configured as a metal layer including Ag, Mg, Al, Pt, Pd, Au, Ni, Nd, Ir, Cr, etc., and/or a transparent conductive layer including indium tin oxide (ITO), indium zinc oxide (IZO), zinc oxide (ZnO), indium tin zinc oxide (ITZO), etc.

Various input sensing units may be configured using the first sensing electrode layer ISM1, the first sensing insulating layer ISI1, and the second sensing electrode layer ISM2, which will be described later with reference to FIGS. 29 to 31.

In the embodiment shown in FIG. 27, the second sensing electrode layer ISM2 may be patterned to constitute a first pattern IST1a of the first sensing line IST1.

A second sensing insulating layer ISI2 may be located over the second sensing electrode layer ISM2. The second sensing insulating layer ISI2 may be configured as an organic layer. For example, the organic material may include an organic insulating material, such as a polyacryl-based compound, a polyimide-based compound, a fluorine-based compound such as Teflon™, or a benzocyclobutene-based compound. For example, the second sensing insulating layer ISI2 may include polymethyl methacrylate, polydimethylsiloxane, polyimide, acrylate, polyethylene terephthalate, polyethylene naphthalate, etc.

Next, the non-display area NDA, the first additional area ADA1, and the second additional area ADA2 will be described. There are no characteristics distinguishing the non-display area NDA and the first additional area ADA1 on a section shown in FIG. 27, and therefore, the non-display area NDA and the first additional area ADA1 are described without distinguishing the non-display area NDA and the first additional area ADA1 from each other. Hereinafter, in describing of the non-display area NDA and the second additional area ADA2, descriptions of portions which have already been described above will be omitted or simplified.

A dam DAM may be located at a boundary of the second encapsulation layer ENC2. For example, the dam DAM may be located between a planarization layer FLT and the second encapsulation layer ENC2. The dam DAM may have a double-layered structure. For example, the dam DAM may include a first dam DAM1 and a second dam DAM2. For example, the first and second dams DAM1 and DAM2 may be made of an organic material. Each of the first and second dams DAM1 and DAM2 may correspond to any one of the first via layer VIA1, the second via layer VIA2, and the pixel defining layer PDL. For example, when the first dam DAM1 is formed of the same material as the first via layer VIA1 through the same process as the first via layer VIA1, the second dam DAM2 may be formed of the same material as the second via layer VIA2 or the pixel defining layer PDL through the same process as the second via layer VIA2 or the pixel defining layer PDL. In another example, when the first dam DAM1 is formed of the same material as the second via layer VIA2 through the same process as the second via layer VIA2, the second dam DAM2 may be formed of the same material as the pixel defining layer PDL through the same process as the pixel defining layer PDL. In addition, when a spacer is formed on the pixel defining layer of the display area DA, the dam DAM may be formed by using the same material as the spacer.

The dam DAM prevents the organic material of the second encapsulation layer ENC2 having strong liquidity from overflowing to the outside of the dam DAM. The first and third encapsulation layers ENC1 and ENC3, which are made of the inorganic material, extend while covering the data DAM, so that adhesion of the first and third encapsulation layers ENC1 and ENC3 with the substrate SUB or other layers on the top of the substrate SUB.

A first pad PDE1 is located on the substrate SUB, and may be spaced apart from the planarization layer FLT. The first pad PDE1 may be supported by a second insulating layer group ING2. Insulating layers of the second insulating layer group ING2 may respectively correspond to those of the first insulating layer group ING1. The first pad PDE1 may include a first pad electrode PDE1a and a second pad electrode PDE1b. The first pad electrode PDE1a may be made of the same material as the first connection pattern CNP1. The second pad electrode PDE1b may be made of the same material as the second connection pattern CNP2.

The planarization layer FLT is located on the substrate SUB, and may be spaced apart from an area covered by the encapsulation layer TFE. The planarization layer FLT may be an organic insulating layer made of an organic material. The organic material may include an organic insulating material, such as a polyacryl-based compound, a polyimide-based compound, a fluorine-based compound, such as Teflon™, or a benzocyclobutene-based compound.

In this embodiment, the planarization layer FLT may be formed before the first connection pattern CNP1 is formed after the interlayer insulating layer ILD is formed. Therefore, the planarization layer FLT and the first via layer VIA1 may be formed through different processes. In some embodiments, the planarization layer FLT and the first via layer VIA1 may include different organic materials.

One end of the planarization layer FLT may cover the first insulating layer group ING1. In addition, a portion of the planarization layer FLT corresponding to the second bending area BA2 may fill a first trench TCH1 between the first insulating layer group ING1 and the second insulating layer group ING2.

Since inorganic insulating layers have a high degree of hardness and a small degree of flexibility, as compared with organic insulating layers, the probability that cracks will occur in the inorganic insulating layers is relatively high. When cracks occur in the inorganic insulating layers, the cracks may propagate to lines on the inorganic insulating layers. As a result, a failure, such as line disconnection, may occur.

Accordingly, as shown in FIG. 27, the inorganic insulating layers are removed in the second bending area BA2, so that the first trench TCH1 can be formed, and the first insulating layer group ING1 and the second insulating layer group ING2 can be distinguished from each other. In this embodiment, a case where all inorganic insulating layers corresponding to the area of the first trench TCH1 are removed has been illustrated. However, in another embodiment, some inorganic insulating layers may remain. Some of these remaining inorganic insulating layers may include a slit, so that bending stress can be dispersed.

A second pattern IST1*b* of the first sensing line IST1 may extend on the planarization layer FLT, and be electrically connected to the first pad PDE1. In this embodiment, the second pattern IST1*b* may be formed of the same material as the first connection pattern CNP1 through the same process as the first connection pattern CNP1.

A first line protective layer LPL1 may cover the planarization layer FLT and the second pattern IST1*b*. In addition, a second line protective layer LPL2 may cover the first line protective layer LPL1. In some embodiments, the configuration of the second line protective layer LPL2 may be omitted. The first and second line protective layers LPL1 and LPL2 may be made of an organic material. Each of the first and second line protective layers LPL1 and LPL2 may correspond to any one of the first via layer VIA1, the second via layer VIA2, and the pixel defining layer PDL. For example, when the first line protective layer LPL1 is formed of the same material as the first via layer VIA1 through the same process as the first via layer VIA1, the second line protective layer LPL2 may be formed of the same material as the second via layer VIA2 or the pixel defining layer PDL through the same process as the second via layer VIA2 or the pixel defining layer PDL. In another example, when the first line protective layer LPL1 is formed of the same material as the second via layer VIA2 through the same process as the second via layer VIA2, the second line protective layer LPL2 may be formed of the same material as the pixel defining layer PDL through the same process as the pixel defining layer PDL.

The first and second line protective layers LPL1 and LPL2 and the first sensing insulating layer ISI1 may include a first opening OPN1 exposing the second pattern IST1*b*.

The first pattern IST1*a* may be connected to the second pattern IST1*b* through the first opening OPN1. In accordance with this embodiment, a height of the second pattern IST1*b* located on one end of the first insulating layer group ING1 and the planarization layer FLT may be greater than that of the second pattern IST1*b* located on the planarization layer FLT corresponding to the first trench TCH1.

Thus, the first pattern IST1*a* and the second pattern IST1*b* can be directly connected to each other without another bridge pattern. Since the bridge pattern does not exist, connection reliability between the first pattern IST1*a* and the second pattern IST1*b* is improved. Further, the length of the non-display area NDA can be decreased by the length of the bridge pattern. Accordingly, a dead space can be decreased, and a thin bezel can be easily implemented.

A third pattern IST1*c* of the first sensing line IST1 may connect the first pad PDE1 and the second pattern IST1*b* to each other. The third pattern IST1*c* may be formed of the same material as the gate electrode GE of the transistor through the same process as the gate electrode GE of the transistor. In some embodiments, the third pattern IST1*c* may be formed of the same material as the upper electrode UE through the same process as the upper electrode UE. In some embodiments, an odd-numbered third pattern IST1*c* may be formed of the same material as the gate electrode GE of the transistor through the same process as the gate electrode GE of the transistor, and an even-numbered third pattern IST1*c* may be formed of the same material as the upper electrode UE through the same process as the upper electrode UE. On the contrary, the even-numbered third pattern IST1*c* may be formed of the same material as the gate electrode GE of the transistor through the same process as the gate electrode GE of the transistor, and the odd-numbered third pattern IST1*c* may be formed of the same material as the upper electrode UE through the same process as the upper electrode UE. Accordingly, the problem of a short circuit between adjacent lines can be more efficiently prevented.

The second insulating layer group ING2 may include a second opening OPN2 exposing the third pattern IST1*c*. In addition, the planarization layer FLT may include an opening corresponding to the second opening OP2. The second pattern IST1*b* may be connected to the third pattern IST1*c* though the second opening OP2.

Figure 28:
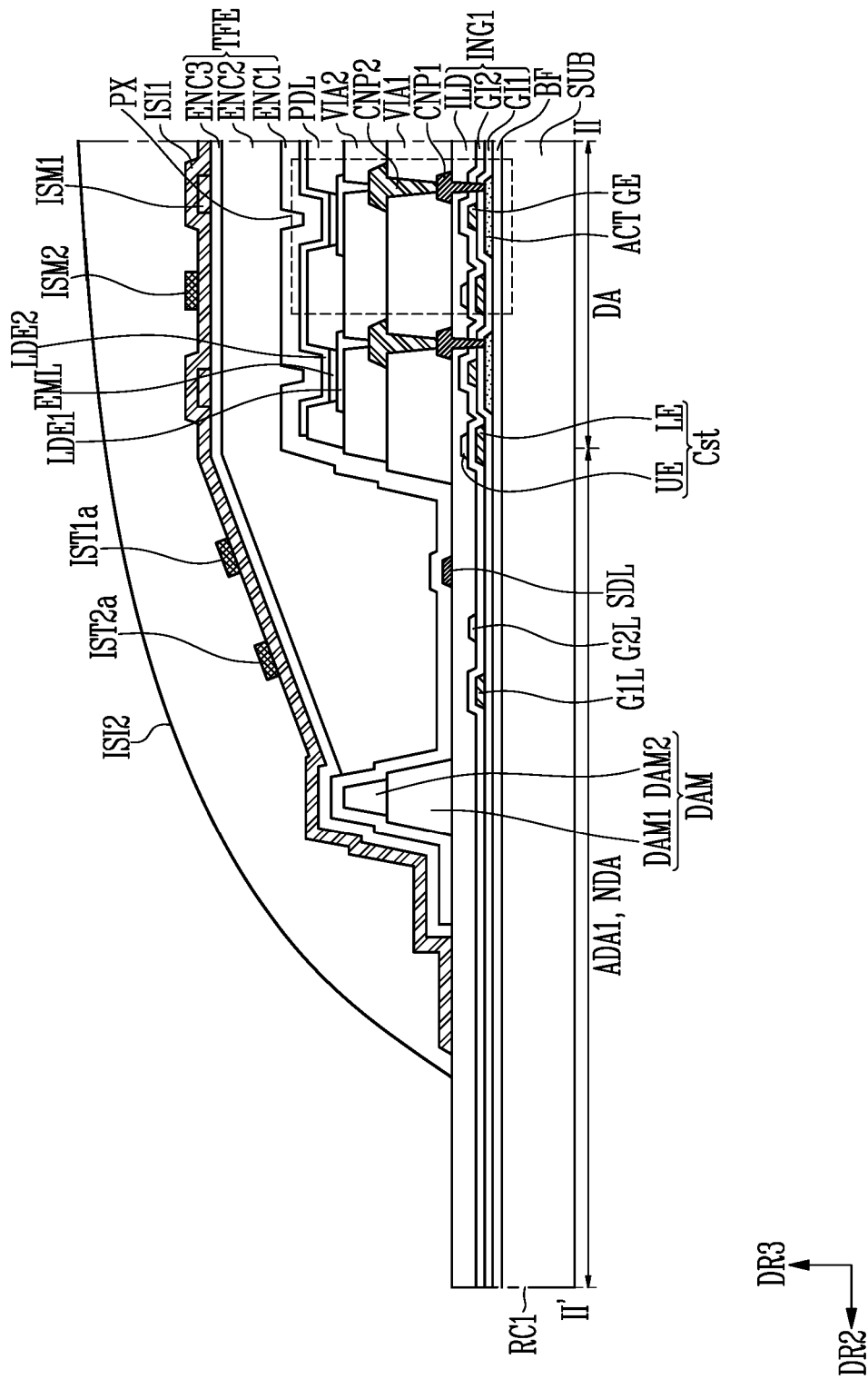

FIG. 28 illustrates an embodiment of a section corresponding to line II-II' shown in FIG. 26. The line II-II' shown in FIG. 26 may correspond to the first bending axis BX1. However, the same embodiment may be applied to not only the first side surface RC1 but also the second side surface RC2.

The display lines DST may be configured as a single-layered line or a multi-layered line by using at least one of lines G1L, G2L, and SDL. The line GIL may be formed of the same material as the gate electrode GE through the same process as the gate electrode GE. The line G2L may be formed of the same material as the upper electrode UE through the same process as the upper electrode UE. The line SDL may be formed of the same material as the first connection pattern CNP1 through the same process as the first connection pattern CNP1.

The patterns IST1*a* and IST2*a* of the sensing lines IST1 and IST2 are located on the encapsulation layer TFE and the first sensing insulating layer ISI1 (with respect to the third direction DR3), and may be located between the dam DAM and the display area DA (with respect to the second direction DR2). The first sensing insulating layer ISI1 may be located between the encapsulation layer TFE and the sensing lines IST1 and IST2.

Figure 29:
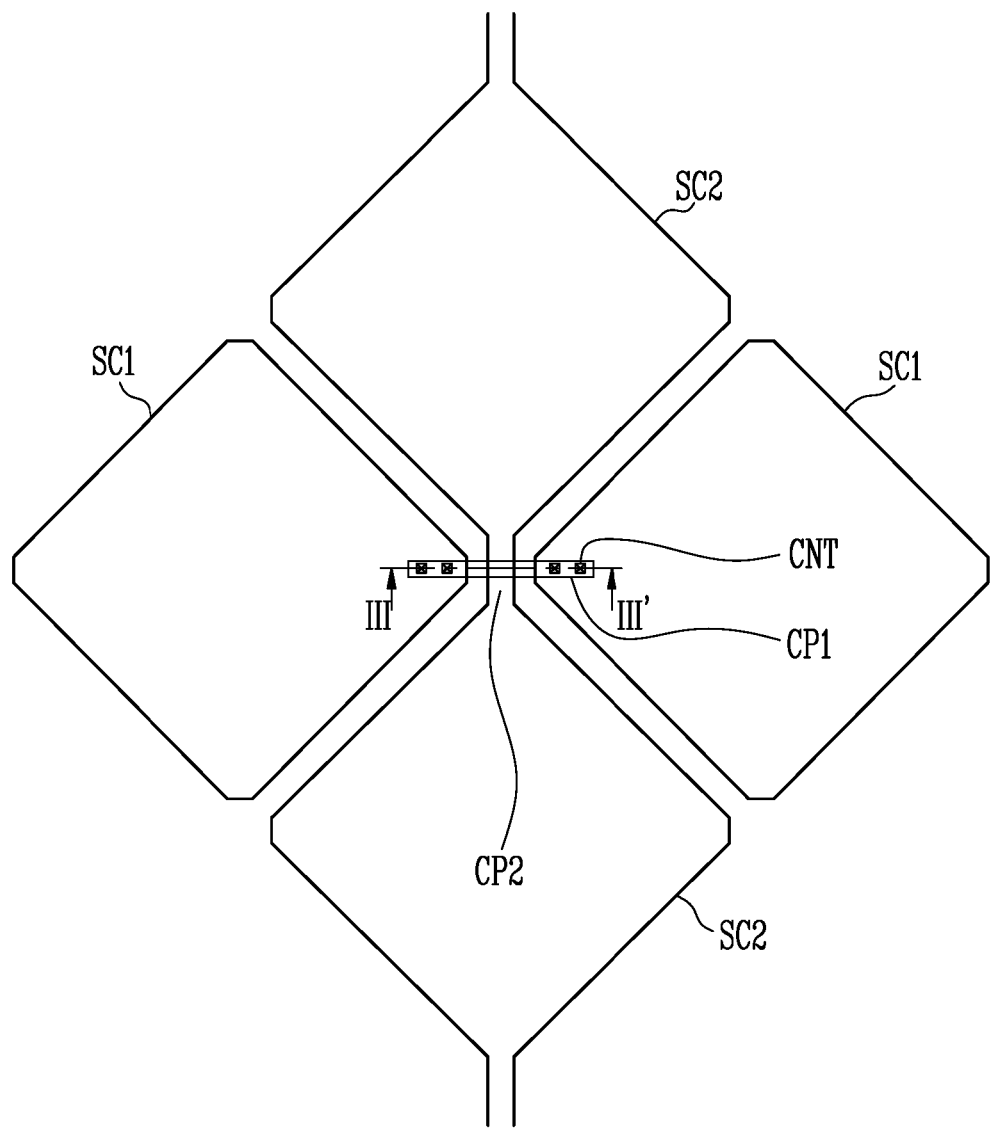
Figure 30:
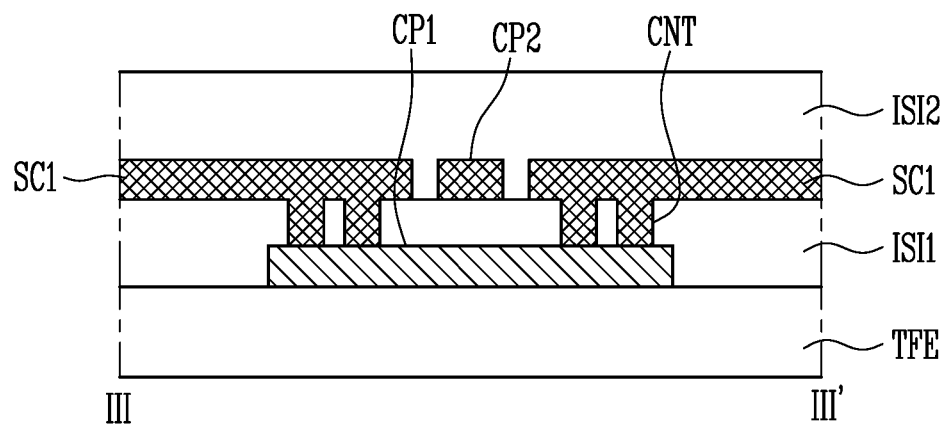

FIGS. 29 and 30 are views illustrating sensing electrodes and bridge electrodes in accordance with an embodiment of the present invention. FIG. 30 is a sectional view taken along line III-III' shown in FIG. 29.

Bridge electrodes CP1 may be located on the encapsulation layer TFE by patterning the first sensing electrode layer ISM1.

The first sensing insulating layer ISI1 covers the bridge electrodes CP1, and may include contact holes CNT exposing some of the bridge electrodes CP1.

First sensing electrodes SC1 and second sensing electrodes SC2 may be formed on the first sensing insulating layer ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. Therefore, any separate bridge electrode may be unnecessary when the second sensing electrodes SC2 are connected to each other.

In some embodiments, each of the sensing electrodes SC1 and SC2 may cover a plurality of pixels PX. When each of the sensing electrodes SC1 and SC2 is configured as an opaque conductive layer, each of the sensing electrodes SC1 and SC2 may include a plurality of openings capable of exposing the plurality of pixels PX covered thereby. For example, each of the sensing electrodes SC1 and SC2 may be configured in a mesh form. When each of the sensing electrodes SC1 and SC2 is configured as a transparent conductive layer, each of the sensing electrodes SC1 and SC2 may be configured in the form of a plate which does not any opening.

Figure 31:
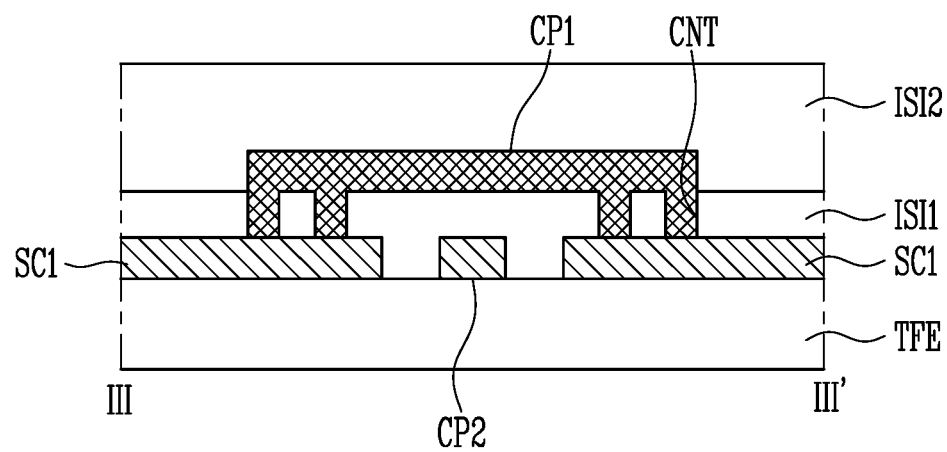

FIG. 31 is a view illustrating sensing electrodes and bridge electrodes in accordance with another embodiment of the present invention. FIG. 31 is a sectional view taken along line III-III' shown in FIG. 29.

First sensing electrodes SC1 and second sensing electrodes SC2 may be located on the encapsulation layer TFE by patterning the first sensing electrode layer ISM1.

The first sensing insulating layer ISI1 covers the first sensing electrodes SC1 and the second sensing electrodes SC2, and may include contact holes CNT exposing some of the first and second sensing electrodes SC1 and SC2.

Bridge electrodes CP1 may be located on the first sensing insulating layer ISI1 by patterning the second sensing electrode layer ISM2. The bridge electrodes CP1 may be connected to the first sensing electrodes SC1 through the contact holes CNT.

Figure 32:
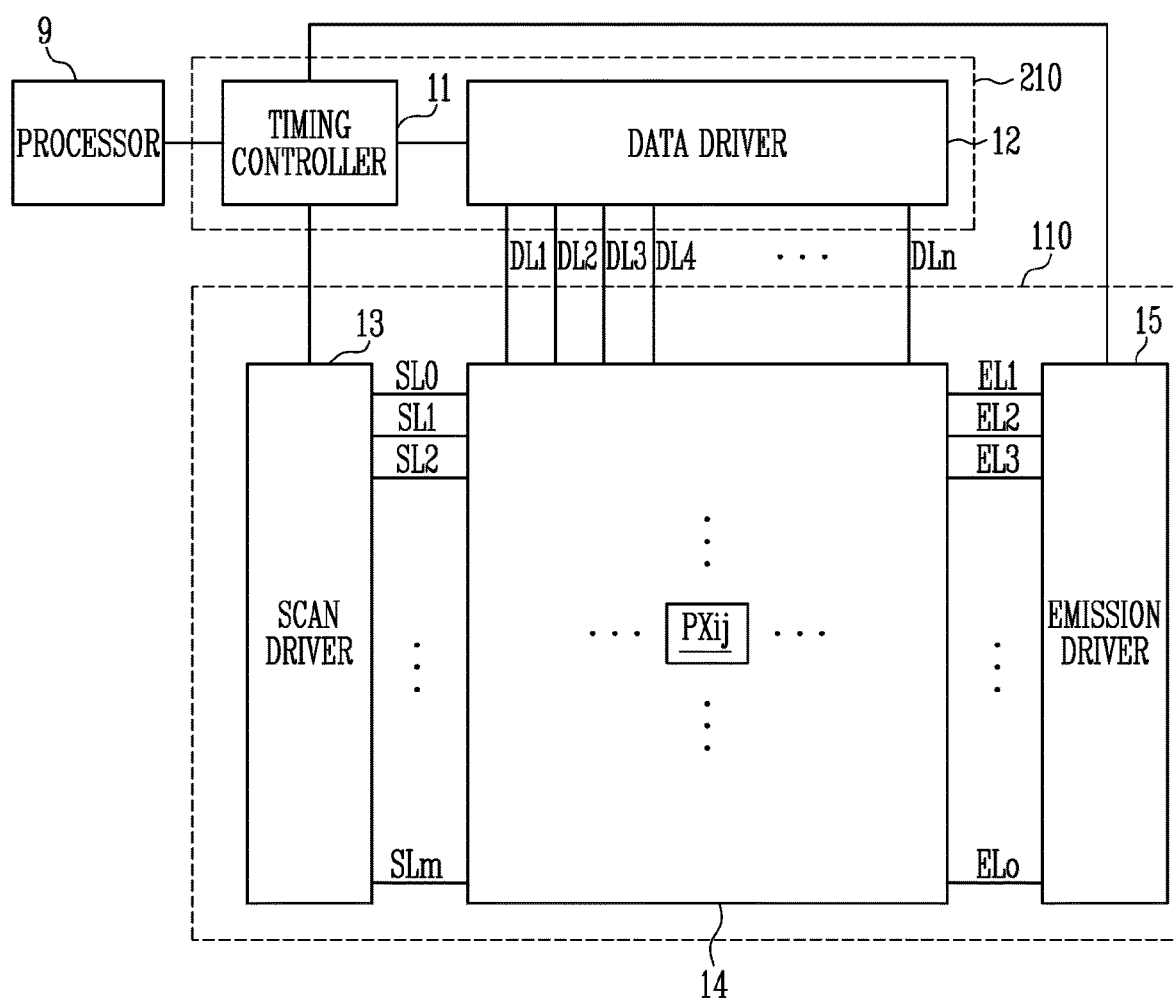
FIGS. 32, 33, and 34 are diagrams illustrating a display device including a pixel in accordance with another embodiment of the present invention.
Figure 33:
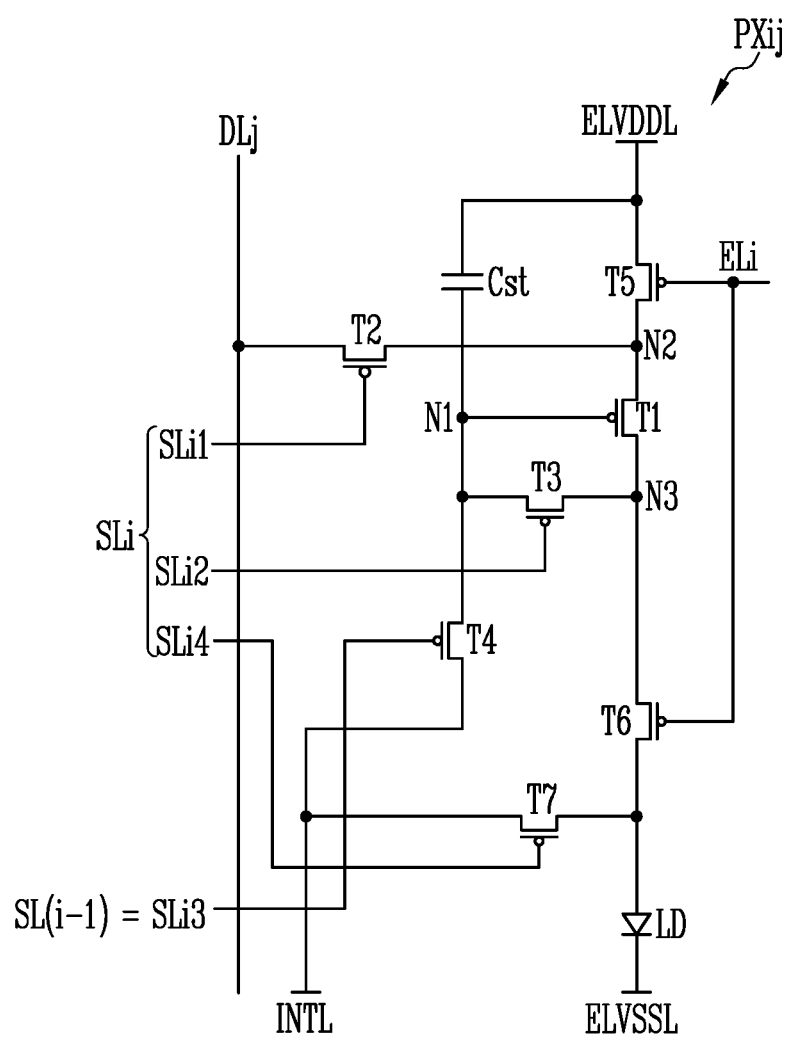
Figure 34:
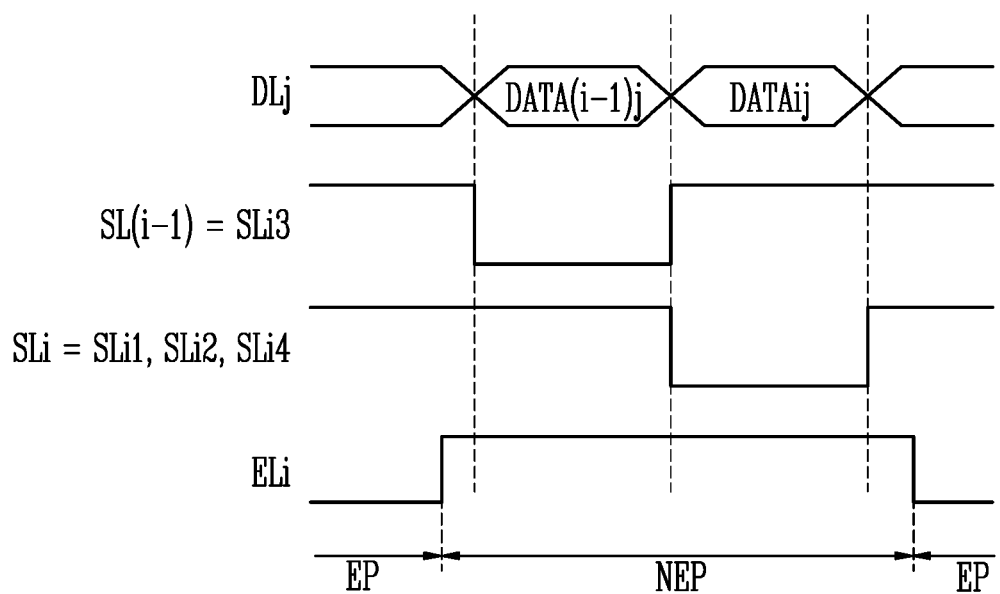

FIGS. 32 to 34 are diagrams illustrating a display device including a pixel in accordance with another embodiment of the present invention.

FIG. 32 is a diagram illustrating a display unit and a display driver in accordance with an embodiment of the present invention.

Referring to FIG. 32, the display driver 210 may include a data driver 12 and a timing controller 11, and the display unit 110 may include a scan driver 13, a pixel unit 14, and an emission driver 15. However, as described above, whether functional units are to be integrated in one IC, to be integrated in a plurality of ICs, or to be mounted on the display substrate 111 may be variously configured according to specifications of the display device 1.

The timing controller 11 may receive grayscales for each display frame period and timing signals from a processor 9. The processor 9 may correspond to at least one of a Graphics Processing Unit (GPU), a Central Processing Unit (CPU), an Application Processor (AP), and the like. The timing signals may include a vertical synchronization signal, a horizontal synchronization signal, a data enable signal, and the like.

Each cycle of the vertical synchronization signal may correspond to each display frame period. Each cycle of the horizontal synchronization signal may correspond to each horizontal period. The grayscales may be supplied by using a horizontal line as a unit in each horizontal period, corresponding to a pulse having an enable level of the data enable signal. The horizontal line may mean pixels (e.g., a pixel row) connected to the same scan line and the same emission line.

The timing controller 11 may render grayscales to correspond to the specifications of the display device 1. For example, the processor 9 may provide a red grayscale, a green grayscale, and a blue grayscale with respect to each unit dot. For example, when the pixel unit 14 has a RGB stripe structure, pixels may correspond one-to-one to the respective grayscales. Therefore, it may be unnecessary to render the grayscales. However, for example, when the pixel unit 14 has a PENTILE™ structure, adjacent unit dots share a pixel with each other, and hence, the pixels may not correspond one-to-one to the respective grayscales. Therefore, it may be necessary to render the grayscales. Grayscales which are rendered or are not rendered may be provided to the data driver 12. Also, the timing controller 11 may provide a data control signal to the data driver 12. Also, the timing controller 11 may provide a scan control signal to the scan driver 13, and provide an emission control signal to the emission driver 15.

The data driver 12 may generate data voltages (i.e., data signals) to be provided to data lines DL1, DL2, DL3, DL4, . . . , and DLn by using the grayscales and the data control signal, which are received from the timing controller 11. Here, n may be an integer greater than 0.

The scan driver 13 may generate scan signals to be provided to scan lines SL0, SL1, SL2, . . . , and SLm by using a scan control signal (e.g., a clock signal, a scan start signal, and the like) received from the timing controller 11. The scan driver 13 may sequentially supply the scan signals having a pulse of a turn-on level to the scan lines SL0 to SLm. The scan driver 13 may include scan stages configured in the form of shift registers. The scan driver 13 may generate the scan signals in a manner that sequentially transfers the scan start signal in the form of a pulse of the turn-on level to a next scan stage under the control of the clock signal. Here, m may be an integer greater than 0.

The emission driver 15 may generate emission signals to be provided to emission lines EL1, EL2, EL3, . . . , ELo by using an emission control signal (e.g., a clock signal, an emission stop signal, and the like) received from the timing controller 11. The emission driver 15 may sequentially supply the emission signals having a pulse of a turn-off level to the emission lines EL1 to ELo. The emission driver 15 may include emission stages configured in the form of shift registers. The emission driver 15 may generate the emission signals in a manner that sequentially transfers the emission stop signal in the form of a pulse of the turn-off level to a next emission stage under the control of the clock signal. Here, o may be an integer greater than 0.

The pixel unit includes pixels PXij. Each pixel PXij may be connected to a corresponding data line, a corresponding scan line, and a corresponding emission line. The pixels PXij may include pixels emitting light of a first color, pixels emitting light of a second color, and pixels emitting light of a third color. The first color, the second color, and the third color may be different colors. For example, the first color may be one color among red, green, and blue, the second color may be one color except the first color among red, green, and blue, and the third color may be the other color except the first color and the second color among red, green, and blue. In addition, magenta, cyan, and yellow instead of red, green, and blue may be used as the first to third colors.

FIG. 33 is a circuit diagram illustrating a pixel in accordance with an embodiment of the present invention.

Referring to FIG. 33, the pixel PXij may include transistors T1, T2, T3, T4, T5, T6, and T7, a storage capacitor Cst, and a light emitting element LD.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The P-type transistor refers to a transistor in which an amount of current flowing when the difference in voltage between a gate electrode and a source electrode increases in a negative direction increases. The N-type transistor refers to a transistor in which an amount of current flowing when the difference in voltage between a gate electrode and a source electrode increases in a positive direction increases. The transistor may be configured in various forms including a Thin Film Transistor (TFT), a Field Effect Transistor (FET), a Bipolar Junction Transistor (BJT), and the like.

A gate electrode of the first transistor T1 may be connected to a first node N1, a first electrode of the first transistor T1 may be connected to a second node N2, and a second electrode of the first transistor T1 may be connected to a third node N3. The first transistor T1 may be referred to as a driving transistor.

A gate electrode of a second transistor T2 may be connected to a scan line SLi1, a first electrode of the second transistor T2 may be connected to a data line DLj, and a second electrode of the second transistor T2 may be connected to the second node N2. The second transistor T2 may be referred to as a scan transistor.

A gate electrode of a third transistor T3 may be connected to a scan line SLi2, a first electrode of the third transistor T3 may be connected to the first node N1, and a second electrode of the third transistor T3 may be connected to the third node N3. The third transistor T3 may be referred to as a diode connection transistor.

A gate electrode of a fourth transistor T4 may be connected to a scan line SLi3, a first electrode of the fourth transistor T4 may be connected to the first node N1, and a second electrode of the fourth transistor T4 may be connected to an initialization line INTL. The fourth transistor T4 may be referred to as a gate initialization transistor.

A gate electrode of the fifth transistor T5 may be connected to an ith emission line ELi, a first electrode of the fifth transistor T5 may be connected to a first power line ELVDDL, and a second electrode of the fifth transistor T5 may be connected to the second node N2. The fifth transistor T5 may be referred to as an emission transistor. In another embodiment, the gate electrode of the fifth transistor T5 may be connected to an emission line different from ith emission line ELi connected to a gate electrode of a sixth transistor T6.

The gate electrode of the sixth transistor T6 may be connected to the ith emission line ELi, a first electrode of the sixth transistor T6 may be connected to the third node N3, and a second electrode of the sixth transistor T6 may be connected to an anode of the light emitting element LD. The sixth transistor T6 may be referred to as an emission transistor. In another embodiment, the gate electrode of the sixth transistor T6 may be connected to an emission line different from that connected to the gate electrode of the fifth transistor T5.

A gate electrode of a seventh transistor T7 may be connected to a scan line SLi4, a first electrode of the seventh transistor T7 may be connected to an initialization line INTL, and a second electrode of the seventh transistor T7 may be connected to the anode of the light emitting element LD. The seventh transistor T7 may be referred to as a light emitting element initialization transistor.

A first electrode of the storage capacitor Cst may be connected to the first power line ELVDDL, and a second electrode of the storage capacitor Cst may be connected to the first node N1.

The anode of the light emitting element LD may be connected to the second electrode of the sixth transistor T6, and a cathode of the light emitting element LD may be connected to a second power line ELVSSL. The light emitting element LD may be a light emitting diode. The light emitting element LD may be configured as an organic light emitting diode, an inorganic light emitting diode, a quantum dot/well light emitting diode, or the like. The light emitting element LD may emits light of any one color among a first color, a second color, and a third color. In addition, in this embodiment, only one light emitting element LD is provided in each pixel PXij. However, in another embodiment, a plurality of light emitting elements may be provided in each pixel PXij. The plurality of light emitting elements may be connected in series, parallel, series/parallel, or the like.

A first power voltage may be applied to the first power line ELVDDL, a second power voltage may be applied to the second power line ELVSSL, and an initialization voltage may be applied to the initialization line INTL. For example, the first power voltage may be higher than the second power voltage. For example, the initialization voltage may be equal to or higher than the second power voltage. For example, the initialization voltage may correspond to a data voltage having the smallest magnitude among magnitudes of data voltages which can be provided. In another example, the magnitude of the initialization voltage may be smaller than those of the data voltages which can be provided.

FIG. 34 is a diagram illustrating an exemplarily driving method of the pixel shown in FIG. 33.

Hereinafter, for convenience of description, it is assumed that the scan lines SLi1, SLi2, and SLi4 correspond to an ith scan line SLi, and the scan line SLi3 is an (i−1)th scan line SL(i−1). However, in some embodiments, a connection relationship between the scan lines SLi1, SLi2, SLi3, and SLi4 may be diverse. For example, the scan line SLi4 may be an (i−1)th scan line or an (i+1)th scan line.

First, an emission signal having a turn-off level (logic high level) is applied to the ith emission line ELi, a data voltage DATA(i−1)j for an (i−1)th pixel is applied to the data line DLj, and a scan signal having a turn-on level (logic low level) is applied to the scan line SLi3. High/low of a logic level may be changed according to whether a transistor is of a P-type or an N-type.

Since a scan signal having the turn-off level is applied to the scan lines SLi1 and SLi2, the second transistor T2 is in a turn-off state, and the data voltage DATA(i−1)j for the (i−1)th pixel is prevented from being input to the pixel PXij.

Since the fourth transistor T4 is in a turn-on state, the first node N1 is connected to the initialization line INTL, so that a voltage of the first node N1 is initialized. Since the emission signal having the turn-off level is applied to the ith emission line ELi, the transistors T5 and T6 are in the turn-off state, and unnecessary emission of the light emitting element LD in a process of applying the initialization voltage is prevented.

Next, a data voltage DATAij for an ith pixel PXij is applied to the data line DLj, and the scan signal having the turn-on level is applied to the scan lines SLi1 and SLi2. Accordingly, the transistors T2, T1, and T3 are in a conduction state, and the data line DLj and the first node N1 are electrically connected to each other. Therefore, a compensation voltage obtained by subtracting a threshold voltage of the first transistor T1 from the data voltage DATAij is applied to the second electrode of the storage capacitor Cst (i.e., the first node N1), and the storage capacitor Cst maintains a voltage corresponding to the difference between the first power voltage and the compensation voltage. Such a period may be referred to as a threshold voltage compensation period or a data write period.

In addition, when the scan line SLi4 is an ith scan line, the seventh transistor T7 is in the turn-on state. Hence, the anode of the light emitting element LD and the initialization line INTL are connected to each other, and the light emitting element LD is initialized to a charge amount corresponding to the voltage difference between the initialization voltage and the second power voltage.

Subsequently, since the emission signal having the turn-on level is applied to the ith emission line ELi, the transistors T5 and T6 may be electrically connected to each other. Therefore, a driving current path is formed, through which the first power line ELVDDL, the fifth transistor T5, the first transistor T1, the sixth transistor T6, the light emitting element LD, and the second power line ELVSSL are connected to each other.

An amount of driving current flowing through the first electrode and the second electrode of the first transistor T1 is adjusted according to the voltage maintained in the storage capacitor Cst. The light emitting element LD emits light with a luminance corresponding to the amount of driving current. The light emitting element LD emits light until the emission signal having the turn-off level is applied to the ith emission line ELi.

When an emission signal has the turn-on level, pixels receiving the corresponding emission signal may be in a display state. Therefore, the period in which the emission signal has the turn-on level may be referred to as an emission period EP (or emission allow period). In addition, when an emission signal has the turn-off level, pixels PXij receiving the corresponding emission signal may be in a non-display state. Therefore, the period in which the emission signal has the turn-off level may be referred to as a non-emission period NEP (or emission inhibit period).

The non-emission period NEP described in FIG. 34 is used to prevent the pixel PXij from emitting light with an unwanted luminance while passing through the initialization period and the data write period.

One or more non-emission periods NEP may be additionally provided while data written to the pixel PXij is maintained (e.g., one frame period). This is for the purpose of reducing the emission period EP of the pixel PXij, thereby effectively expressing a low grayscale or gently blurring motion of an image.

In the input sensing device and the display device in accordance with the present invention, a touch input is sensed by using a first driving signal having a first frequency, and whether the touch input is an actual input may be determined by using a second driving signal having a second frequency. The second frequency may be insensitive to a temperature change of a sensor. Thus, a ghost touch (i.e., a phenomenon in which it is determined that a touch input exists even when the touch input does not actually exist) caused by the temperature change of the sensor, which occurs when a touch of an object is input and when the touch of the object is released, can be distinguished from an actual touch input, and only the actual touch input can be accurately determined.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display unit including pixels;
a sensor unit overlapping with the display unit, the sensor unit including sensors; and
a sensor driver configured to transmit a driving signal to the sensors, and configured to receive sensing signals corresponding to the driving signal from the sensors,
wherein:
one sensing period includes a first sensing period and a second sensing period;
the sensor driver transmits a first driving signal having a first frequency to each of the sensors in the first sensing period, and transmits a second driving signal having a second frequency different from the first frequency to each of the sensors in the second sensing period;
first sensing signals provided from the sensors, corresponding to the first driving signal, are sensitive to a touch input and a change in a peripheral temperature; and
second sensing signals provided from the sensors, corresponding to the second driving signal, are insensitive to the change in the peripheral temperature.

2. The display device of claim 1, wherein the sensor driver:
senses the touch input, based on first sensing signals provided from the sensors, corresponding to the first driving signal; and
determines whether the touch input is actually input, based on second sensing signals provided from the sensors, corresponding to the second driving signal.

3. The display device of claim 2, wherein:
the first sensing signals represent capacitances of the sensors; and
the sensor driver senses the touch input by comparing the capacitances with reference capacitances of the sensors, and periodically updates the reference capacitances.

4. The display device of claim 3, wherein the reference capacitances are changed according to a peripheral environment factor including a temperature.

5. The display device of claim 1, wherein the second frequency is greater than the first frequency.

6. The display device of claim 1, wherein, when a change in the second sensing signals corresponding to the second driving signal is within a reference range, the sensor driver determines that the touch input has not actually occurred.

7. The display device of claim 1, wherein:
the pixels include light emitting elements;
the display unit further includes an insulating layer covering the light emitting elements; and
the sensor unit is directly formed on the insulating layer.

8. The display device of claim 1, further comprising a display driver configured to drive the display unit in response to a horizontal synchronization signal,
wherein the first driving signal and the second driving signal are synchronized with the horizontal synchronization signal.

9. The display device of claim 1, further comprising a display driver configured to drive the display unit in response to a horizontal synchronization signal,
wherein the first driving signal and the second driving signal are asynchronized with the horizontal synchronization signal.

10. A display device comprising:
a display unit including pixels;
a sensor unit overlapping with the display unit, the sensor unit including sensors; and
a sensor driver configured to transmit a driving signal to the sensors, and configured to receive sensing signals corresponding to the driving signal from the sensors,
wherein:
one sensing period includes a first sensing period and a second sensing period;
the sensor driver is configured to transmit a first driving signal having a first frequency to each of the sensors in the first sensing period, and to transmit a second driving signal having a second frequency different from the first frequency to each of the sensors in the second sensing period;

the sensor driver operates in a first mode when a peripheral temperature is higher than or equal to a reference temperature, and operates in a second mode when the peripheral temperature is lower than the reference temperature; and the sensor driver transmits only the first driving signal among the first and second driving signals to the sensors in the first mode, and sequentially transmits the first driving signal and the second driving signal to the sensors in the second mode.

11. The display device of claim 10, wherein the sensor driver operates in the second mode when an average of reference capacitances of the sensors is less than a reference value.

12. The display device of claim 10, further comprising a temperature sensor configured to measure the peripheral temperature.

13. An input sensing device comprising:

a sensor unit including sensors; and a sensor driver configured to transmit a driving signal to the sensors and configured to receive sensing signals corresponding to the driving signal from the sensors, wherein:

one sensing period includes a first sensing period and a second sensing period;

the sensor driver transmits a first driving signal having a first frequency to each of the sensors in the first sensing period, and transmits a second driving signal having a second frequency different from the first frequency to each of the sensors in the second sensing period;

first sensing signals provided from the sensors, corresponding to the first driving signal, are sensitive to a touch input and a change in a peripheral temperature; and second sensing signals provided from the sensors, corresponding to the second driving signal, are insensitive to the change in the peripheral temperature.

14. The input sensing device of claim 13, wherein the sensor driver:

senses the touch input, based on first sensing signals provided from the sensors, corresponding to the first driving signal; and determines whether the touch input is actually input, based on second sensing signals provided from the sensors, corresponding to the second driving signal.

15. The input sensing device of claim 13, wherein the second frequency is greater than the first frequency.

16. The input sensing device of claim 13, wherein, when a change in the second sensing signals corresponding to the second driving signal is within a reference range, the sensor driver determines that the touch input has not actually occurred.

17. The input sensing device of claim 13, wherein:

the sensor driver operates in a first mode when the peripheral temperature is higher than or equal to a reference temperature, and operates in a second mode when the peripheral temperature is lower than the reference temperature; and the sensor driver transmits only the first driving signal among the first and second driving signals to the sensors in the first mode, and sequentially transmits the first driving signal and the second driving signal to the sensors in the second mode.

18. The input sensing device of claim 17, wherein the sensor driver operates in the second mode when an average of reference capacitances of the sensors is less than a reference value.

* * * * *